US010777802B2

(12) United States Patent
Mori et al.

(10) Patent No.: US 10,777,802 B2
(45) Date of Patent: *Sep. 15, 2020

(54) ELECTRICITY STORAGE DEVICE AND METHOD FOR MANUFACTURING ELECTRICITY STORAGE DEVICE

(71) Applicant: NIPPON CHEMI-CON CORPORATION, Tokyo (JP)

(72) Inventors: Masayuki Mori, Tokyo (JP); Tatsuo Kubouchi, Tokyo (JP); Takashi Nawano, Tokyo (JP); Akihiro Furusawa, Tokyo (JP)

(73) Assignee: NIPPON CHEMI-CON CORPORATION, Tokyo (JP)

( * ) Notice: Subject to any disclaimer, the term of this patent is extended or adjusted under 35 U.S.C. 154(b) by 346 days.

This patent is subject to a terminal disclaimer.

(21) Appl. No.: 14/135,810

(22) Filed: Dec. 20, 2013

(65) Prior Publication Data

US 2014/0113185 A1 Apr. 24, 2014

Related U.S. Application Data

(63) Continuation of application No. PCT/JP2012/004198, filed on Jun. 28, 2012.

(30) Foreign Application Priority Data

Jun. 28, 2011 (JP) .................................. 2011-143558

(51) Int. Cl.
*H01M 2/26* (2006.01)
*H01M 2/30* (2006.01)
(Continued)

(52) U.S. Cl.
CPC ............. *H01M 2/26* (2013.01); *B23K 15/008* (2013.01); *B23K 26/22* (2013.01); *H01G 9/0029* (2013.01);
(Continued)

(58) Field of Classification Search
CPC .......... H01M 2/06; H01M 2/30; H01M 2/263; H01M 2/26; H01M 2/0232; H01M 2/0413;
(Continued)

(56) References Cited

U.S. PATENT DOCUMENTS 5,253,795 A 10/1993 Sato
6,064,563 A 5/2000 Yamada et al.
(Continued)

FOREIGN PATENT DOCUMENTS

CN 1701402 A 11/2005
DE 10041369 A1 8/2001
(Continued)

OTHER PUBLICATIONS

Office Action dated May 21, 2015, issued in counterpart Chinese application No. 201280031675.1 (w/English translation) (9 pages).
(Continued)

*Primary Examiner* — Jonathan G Jelsma
*Assistant Examiner* — Omar M Kekia
(74) *Attorney, Agent, or Firm* — Westerman, Hattori, Daniels & Adrian, LLP

(57) ABSTRACT

An electricity storage device includes an electricity storage element that is constituted by an electrode body in a positive side and an electrode body in a negative side that face each other while holding a separator; a sealing member that seals a case member accommodating the electricity storage element; at least one electrode protrusion that is either of the electrode bodies, which protrudes from an element end-face of the electricity storage element, at least one current collector plate that is connected to the electrode protrusion; and a terminal member that is installed in the sealing member, a lateral face of the terminal member being connected to a lateral face of the current collector plate.

9 Claims, 34 Drawing Sheets

(51) Int. Cl.
*H01M 2/06* (2006.01)
*H01M 2/04* (2006.01)
*H01M 2/02* (2006.01)
*B23K 15/00* (2006.01)
*B23K 26/22* (2006.01)
*H01G 9/00* (2006.01)
*H01G 11/70* (2013.01)

(52) U.S. Cl.
CPC .......... *H01G 11/70* (2013.01); *H01M 2/0232* (2013.01); *H01M 2/0413* (2013.01); *H01M 2/06* (2013.01); *H01M 2/263* (2013.01); *H01M 2/30* (2013.01); *Y10T 29/49108* (2015.01)

(58) Field of Classification Search
CPC .... B23K 15/008; B23K 26/22; H01G 9/0029; H01G 11/70; Y10T 29/417; Y10T 29/49108
USPC ........................................................ 429/179
See application file for complete search history.

(56) References Cited

U.S. PATENT DOCUMENTS

| | | | |
|---|---|---|---|
| 6,222,720 B1 | 4/2001 | Aoki et al. | |
| 6,292,348 B1 | 9/2001 | Lin | |
| 6,411,496 B1 | 6/2002 | Suhara et al. | |
| 6,456,484 B1 | 9/2002 | Matsuoka et al. | |
| 6,896,993 B2 | 5/2005 | Hozumi et al. | |
| 7,286,335 B2 | 10/2007 | Hozumi et al. | |
| 7,830,647 B2 | 11/2010 | Miura et al. | |
| 7,916,454 B2 | 3/2011 | Shimizu et al. | |
| 7,948,738 B2 | 5/2011 | Shimamoto et al. | |
| 8,164,882 B2 | 4/2012 | Sakata et al. | |
| 8,780,528 B2 | 7/2014 | Takagi et al. | |
| 9,053,858 B2 | 6/2015 | Mori et al. | |
| 2002/0195432 A1 | 12/2002 | Sekiguchi | |
| 2004/0023107 A1 | 2/2004 | Nakanishi et al. | |
| 2005/0042508 A1* | 2/2005 | Kim | H01M 2/0275 429/174 |
| 2006/0034036 A1 | 2/2006 | Miura et al. | |
| 2006/0187615 A1 | 8/2006 | Hozumi et al. | |
| 2007/0117020 A1* | 5/2007 | Baker | H01M 2/266 429/234 |
| 2008/0043403 A1 | 2/2008 | Ueda et al. | |
| 2008/0241679 A1* | 10/2008 | Okutani | H01M 2/06 429/185 |
| 2009/0109600 A1 | 4/2009 | Reddy et al. | |
| 2010/0079927 A1 | 4/2010 | Shimizu et al. | |
| 2010/0155378 A1* | 6/2010 | Fuchs | B23K 26/244 219/121.64 |
| 2011/0020666 A1* | 1/2011 | Wakisaka | B23K 1/14 428/650 |
| 2011/0244317 A1* | 10/2011 | Lee | H01M 2/0473 429/182 |
| 2011/0256433 A1* | 10/2011 | Fuhr | H01M 2/1229 429/82 |
| 2012/0055909 A1* | 3/2012 | Miyake | B21K 25/00 219/121.64 |
| 2013/0250475 A1 | 9/2013 | Mori et al. | |

FOREIGN PATENT DOCUMENTS

| | | |
|---|---|---|
| DE | 112004000061 T5 | 9/2005 |
| DE | 69834706 T2 | 6/2007 |
| EP | 0924723 A2 | 6/1999 |
| EP | 2355208 A2 | 8/2011 |
| EP | 2 608 230 A1 | 6/2013 |
| JP | 05-47367 A | 2/1993 |
| JP | 06-275476 A | 9/1994 |
| JP | 8-7882 A | 1/1996 |
| JP | 08-022818 A | 1/1996 |
| JP | 8-287954 A | 11/1996 |
| JP | 10-83833 A | 3/1998 |
| JP | 11-219857 A | 8/1999 |
| JP | 11-251190 A | 9/1999 |
| JP | 2000-294222 A | 10/2000 |
| JP | 2001-68379 A | 3/2001 |
| JP | 2001-102031 A | 4/2001 |
| JP | 2002-164259 A | 6/2002 |
| JP | 2003-001452 A | 1/2003 |
| JP | 2003-059765 A | 2/2003 |
| JP | 2003-263977 A | 9/2003 |
| JP | 2004-071267 A | 3/2004 |
| JP | 2006-4729 A | 1/2006 |
| JP | 2007-066599 A | 3/2007 |
| JP | 2007-326140 A | 12/2007 |
| JP | 2007-335150 A | 12/2007 |
| JP | 2007-335156 A | 12/2007 |
| JP | 2008-192321 A | 8/2008 |
| JP | 2009-188095 A | 8/2009 |
| JP | 2010-10166 A | 1/2010 |
| JP | 2010-010166 A | 1/2010 |
| JP | 2010-093178 A | 4/2010 |
| JP | 2010-114240 A | 5/2010 |
| JP | 2010-118374 A | 5/2010 |
| JP | 2010-135651 A | 6/2010 |
| JP | 2012-043957 A | 3/2012 |
| JP | 2012-104617 A | 5/2012 |
| JP | 2012-104618 A | 5/2012 |
| JP | 2012-104619 A | 5/2012 |
| JP | 2012-104620 A | 5/2012 |
| JP | 2012-104621 A | 5/2012 |
| JP | 2012-104622 A | 5/2012 |
| JP | 2012-104623 A | 5/2012 |
| JP | 2012-174886 A | 9/2012 |
| JP | 2013-12646 A | 1/2013 |
| JP | 2013-26462 A | 2/2013 |
| JP | 2013-26463 A | 2/2013 |
| KR | 10-0516108 B1 | 9/2005 |
| KR | 1020050113592 A | 12/2005 |
| WO | 01/24206 A1 | 4/2001 |
| WO | 2004084246 A1 | 9/2004 |
| WO | 2005/038837 A1 | 4/2005 |
| WO | 2010041461 A1 | 4/2010 |
| WO | 2010/059957 A2 | 5/2010 |
| WO | 2010/101367 A2 | 9/2010 |
| WO | WO2010131298 A1 * | 11/2010 ............ H01M 2/26 |
| WO | 2012/023289 A1 | 2/2012 |
| WO | 2012/063486 A1 | 5/2012 |

OTHER PUBLICATIONS

International Search Report, dated Aug. 14, 2012, issued in corresponding application No. PCT/JP2012/004198.
Japanese Written Opinion, dated Aug. 14, 2012, issued in corresponding application No. PCT/JP2012/004198.
Extended European Search Report dated Feb. 4, 2015, issued in European Application No. 12805322.0. (5 pages).
Notification of Transmittal of Translation of the International Preliminary Report on Patentability (form PCT/IB/338) of PCT/JP2012/004198 dated Jan. 16, 2014, with forms PCT/ISA/237 and PCT/IB/373 (8 pages).
International Search Report dated Jan. 24, 2012, issued in counterpart International Application No. PCT/JP2011/006266. (5 pages).
Written Opinion dated Jan. 24, 2012, issued in counterpart International Application No. PCT/JP2011/006266. (4 pages).
Notification of Transmittal of Translation of the International Preliminary Report on Patentability (Forms PCT/IB/338) of International Application No. PCT/JP2011/006266 dated May 14, 2013 with Forms PCT/IB/373 and PCT/IB/237. (7 pages).
Japanese Office Action dated Sep. 2, 2014, issued in counterpart Japanese Patent Application No. 2010-251352 with English translation (8 pages).
Chinese Office Action dated Feb. 9, 2015, issued in counterpart Chinese Patent Application No. 201180039963.7 with English translation (19 pages).
Japanese Office Action dated Dec. 2, 2014, issued in counterpart Japanese Patent Application No. 2010-251355 with English translation (4 pages).

(56) References Cited

OTHER PUBLICATIONS

Japanese Office Action dated Dec. 2, 2014, issued in counterpart Japanese Patent Application No. 2010-251356 with English translation (5 pages).
Office Action dated Apr. 1, 2015, issued in counterpart Chinese Patent Application No. 201180053897.9, with English translation (17 pages).
Office action dated Aug. 4, 2015, issued in counterpart Japanese application No. 2010-251355, with English abstract (6 pages).
Office action dated Aug. 4, 2015, issued in counterpart Japanese application No. 2010-251356, with English abstract (7 pages).
Office action dated Aug. 4, 2015, issued in counterpart Japanese application No. 2010-251358, with English abstract (5 pages).
Office Action dated Dec. 8, 2015, issued in counterpart Japanese Patent Application No. 2010-251355, with English translation (5 pages).
Office Action dated Dec. 4, 2015, issued in Chinese Patent Application No. 201180053897.9, with English translation (16 pages).
Office Action dated Dec. 8, 2015, issued in coutnerpart Chinese Patent Application No. 201180039963.7, with English translation (17 pages).
Non-Final Office Action dated Jul. 22, 2015, issued in U.S. Appl. No. 13/890,426 (42 pages).
Notice of Allowance dated Mar. 15, 2016, issued in U.S. Appl. No. 13/890,426 (15 pages).
Office Action dated Mar. 14, 2016, issued in counterpart Chinese Patent Application No. 201280031675.1, with English translation. (9 pages).
Office Action dated Apr. 26, 2016, issued in counterpart Japanese Patent Application No. 2015-121899, with English translation. (9 pages).
Office Action dated May 10, 2016, issued in counterpart Japanese Patent Application No. 2013-522451, with English translation. (11 pages).
Chinese Office Action dated Nov. 15, 2016, issued in counterpart Chinese Patent Application No. 201280031675.1, with English translation (21 pages).
Chinese Office Action dated Jul. 27, 2016, issued in counterpart Chinese Patent Application No. 201280031675.1, with English translation (17 pages).
Chinese Office Action dated Aug. 10, 2016, issued in counterpart Chinese Patent Application No. 201180039963.7, with English translation (22 pages).
Decision of Refusal dated Aug. 9, 2016, issued in relevant Japanese Patent Application No. 2013-522451, with English translation (6 pages).
Decision of Refusal dated Aug. 30, 2016, issued in relevant Japanese Patent Application No. 2015-121899, with English translation (8 pages).
Japanese Office Action dated Mar. 24, 2015, issued in corresponding Japanese Patent Application No. 2010-251353, with English Translation (4 pages).
Japanese Office Action dated Jan. 13, 2015, issued in corresponding Japanese Patent Application No. 2010-251354, w/English translation (6 pages).
Japanese Office Action dated Dec. 2, 2014, issued in corresponding Japanese Patent Application No. 2010-251357, w/English translation (5 pages).
Japanese Office Action dated Dec. 2, 2014, issued in corresponding Japanese Patent Application No. 2010-251358, w/English translation (6 pages).
Japanese Office Action dated Jul. 29, 2014, issued in corresponding JP application No. 2010-251353 with English translation (4 pages).
Translation of the International Preliminary Report on Patentability (PCT/ISA/237) (7 pages). (PCT/IB/373) (1 page).of International Application No. PCT/JP2011/004623 dated Mar. 28, 2013 (Form PCT/IB/338) (1 page).
Japanese Office Action dated Oct. 22, 2013, issued in corresponding Japanese Application No. 2010-183486, w/English translation (6 pages).
International Search Report of PCT/JP2011/004623, dated Nov. 15, 2011 (4 pages).
Written Opinion PCT/JP2011/004623, dated Nov. 15, 2011 (4 pages).
Non-Final Office Action dated Aug. 4, 2016, issued in U.S. Appl. No. 13/890,426 (16 pages).
Office Action dated Jun. 19, 2018, issued in counterpart Korean application No. 10-2014-7001939, with English translation. (27 pages).
Extended (Supplementary) European Search Report dated Feb. 28, 2018, issued in counterpart application No. 11817938.1. (7 pages).
Office Action dated Feb. 1, 2018, issued in counterpart Korean application No. 10-2013-7006759, with English translations. (23 pages).
Office Action dated Oct. 6, 2015, issued in counterpart Japanese application No. 2010-251354, with English translation. (6 pages).
Office Action dated Nov. 20, 2017, issued in counterpart European Application No. 12805322.0. (4 pages).

* cited by examiner

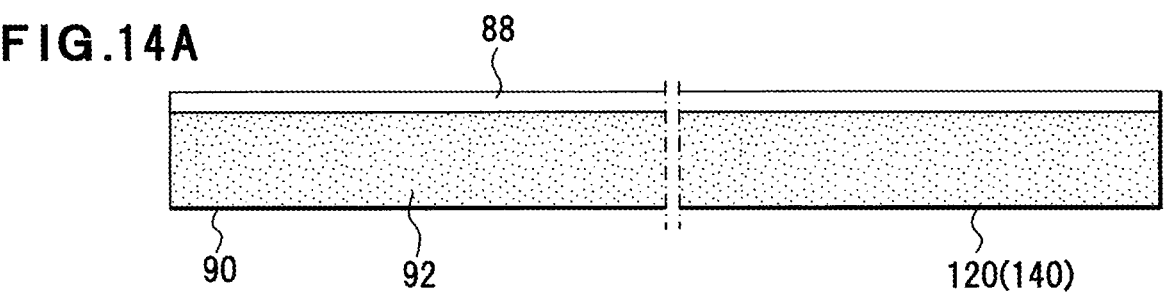
FIG.14A
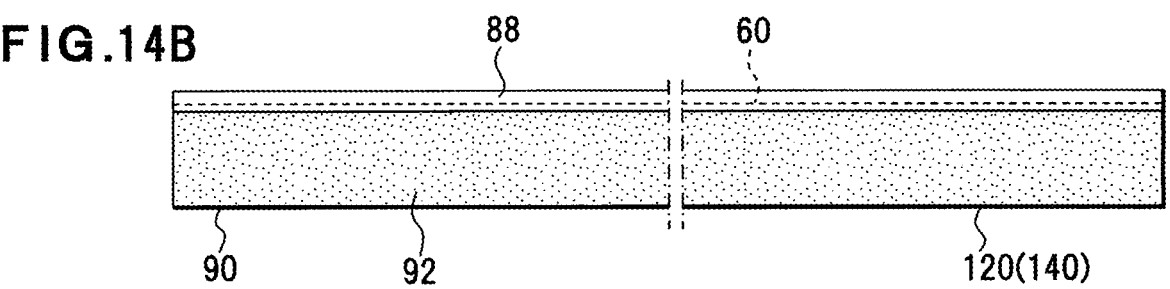
FIG.14B
FIG.14C
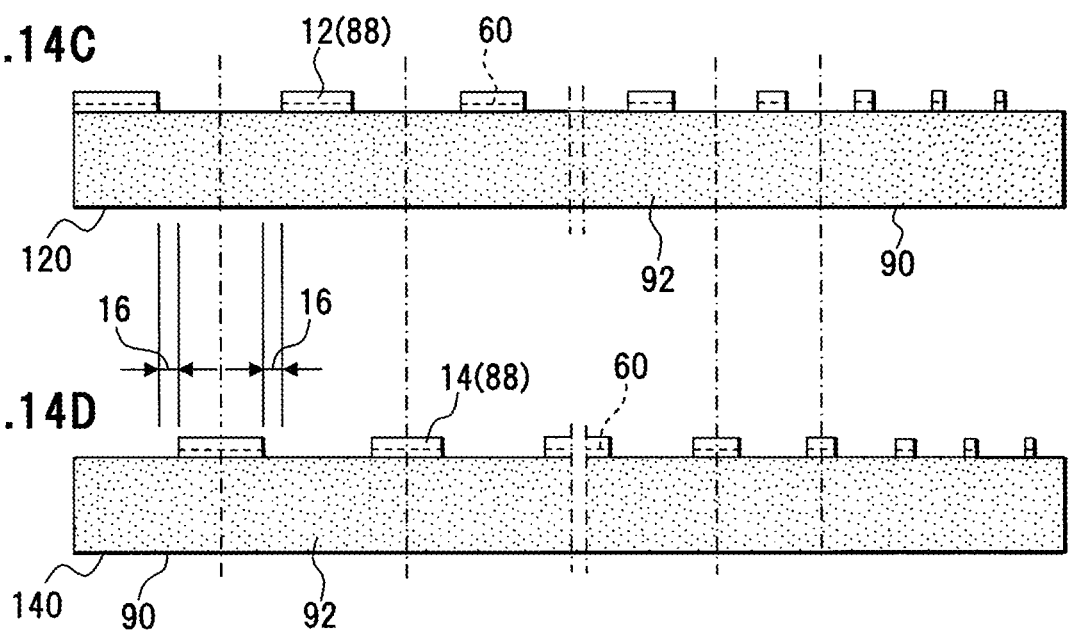
FIG.14D
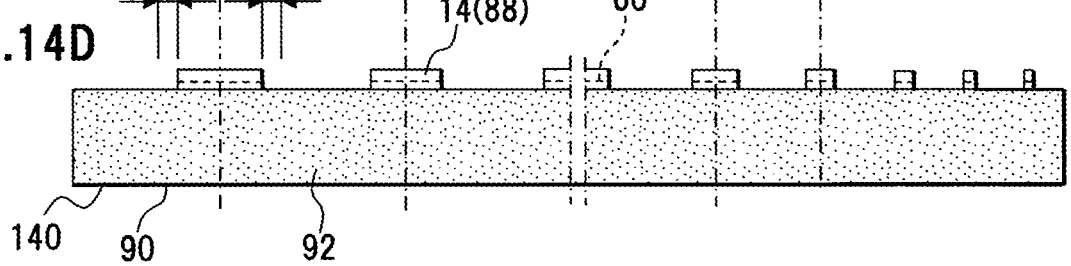

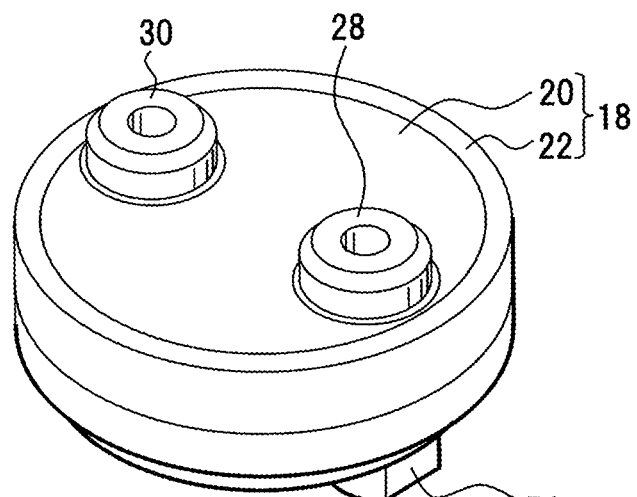
FIG.20A
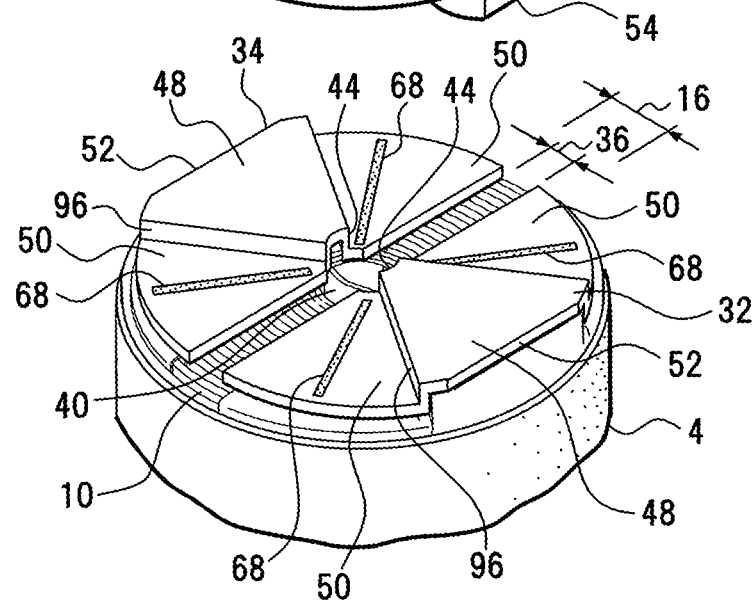
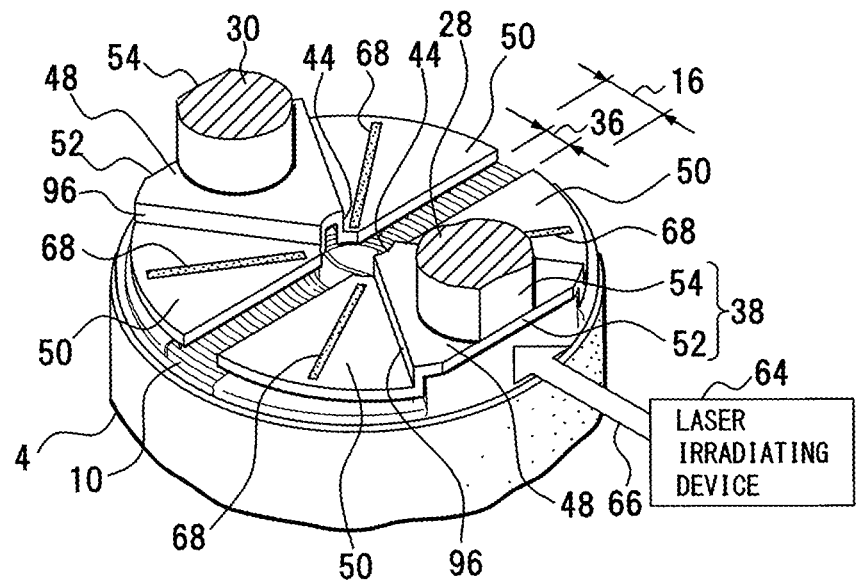
FIG.20B (WELD LINE)

(LASER POWER)

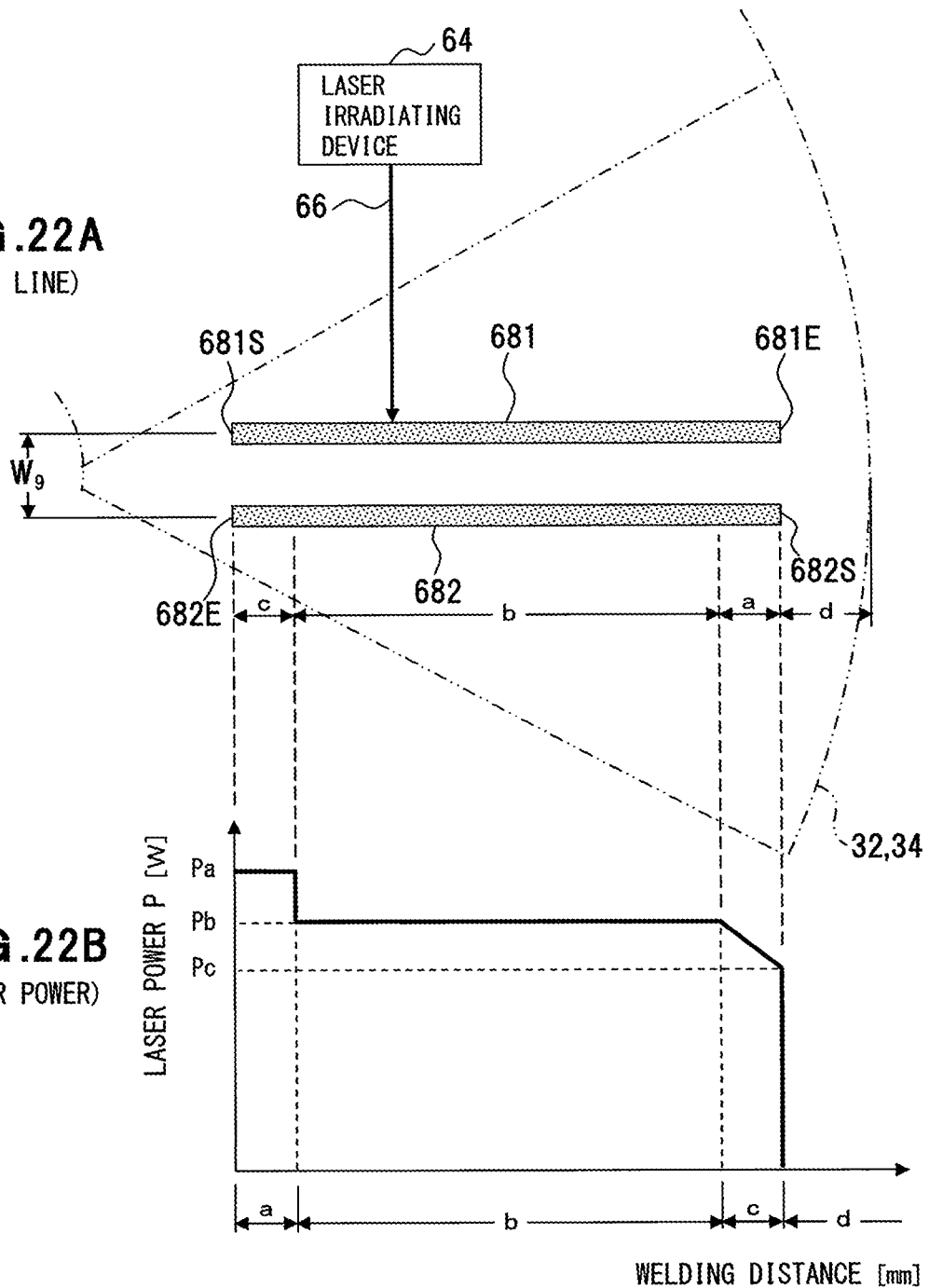

FIG.26
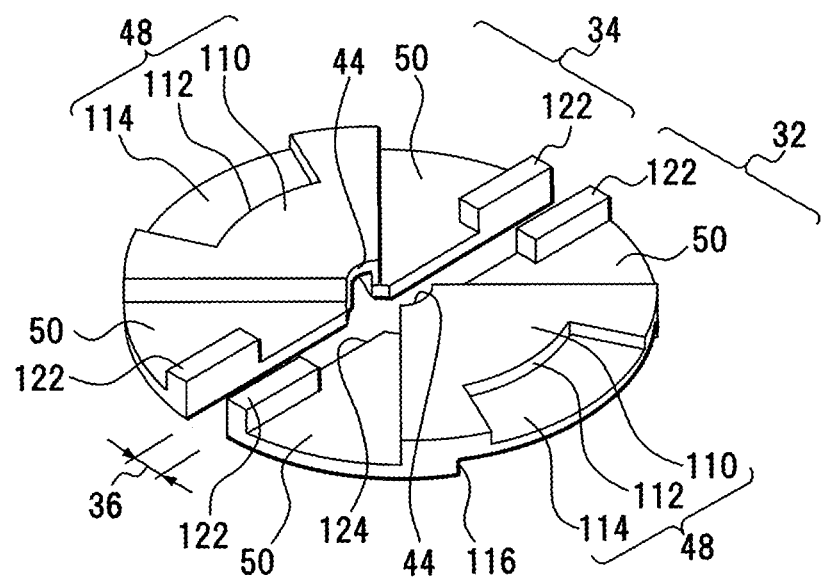
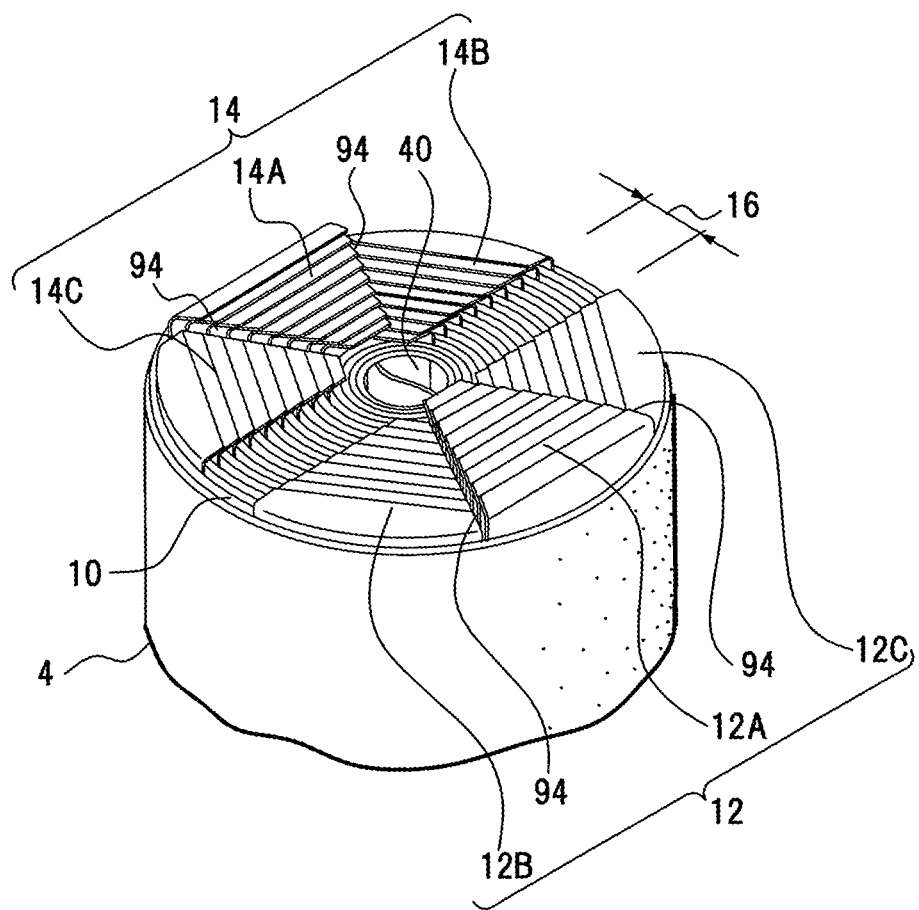

ELECTRICITY STORAGE DEVICE AND METHOD FOR MANUFACTURING ELECTRICITY STORAGE DEVICE

CROSS-REFERENCE TO RELATED APPLICATIONS

This application is a continuation of International Application No. PCT/JP2012/004198, filed on Jun. 28, 2012, which is entitled to the benefit of priority of Japanese Patent Application No. 2011-143558, filed on Jun. 28, 2011, the contents of which are hereby incorporated by reference.

BACKGROUND OF THE INVENTION i) Field of the Invention

The present invention relates to techniques of formation and connection of electricity storage elements and terminal members.

ii) Description of the Related Art

Electricity storage devices of high energy density are desired for putting electric vehicles to practical use, for developing new portable devices, and so on. In such an electricity storage device, electrical connection between an electricity storage element and an external terminal affects the reduction in the internal resistance of the element and the contact resistance of the connecting portion. Thus, reduction measures are taken for such an electricity storage device.

Concerning such electrical connection, it is known that a current collector terminal is provided for an end-face of an element, a positive current collector plate is provided for one end-face and a negative current collector plate is provided for the other end-face of a wound element while these current collector plates cover current collector foil that is exposed on the end-faces of the wound element, and the current collector plates and the current collector foil are connected by laser welding (for example, Japanese Patent Application Laid-Open Publication No. 2003-263977).

BRIEF SUMMARY OF THE INVENTION

For a structure of providing a current collector(s) for an end-face of an electricity storage element such as a battery device, it is necessary to surely keep a connection distance for the current collector(s) and external terminals for the positive and negative sides when the external terminals are adjacently provided for an outer packaging member that covers the outside of the element. In a winding-type element, the distribution of the internal resistance is different between the inside and the outside of the element. Thus, measures for this are necessary to be taken, and it is necessary to pay attention to the connection between the element and the current collector(s). A structure of using a current collector can reduce the internal resistance of an element. However, the reliability of the connection may be degraded and the connection resistance may get high according to stress that is applied to the current collector, which lies between an external terminal and the element, while the element is manufactured.

It is therefore an object of the present invention to achieve reduced resistance, a robust connection structure and simplified connection steps concerning an electricity storage device in view of the above problems.

According to a first aspect of the present invention, an electricity storage device includes an electricity storage element that is constituted by an electrode body in a positive side and an electrode body in a negative side that face each other while holding a separator, a sealing member that seals a case member accommodating the electricity storage element, at least one electrode protrusion that is either of the electrode bodies, which protrudes from an element end-face of the electricity storage element, at least one current collector plate that is connected to the electrode protrusion, and a terminal member that is installed in the sealing member, a lateral face of the terminal member being connected to a lateral face of the current collector plate.

In the above electricity storage device, preferably, the electrode protrusion in the positive side and the electrode protrusion in the negative side may be provided for the element end-face of the electricity storage element, which is an identical element end-face.

In the above electricity storage device, preferably, the current collector plate and the terminal member may be welded by laser welding using a laser beam or electron beam welding using an electron beam.

In the above electricity storage device, preferably, the electrode protrusion may be folded over the element end-face with a fold provided therefor.

In the above electricity storage device, preferably, the terminal member may include an external terminal that is connected to the current collector plate, and a connecting plate that is installed between the external terminal and the current collector plate.

In the above electricity storage device, preferably, a first isolation distance may be set between the electrode protrusion in the positive side and the electrode protrusion in the negative side, which protrude on the element end-face of the electricity storage element, and a second isolation distance may be set between the current collector plate in the positive side, which is installed in the electrode protrusion in the positive side of the electricity storage element, and the current collector plate in the negative side, which is installed in the electrode protrusion in the negative side of the electricity storage element.

In the above electricity storage device, preferably, the current collector plate may have a connecting area that connects to the terminal member and a connecting area that connects to the electrode protrusion, these connecting areas being set at different locations.

In the above electricity storage device, preferably, each of the current collector plate and the terminal member may have a connecting face part that is an arcuate face with reference to an element center of the electricity storage element.

In the above electricity storage device, preferably, the current collector plate may have a thickness part, and the thickness part may increase thermal capacity of the current collector plate.

In the above electricity storage device, preferably, a welded part that is welded by the laser beam or the electron beam may shift from a contact surface for the current collector plate and the terminal member.

In the above electricity storage device, preferably, a contact surface for the current collector plate and the terminal member may be covered by a cover that is formed on the current collector plate or the terminal member, and a welded part where the current collector plate and the terminal member may be welded by irradiation with a laser beam or an electron beam is provided for the cover.

In the above electricity storage device, preferably, an irradiated position irradiated with the laser beam or the electron beam may be made to correspond to a contact surface for the current collector plate and the terminal member, or may be differentiated from the contact surface in a crossing direction.

In the above electricity storage device, preferably, a nugget depth due to the laser welding or the electron beam welding may be 1.2 mm or below.

According to a second aspect of the present invention, a method for manufacturing an electricity storage device includes forming an electricity storage element that includes an electrode body in a positive side and an electrode body in a negative side between which a separator is interposed, forming at least one electrode protrusion that is either/are both of the electrode bodies in the positive side and the negative side of the electricity storage element, either or both of the electrode bodies protruding from an element end-face, and connecting the electrode protrusion and a terminal member that is installed in a sealing member that seals a case member accommodating the electricity storage element through interposal of a current collector plate.

In the above method, preferably, said connecting may include connecting the electrode protrusion and the current collector plate by welding at lateral faces of the electrode protrusion and the current collector plate, and connecting the current collector plate and the terminal member by laser welding or electron beam welding.

In the above method, preferably, said connecting may include fixing the current collector plate, and connecting the current collector plate and the electrode protrusion by laser welding under a state where the electricity storage element is pushed onto the current collector plate.

The above method preferably may include setting a weld line on a top surface of the current collector plate, performing laser irradiation on the weld line, and welding the current collector plate and the electrode protrusion of the electricity storage element.

The above method preferably may further include changing power of a laser with which a weld line that is set on the current collector plate is irradiated.

In the above method, preferably, an irradiated position irradiated with a laser beam or an electron beam may be set at a location different from a contact surface for the current collector plate and the terminal member, and this irradiated position may be irradiated with the laser beam or the electron beam.

Additional objects and advantages of the present invention will be apparent from the following detailed description of the invention, which are best understood with reference to the accompanying drawings.

BRIEF DESCRIPTION OF THE SEVERAL VIEWS OF THE DRAWING

FIGS. 14A to 14D depict an example of current collectors for forming a battery element and electrode parts;

FIGS. 20A and 20B depict external terminals and the current collector plates before and after welding;

FIGS. 22A and 22B depict a variation of the laser power control;

FIG. 26 is a perspective view depicting an example of current collector plates and a battery element according to a seventh embodiment;

DETAILED DESCRIPTION OF THE INVENTION

First Embodiment

The first embodiment includes a structure of providing an electrode protrusion for an element end-face of a battery, and connecting the electrode protrusion with a terminal member via a current collector plate.

Figure 1:
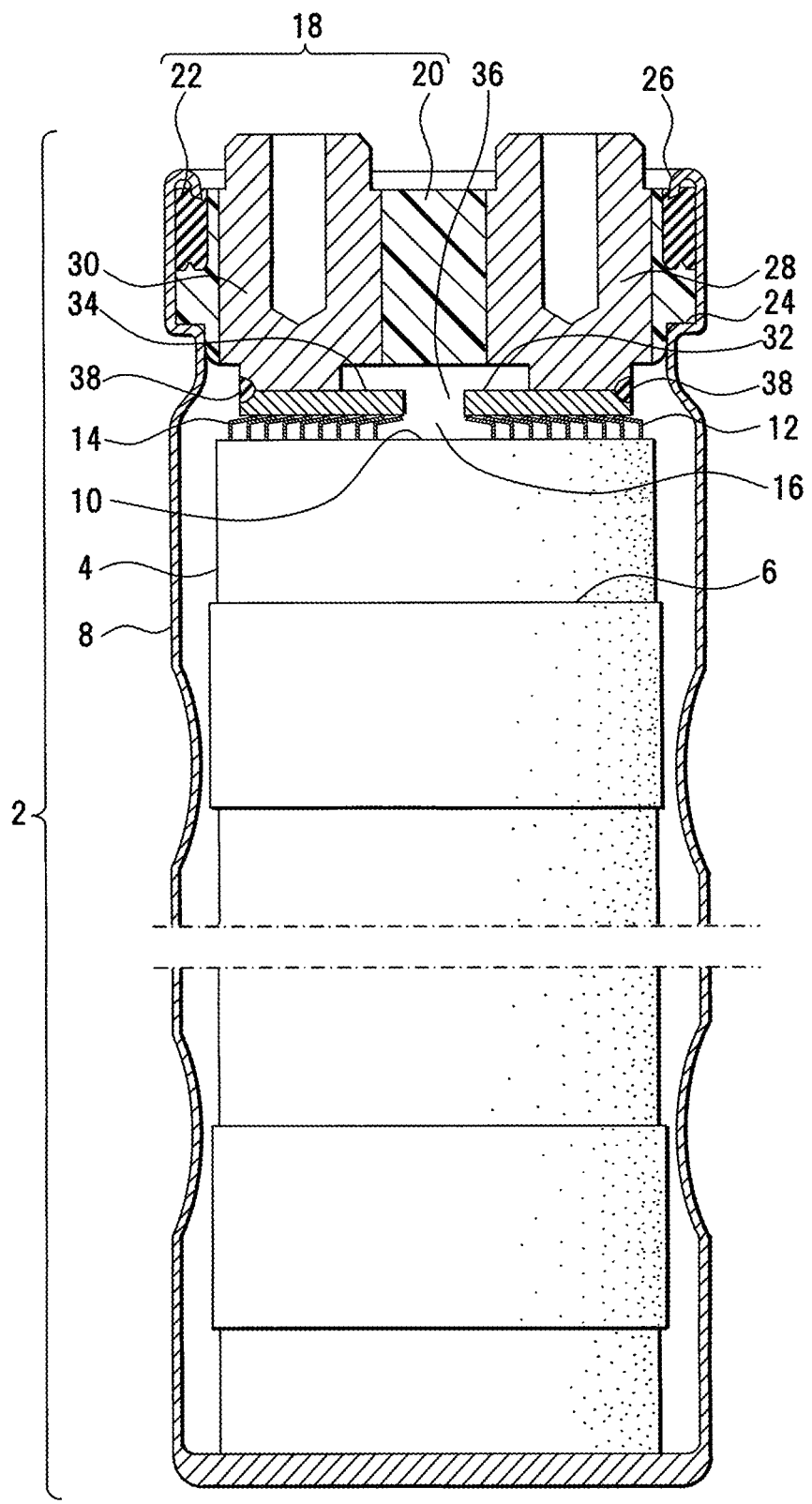
FIG. 1 is a longitudinal cross-sectional view depicting an example of a battery according to a first embodiment.

FIG. 1 will be referred to concerning a battery according to the first embodiment. FIG. 1 depicts a vertical section depicting an example of the battery. The structure depicted in FIG. 1 is an example, and this embodiment is not limited to such a structure.

This battery 2 is an example of the battery of the present invention and the method for manufacturing the same. Electricity storage devices are for example high capacity products of lead-acid batteries and of nickel-cadmium batteries, nickel metal hydride batteries, high capacity capacitors, lithium batteries and so on. For example, a lithium battery uses, for its positive electrode, transition metal oxide such as manganese dioxide, lithium manganese spinel, lithium cobalt oxide and lithium nickel oxide, or sulfide such as thionyl chloride and sulfur dioxide; and for an active material for its negative electrode, metallic lithium, lithium alloy or a carbon material that occludes and emits lithium. High capacity capacitors are for example lithium-ion capacitors. For example, a lithium ion capacitor is an electricity storage device where a non-aqueous electrolyte including lithium salts for its electrolyte is used (non-aqueous lithium-type electricity storage device). A lithium ion capacitor is an example of an electricity storage device that uses a positive electrode body consisting of either electrode layers of active carbon only or composite electrode layers of active carbon and transition metal oxide containing lithium or the like, and a current collector such as metallic foil, and a negative electrode body consisting of electrode layers constituted by either a carbon material that can occlude and emit lithium ion reversibly or titanium dioxide such as lithium titanate, and a current collector such as metallic foil. A high capacity capacitor is expected to have higher capacitance than an electric double-layer capacitor that uses polarized electrodes to both of which active carbon is applied.

The battery 2 depicted in FIG. 1 is an example of an electricity storage device. A battery element 4 that is a wound element is used for the battery 2. This battery element 4 is an example of an electricity storage element of an electricity storage device. For example, the battery element 4 is held with holding tapes 6 and is housed in an outer packaging case 8. The holding tapes 6 prevent the battery element 4 that is a wound element from unwinding. A positive electrode part 12 and a negative electrode part 14 are formed on an element end-face 10 of this battery element 4. An isolation distance 16 is provided between these positive electrode part 12 and negative electrode part 14. The positive electrode part 12 and negative electrode part 14 are an example of electrode protrusions formed on the same element end-face 10. This isolation distance 16 is an example of a first isolation distance that is set between the positive electrode part 12 and the negative electrode part 14, which are protruded from the end-face of the battery element 4. The outer packaging case 8 is a bottomed cylinder. An opening 17 (FIG. 2) of the outer packaging case 8 is sealed by a sealing plate 18. A sealing part 22 is provided for the edge of the top surface of a base part 20 that is the main body of the sealing plate 18. An insulating material such as insulating synthetic resin is formed into the base part 20. A member consisting of a material of high hermeticity, such as a rubber ring, is formed into the sealing part 22. A curling process allows an opening end 26 of the outer packaging case 8 to bite into the sealing part 22 of the sealing plate 18, which is positioned at a fastening step 24, and the outer packaging case 8 is firmly sealed.

A positive electrode terminal 28 and a negative electrode terminal 30 that the base part 20 is penetrated by are provided for the sealing plate 18 as terminal members. The positive electrode terminal 28 and the negative electrode terminal 30 are fixed in the base part 20, and insulated by the base part 20. A current collector plate 32 in a positive electrode side is provided between the positive electrode terminal 28 and the positive electrode part 12 of the battery element 4. A current collector plate 34 in a negative electrode side is provided between the negative electrode terminal 30 and the negative electrode part 14 of the battery element 4. An isolation distance 36 is provided between the current collector plates 32 and 34. This isolation distance 36 is an example of a second isolation distance that is set between the current collector plate 32 in the positive electrode side of the battery element 4 and the current collector plate 34 in the negative electrode side of the battery element 4. The current collector plate 32 is connected to the positive electrode part 12, and is also connected to the positive electrode terminal 28 by a welded connecting part 38 at their lateral sides. For example, laser welding or electron beam welding is used for the connection between the current collector plate 32 and the positive electrode terminal 28. Similarly, the current collector plate 34 is connected to the negative electrode part 14 by welding, and is also connected to the negative electrode terminal 30 by welding. That is, the positive electrode part 12 of the battery element 4 is connected to the positive electrode terminal 28 via the current collector plate 32, and the negative electrode part 14 of the battery element 4 is connected to the negative electrode terminal 30 via the current collector plate 34.

The battery element 4 is fixed to the sealing plate 18. The battery element 4 is also housed in the outer packaging case 8, is held between the sealing plate 18 and the bottom of the outer packaging case 8, and is fixed within the outer packaging case 8.

Figure 2:
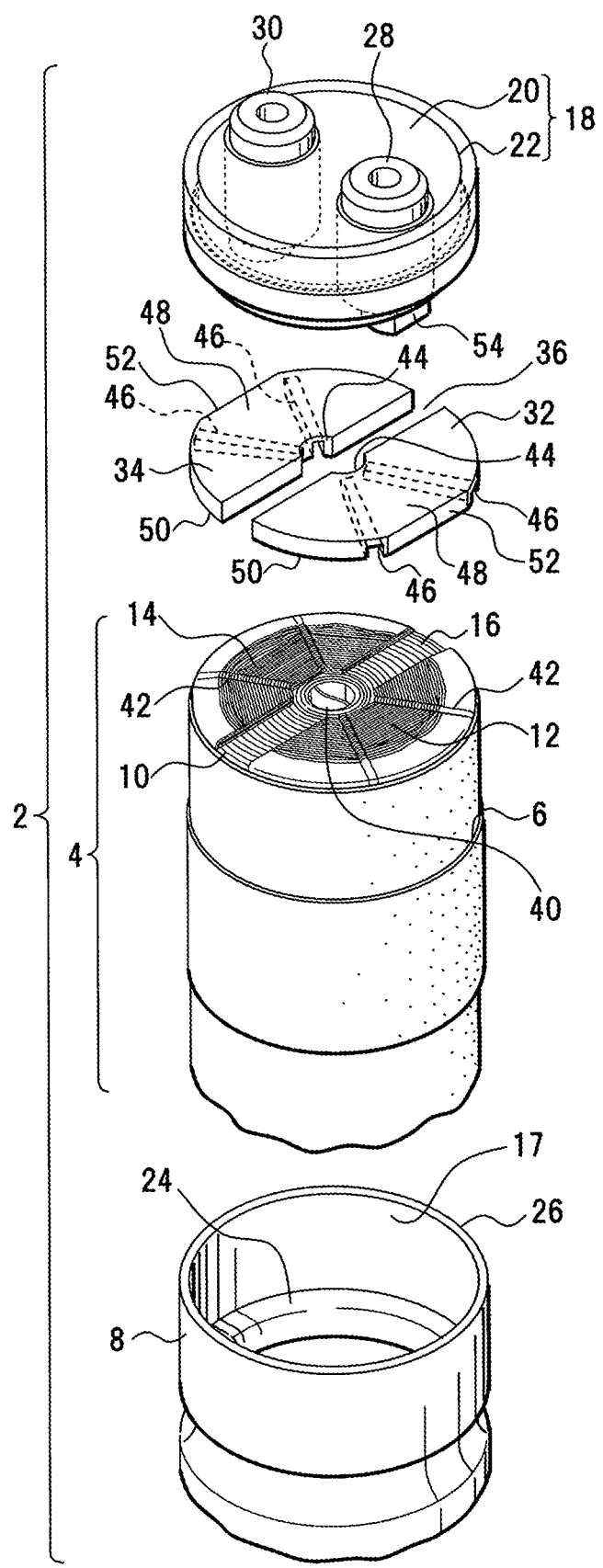
FIG. 2 is an exploded perspective view depicting the battery.

FIG. 2 will be referred to concerning each component of this battery 2. FIG. 2 is an exploded view depicting an example of the battery. The structure depicted in FIG. 2 is an example, and this embodiment is not limited to such a structure. The same portions as FIG. 1 are denoted by the same reference numerals.

For example, each of the positive electrode part 12 and negative electrode part 14 of the battery element 4 is equally divided by 60 degrees, is folded toward an element center 40, is compressed and is molded. This compression and molding forms projecting bars 42 on the positive electrode part 12 and negative electrode part 14. The projecting bars 42 are like radiating from the element center 40.

The current collector plates 32 and 34 are nearly semicircles. A semicircle notch 44 that corresponds to the element center 40 is formed in each current collector plates 32 and 34. Recesses 46 that extend from this notch 44 toward each rim of the current collector plates 32 and 34 are radially formed. The recesses 46 are an example of housing parts that house the above described projecting bars 42.

A terminal connection part 48 is provided for each of the current collector plates 32 and 34 as a first connection area that is arranged to be connected to the positive electrode terminal 28 and the negative electrode terminal 30. An element connection part 50 is formed on a location different from the terminal connection part 48, as a second connection area that is arranged to be connected to the positive electrode part 12 and the negative electrode part 14. The lateral surface of the terminal connection part 48 on each current collector plates 32 and 34 is formed into a first welded face 52 that is a side of each current collector plate 32 and 34 of the above described welded connecting parts 38.

The lateral surface of each of the positive electrode terminal 28 and negative electrode terminal 30 in the sealing plate 18 is formed into a second welded face 54 that is in a terminal side of each of the above described welded connecting parts 38. The welded faces 52 and 54 constitute the same plane. For example, the welded faces 52 and 54 are the same distance away from the element center 40 and constitute a flat plane in this embodiment.

Figure 3:
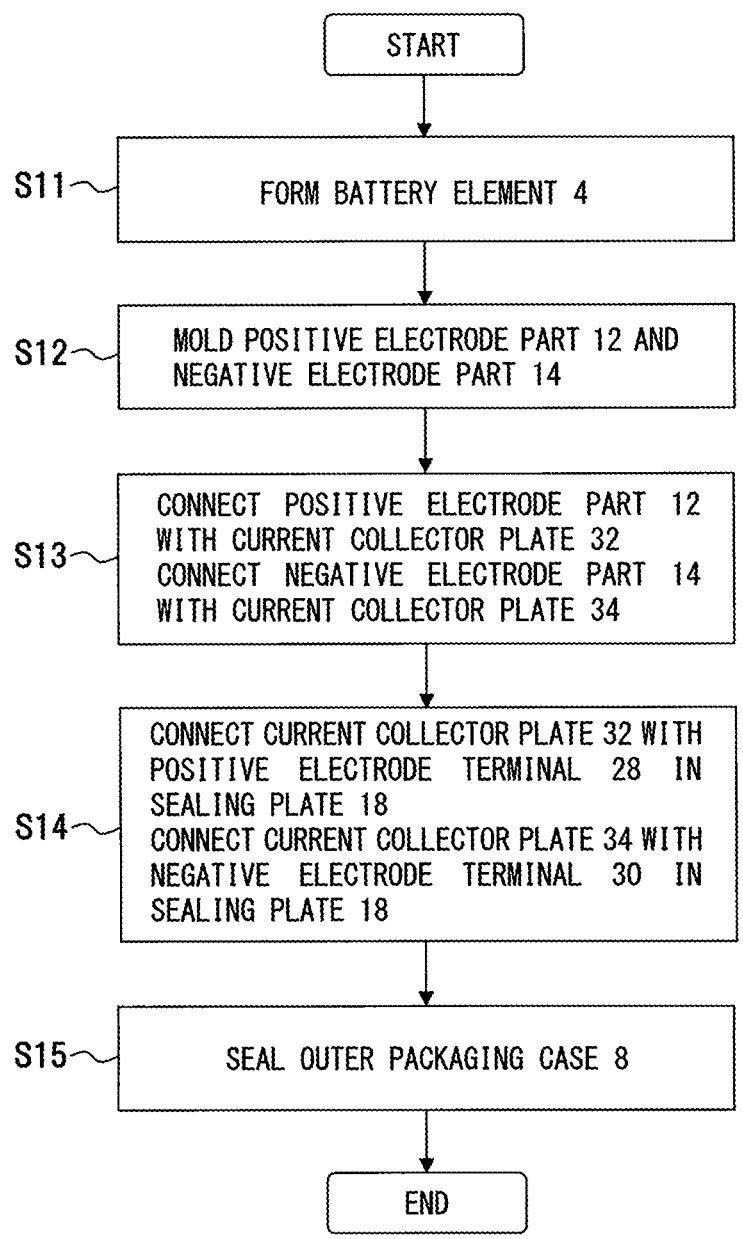
FIG. 3 is a flowchart depicting an example of steps for manufacturing the battery.

FIG. 3 will be referred to concerning a method for manufacturing this battery 2. FIG. 3 depicts an example of steps for manufacturing the battery.

Manufacturing steps depicted in FIG. 3 is an example of the method for manufacturing the electricity storage device of the present invention. For example, in these manufacturing steps, the battery element 4 is formed as an electricity storage element (step S11), the positive electrode part 12 and negative electrode part 14 of the battery element 4 are molded (step S12), the positive electrode part 12 is connected with the current collector plate 32, and the negative electrode part 14 is connected with the current collector plate 34 (step S13), the current collector plate 32 is connected with the positive electrode terminal 28, and the current collector plate 34 is connected with the negative electrode terminal 30 (step S14), and the battery element 4, which is shaped through the above steps, is housed into the outer packaging case 8, and the outer packaging case 8 is sealed (step S15).

[Forming Battery Element (Step S11)]

Figure 4:
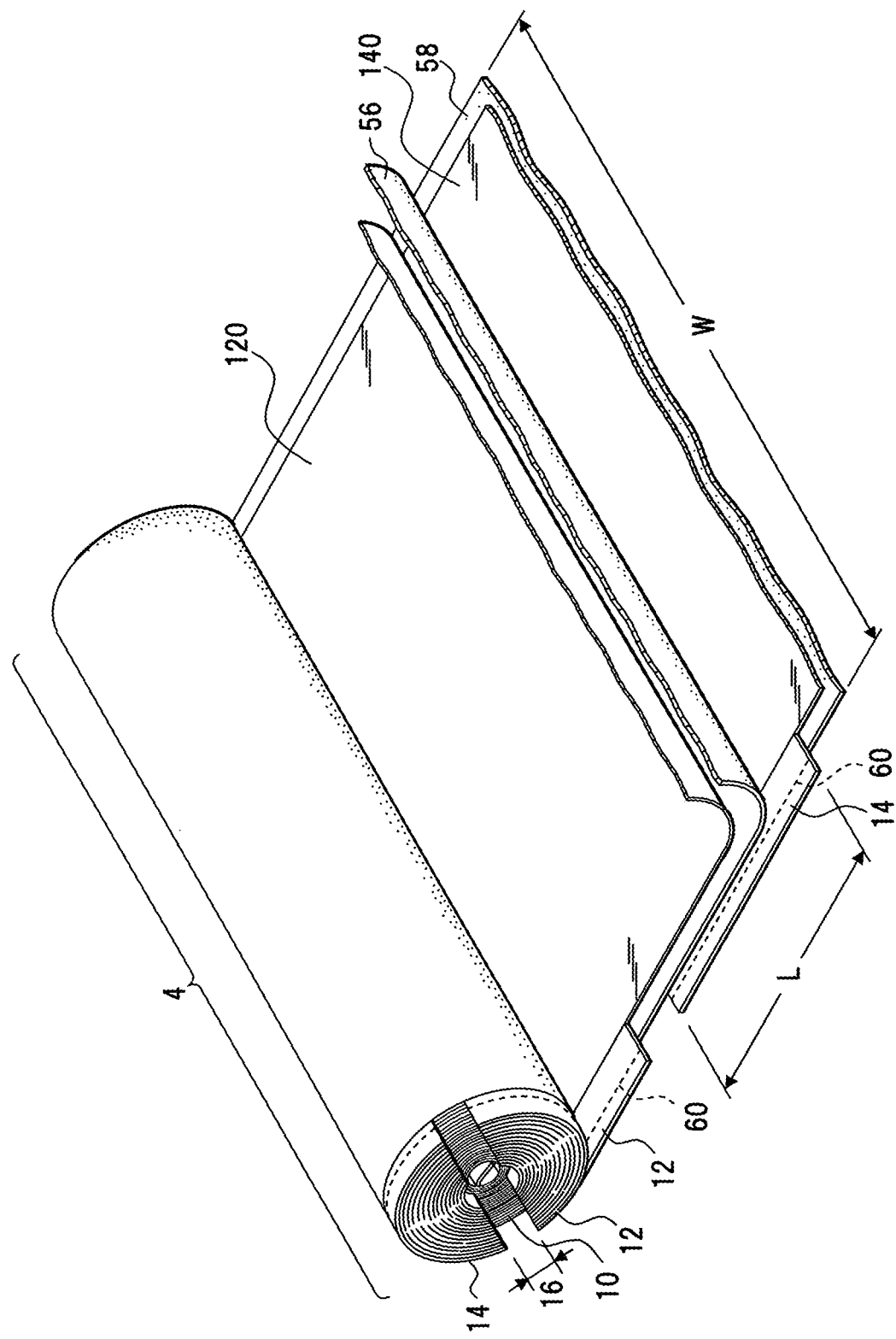
FIG. 4 is a perspective view depicting a partially exploded battery element.

FIG. 4 will be referred to concerning the battery element 4. FIG. 4 is a partially exploded view depicting an example of a structure of the battery element. The structure depicted in FIG. 4 is an example, and this embodiment is not limited to such a structure.

A winding element constitutes the battery element 4 depicted in FIG. 4, For example, the battery element 4 has a current collector 120 for a positive electrode side as a positive electrode, a current collector 140 for a negative electrode side as a negative electrode, and separators 56 and 58. The battery element 4 constitutes a cylindrical winding element with the separators 56 and 58 inserted between the current collectors 120 and 140. An electrode material is used for a base material of current collectors 120 and 140. For example, a positive electrode body including lithium titanate and a negative electrode body including a carbon material that occludes and emits lithium are formed on both sides of each current collector plate, respectively.

As to this battery element 4, the isolation distance 16 of constant width is formed between the positive electrode part 12 and the negative electrode part 14, which are formed in the same element end-face 10 side. Each substrate of the current collectors is formed into the positive electrode part 12 and the negative electrode part 14. No electrode is formed on the positive electrode part 12 and the negative electrode part 14. Portions where the positive electrode part 12 and the negative electrode part 14 are formed are set wider than width W of the separators 56 and 58, which are insulation means, and are formed to have length L that is as long as the length of each arc of the positive electrode part 12 and the negative electrode part 14. A fold 60 that is parallel to the element end-face 10 is formed on each positive electrode part 12 and negative electrode part 14 in order for the positive electrode part 12 and negative electrode part 14 to be folded on the element end-face 10.

[Molding Positive Electrode Part and Negative Electrode Part (Step S12)]

Figure 5:
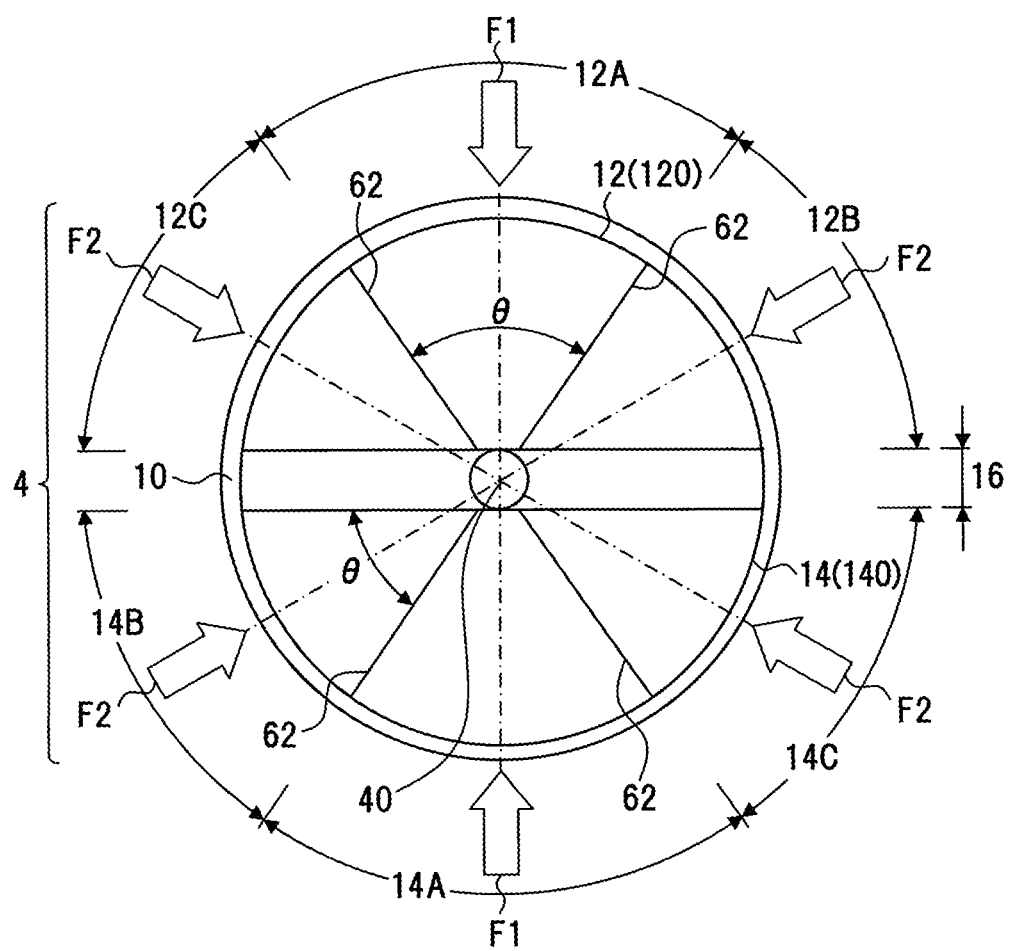
FIG. 5 depicts an end-face of the battery element.

FIG. 5 will be referred to concerning molding of the positive electrode part 12 and the negative electrode part 14. FIG. 5 depicts the element end-face of the battery element.

The positive electrode part 12 and the negative electrode part 14 before molding are cylinders of the current collectors 120 and 140, which are protruded on the element end-face 10 of the battery element 4, and the current collectors 120 and 140 are divided by dividing lines 62 at every certain angle θ, for example, 60 (degrees) as depicted in FIG. 5. Thereby, the current collector 120 is treated as divided parts 12A, 12B and 12C, and the current collector 140 is treated as divided parts 14A, 14B and 14C.

Pressures F1 are applied to this battery element 4 from the rims of the divided parts 12A and 14A, which are the centers among the divided parts 12A, 12B, 12C, 14A, 14B and 14C, toward the element center 40, and the divided parts 12A and 14A are pushed down, are compressed and are molded in the orthogonal direction of the element end-face 10. After this molding process, pressures F2 are applied to the rest of the divided parts 12B, 12C, 14B and 14C from the rims of the divided parts 12B, 12C, 14B and 14C toward the element center 40, and the divided parts 12B, 12C, 14B and 14C are pushed down, are compressed and are molded in the orthogonal direction of the element end-face 10. Thereby, the projecting bars 42 (FIG. 2) are radially formed along the boundaries between the divided part 12A and each divided part 12B and 12C. The projecting bars 42 extend from the element center 40 to the rim of the battery element 4 along portions where the current collector 120 is superposed on itself. Similarly, the projecting bars 42 (FIG. 2) are radially formed along the boundaries between the divided part 14A and each divided part 14B and 14C.

Through this molding process, the positive electrode part 12 and the negative electrode part 14 are formed on the element end-face 10 of the battery element 4. Each positive electrode part 12 and negative electrode part 14 has the form of being divided by a plurality of the projecting bars 42.

When the positive electrode part 12 and the negative electrode part 14 are compressed and molded toward the element center 40, the size of height is adjusted. In this process, for example, cuts are made in the positive electrode part 12 and negative electrode part 14 along the dividing lines 62. The size of the height of the projecting bars 42, which are linear and are generated by the superposition, is adjusted by the compression and molding of the divided parts 12A and 14A and the compression and molding of both sides next to the divided parts 12A and 14A in order.

[Connecting Either Positive Electrode Part or Negative Electrode Part with Current Collector Plate (Step S13)]

Figure 6:
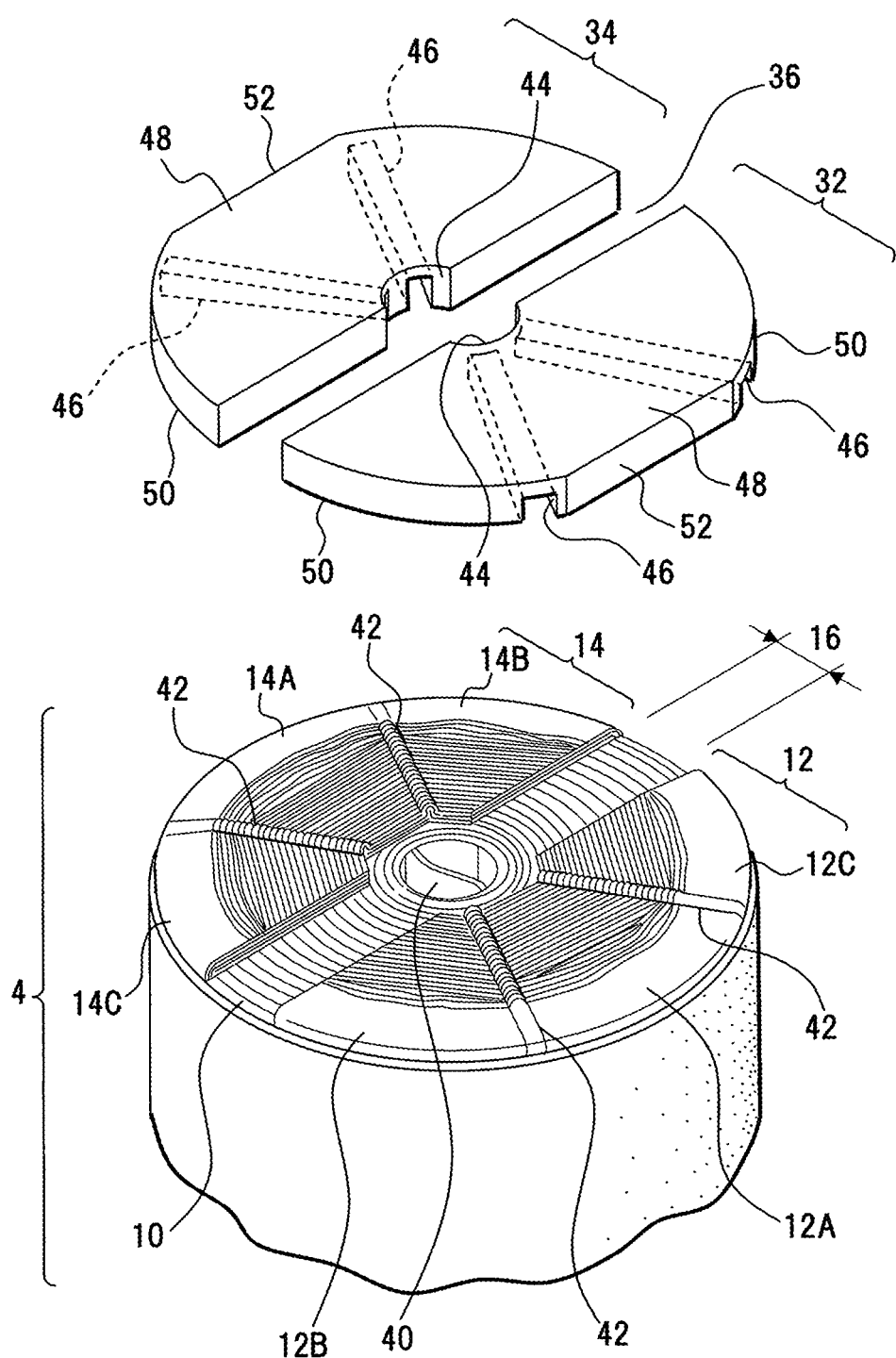
FIG. 6 is a perspective view depicting the end-face of the battery element and current collector plates.

FIG. 6 will be referred to concerning the connection of either the positive electrode part 12 or the negative electrode part 14 with the current collector plate. FIG. 6 depicts the end-face of the battery element and the current collector plates.

As depicted in FIG. 6, the current collector plates 32 and 34 are the same shape. Each of the current collector plates 32 and 34 is formed into a semicircular shape that divides the element end-face 10, which constitutes the end-face of the electricity storage element, into two. The recesses 46, which house the above described projecting bars 42, are radially formed on the bottom surfaces of the current collector plates 32 and 34. The current collector plates 32 and 34 can be installed horizontally on the positive electrode part 12 and the negative electrode part 14, which are compressed flat and evened, that is, can be installed parallel to and in a state of adhering to the element end-face 10 because the recesses 46 house the projecting bars 42 on the element end-face 10 of the battery element 4.

The terminal connection part 48 is set on the area between the recesses 46 on the top surface of each current collector plate 32 and 34. The element connection part 50 is set on each area between the recess 46 and the edge on the bottom surface of each current collector plate 32 and 34. The positive electrode terminal 28 (FIG. 2) is connected to the terminal connection part 48 of the current collector plate 32. The negative electrode terminal 30 (FIG. 2) is connected to the terminal connection part 48 of the current collector plate 34. The above described divided parts 12B and 12C of the positive electrode part 12 are connected to the element connection parts 50 of the current collector plate 32. The above described divided parts 14B and 14C of the negative electrode part 14 are connected to the element connection parts 50 of the current collector plate 34.

Figure 7:
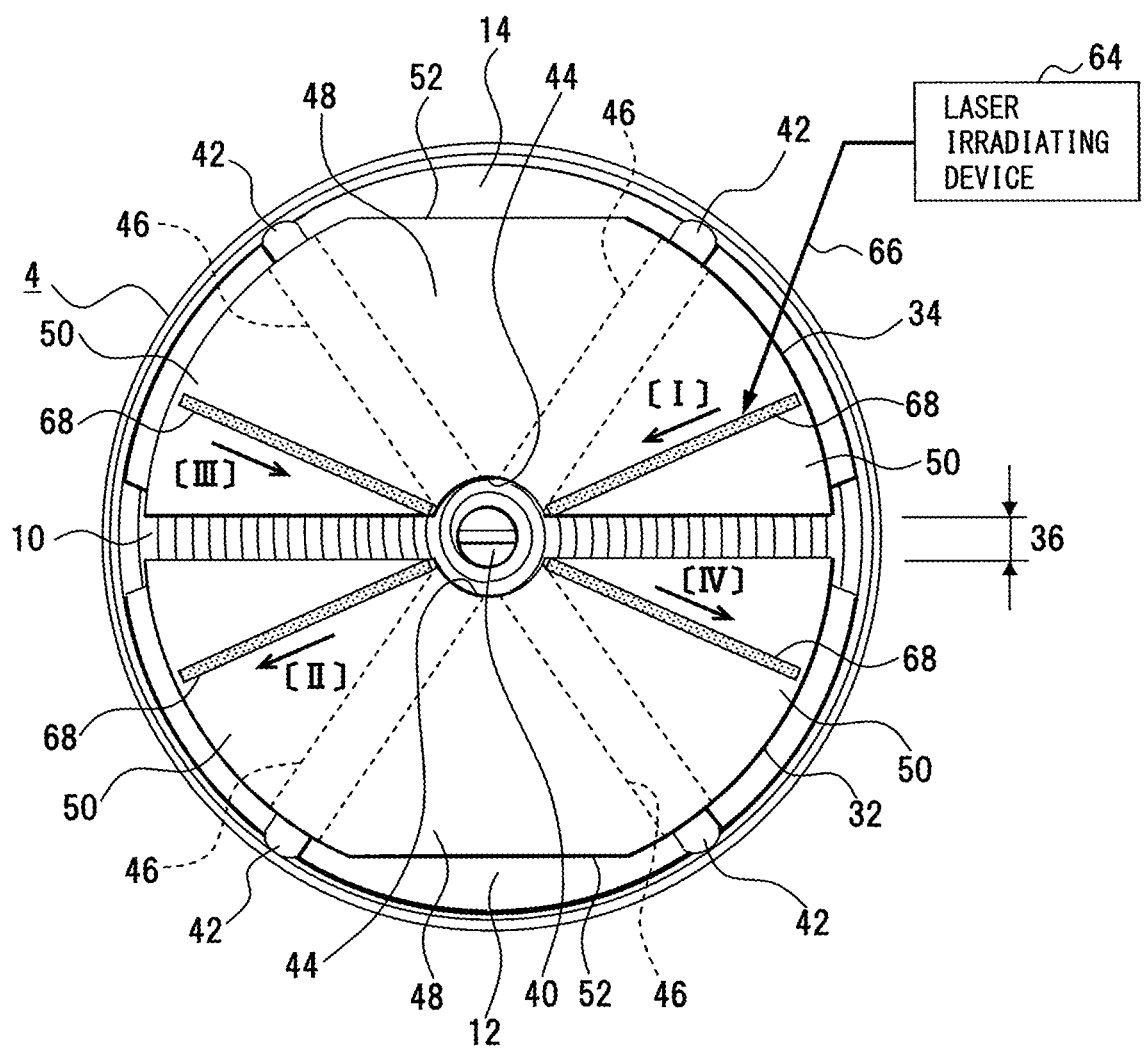
FIG. 7 depicts an example of a process of connecting the battery element and the current collector plates.

FIG. 7 will be referred to concerning this connection between either the positive electrode part 12 or the negative electrode part 14, and the current collector plate. FIG. 7 depicts a battery element where current collector plates are installed.

As depicted in FIG. 7, the recesses 46 on the current collector plates 32 and 34 house the projecting bars 42 on the positive electrode part 12 and negative electrode part 14. In the installation of the current collector plates 32 and 34, the current collector plates 32 and 34 are arranged on the positive electrode part 12 and the negative electrode part 14, and are pressed on the element end-face 10. The element connection parts 50 can adhere to the positive electrode part 12 and the negative electrode part 14 because the recesses 46 on the current collector plates 32 and 34 house the projecting bars 42, and moreover, the positive electrode part 12 and the negative electrode part 14 are evenly compressed and molded.

While this state being maintained, for example, laser irradiation 66 from a laser irradiating device 64 is performed on the element connection parts 50 of the current collector plates 32 and 34. Thus, the positive electrode part 12 is molten and connected to the element connection parts 50 of the current collector plate 32, and the negative electrode part 14 is molten and connected to the element connection parts 50 of the current collector plate 34. As to the positional relationship between the laser irradiating device 64 and the element connection parts 50 on the current collector plates 32 and 34, the laser irradiation 66 from the laser irradiating device 64 may be moved for a scan, or the battery element 4 including the current collector plates 32 and 34 may be moved for a scan.

Upon the laser irradiation 66, laser irradiated locations 68 are set on the element connection parts 50 of the current collector plates 32 and 34 as an example of weld lines. The laser irradiated locations 68 are linear, and extend from the element center 40 toward the rims of the current collector plates 32 and 34. The laser irradiated locations 68 in this embodiment are two parts each of which is on the element connection parts 50, which are both ends separated by the recesses 46, on each of the current collector plates 32 and 34.

The laser irradiation 66 is performed on the irradiated locations 68 depicted in FIG. 7 in the direction of arrows [I], [II], [III] and [IV] and in order of [I], [II], [III] and [IV].

As to the irradiated location 68 that is referred to by the arrow [I], the laser irradiation 66 from the side of the outer circumference of the battery element 4 toward the element center 40 is linearly performed on one current collector plate 34.

As to the irradiated location 68 that is referred to by the arrow [II], the laser irradiation 66 from the side of the element center 40 toward the outer circumference of the battery element 4 is performed on the other current collector plate 32, which faces the current collector plate 34 across the element center 40.

As to the irradiated location 68 that is referred to by the arrow [III], the laser irradiation 66 from the side of the outer circumference of the battery element 4 toward the element center 40 is linearly performed on one current collector plate 34.

As to the irradiated location 68 that is referred to by the arrow [IV], the laser irradiation 66 from the side of the element center 40 toward the outer circumference of the battery element 4 is linearly performed on the other current collector plate 32, which faces the current collector plate 34 across the element center 40.

A series of the processes for linearly performing the laser irradiation 66 across the element center 40 like the above connects the positive electrode part 12 with the element connection parts 50 on the current collector plate 32, and connects the negative electrode part 14 with the element connection parts 50 on the current collector plate 34 via melting by the laser irradiation 66.

A series of the operations of the laser irradiation on [I] and [II] may be repeated twice. Or, a series of the operations of the laser irradiation on [I] to [IV] may be repeated twice. Also, two parallel lines of each laser irradiated location 68 may be set as an example of plural weld lines. Such multiple laser irradiation 66 can reduce the connection resistance more. The scanning direction of the laser irradiation 66 may be as the above described [I] and [II], or may be from the side of the element center 40 toward the outer circumference of the element. The scan may be not only a sequential scan like the above described [I] and [II], but also an individual scan.

The scan of the laser irradiation 66 on [I] to [IV] may be performed on [I] to [IV] and then on [I] to [IV] again. The laser irradiation may not be performed sequentially on the same portion. Thereby, time intervals can be given for the laser irradiation 66 on the laser irradiated locations 68, the laser irradiated locations 68 can be cooled, and the connection by laser welding can be stabilized.

The laser irradiation 66 may be sequentially performed while intervals for cooling are taken by the laser irradiation 66 performed on the same laser irradiated location 68 plural times with time intervals provided. This can shorten time for welding by the laser irradiation 66.

[Connecting Current Collector Plate with Either Positive Electrode Terminal or Negative Electrode Terminal (Step S14)]

Figure 8:
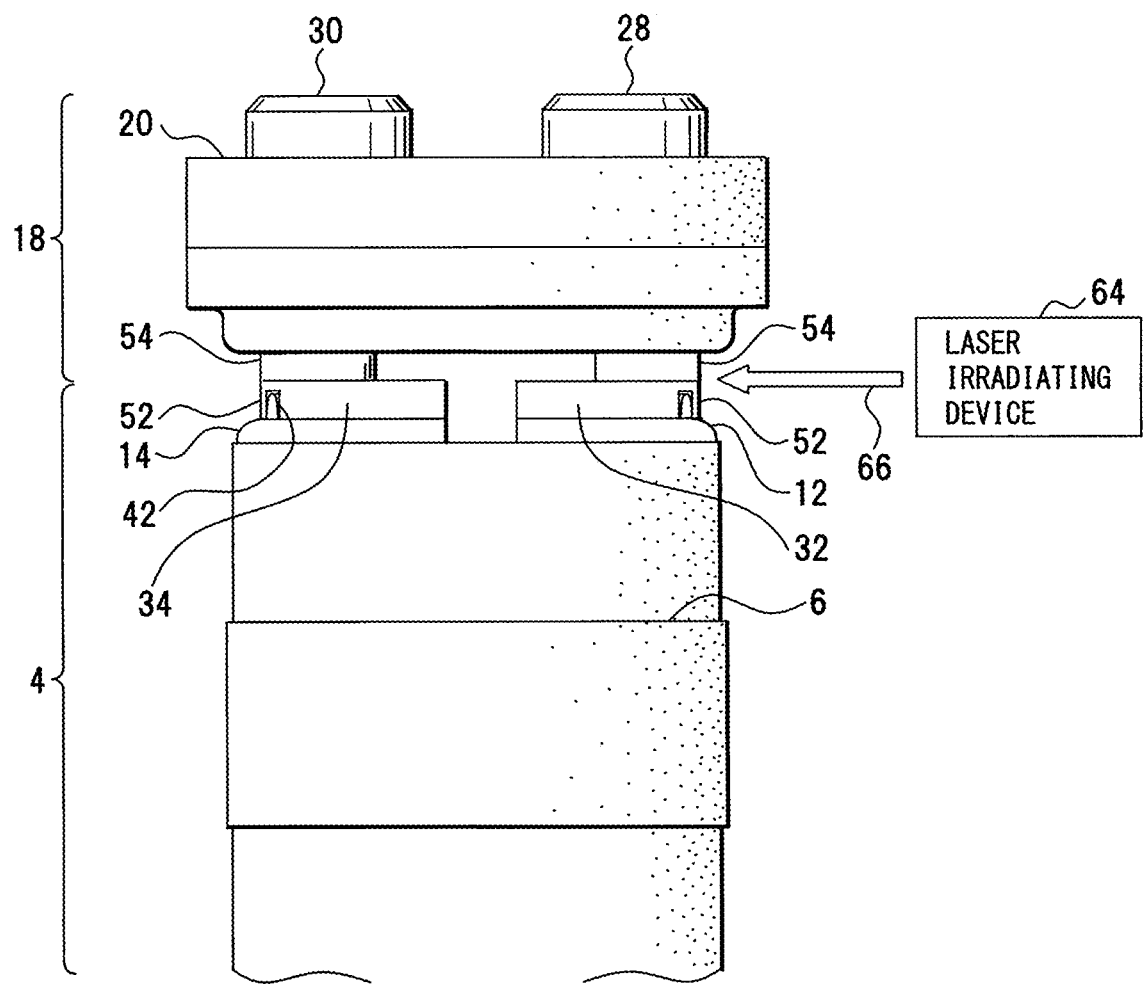
FIG. 8 depicts an example of a process of connecting external terminals and the current collector plates.
Figure 9:
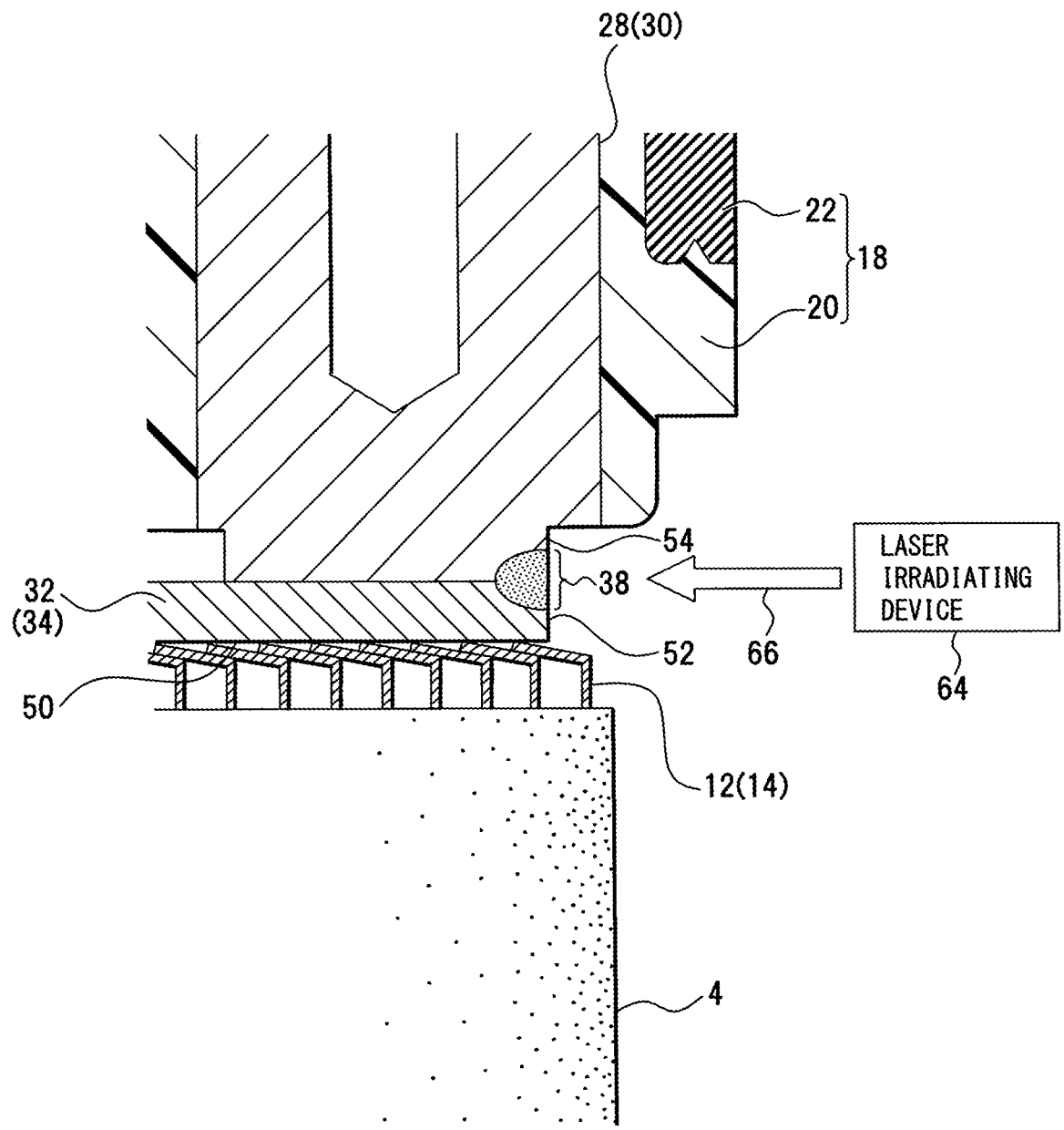
FIG. 9 depicts a connection state of the current collector plates and the external terminals.

FIGS. 8 and 9 will be referred to concerning the connection between a current collector plate with either the positive electrode terminal or the negative electrode terminal FIGS. 8 and 9 depict the connection between a current collector plate with either the positive electrode terminal or the negative electrode terminal The sealing plate 18, which is already formed, is used for this connection. For this sealing plate 18, the base part 20 is molded with insulating synthetic resin, and the positive electrode terminal 28 and the negative electrode terminal 30 are molded by insert molding when this base part 20 is molded as depicted in FIG. 2. In this case, the sealing part 22 may be joined to the base part 20. Alternatively, the sealing part 22 may be installed in the base part 20 after the base part 20 connects to the current collector plates 32 and 34.

As depicted in FIG. 8, for the connection between the positive electrode terminal 28 and negative electrode terminal 30 in this sealing plate 18 and the current collector plates 32 and 34, respectively, the positive electrode terminal 28 in the sealing plate 18 is put and positioned on the current collector plate 32, which is connected to the battery element 4, and the negative electrode terminal 30 in the sealing plate 18 is put and positioned on the current collector plate 34. The welded face 52 on the current collector plate 32 and the welded face 54 on the positive electrode terminal 28 are made to be the same plane. Similarly, the welded face 52 on the current collector plate 34 and the welded face 54 on the negative electrode terminal 30 are made to be the same plane. The laser irradiation 66 from the laser irradiating device 64 is performed across these welded faces 52 and 54, and as depicted in FIG. 9, the welded faces 52 and 54 are molten and connected. For example, not only laser welding but also electron beam welding may be used for this connection between the positive electrode terminal 28 and negative electrode terminal 30, and the current collector plates 32 and 34, respectively.

As a result, the positive electrode terminal 28 and the negative electrode terminal 30 in the sealing plate 18 are connected to the element end-face 10 of the battery element 4 via the current collector plates 32 and 34. Thus, the battery element 4 and the sealing plate 18 can be unified.

While the welded faces 52 and 54 are made to be the same plane, and the laser irradiation 66 is performed thereacross, it is preferable that these welded faces 52 and 54 make the same plane without any crack therebetween. However, the welded faces 52 and 54 are not limited to this, and a crack of approximately 1 mm may exist therebetween. The welded faces 52 and 54 may be inclined faces (taper faces).

[Encapsulating Battery Element and Sealing Outer Packing Case (Step S15)]

The battery element 4 is impregnated with an electrolyte. As depicted in FIG. 1, the battery element 4 is housed in the outer packaging case 8. The sealing plate 18, which is inserted into the buttery element 4, is positioned on the fastening step 24, which is already formed in the outer packaging case 8 by cramping process. The opening end 26 of this outer packaging case 8 is sealed by curling process, and the battery 2, which is a product, is completed.

Features and advantages of the battery 2 of the first embodiment described above will be listed as follows.

(1) The predetermined isolation distance 16 is provided between the positive electrode part 12 and the negative electrode part 14 by the protruding portions of the current collectors 120 and 140. This isolation distance 16 and the protruding length of the current collectors 120 and 140 may be set so that the positive electrode part 12 does not touch the negative electrode part 14 when the protruding portions of the current collectors 120 and 140 are compressed and molded toward the element center 40. The protruding portions of the current collectors 120 and 140 for forming the positive electrode part 12 and the negative electrode part 14 may be omitted in the vicinity of the element center 40 of the battery element 4, which constitutes the electricity storage element.

(2) The more portions (or the larger areas) where the positive electrode part 12 and the negative electrode part 14 are formed, the less the resistance is. Thus, the isolation distance 16 that enables the positive electrode part 12 and the negative electrode part 14 to be prevented from short-circuiting and enables the resistance to be reduced, may be optimally the range of 3 mm to 10 mm, for example.

(3) For example, insulating tape may be wound around the outer circumferential faces of the current collector plates 32 and 34 to provide insulation in order for the positive electrode part 12 and negative electrode part 14 to be prevented from touching the outer packaging case 8 even if there occurs slippage or the like on the outermost circumference of the battery element 4 when the positive electrode part 12 and negative electrode part 14 are compressed and molded. Or, an insulation ring or the like may be installed between each of the outer circumference faces of the current collector plates 32 and 34, and the outer packaging case 8 to provide insulation.

(4) Because the longer the connection distance between the battery element 4 and each positive electrode terminal 28 and negative electrode terminal 30 is, the more the internal resistance increases, the connection distance is greatly shortened and increase of the internal resistance is restricted by providing the current collector plates 32 and 34 and by laser welding. In detail, the current collector plates 32 and 34, which are connected to the positive electrode part 12 and negative electrode part 14 of the battery element 4, are thin metallic plates. The welded face 52 is formed on the lateral surface of each current collector plate 32 and 34, and the welded face 54 is formed on each positive electrode terminal 28 and negative electrode terminal 30. These welded faces 52 and 54 respectively constitute the same plane. The laser irradiation 66 is performed on each boundary between these welded faces 52 and 54, and the welded connecting part 38 is formed. Low resistance (ESR: Equivalent Series Resistance) is achieved.

(5) A small space is provided between the battery element 4 and the sealing plate 18. The battery element 4 and the sealing plate 18 are electrically connected by the current collector plates 32 and 34. Thus, the volume of the battery element 4 in the outer packaging case 8 is increased. And, the space (distance) between the battery element 4 and the sealing plate 18 is limited and the resistance is restricted. It is achieved to narrow the space (distance) between the battery element 4 and the sealing plate 18.

(6) The lateral surface of each positive electrode terminal 28 and negative electrode terminal 30 constitutes the welded face 52, and that of each current collector plate 32 and 34 on the battery element 4 constitutes the welded face 54. Each pair of the welded faces 52 and 54 forms the same plane. The laser irradiation 66 is locally performed on these parts and these parts are welded. Thus, the simplified connecting process and the strengthened connection parts are achieved. The optimal value, for example, within the range of 0.5 mm to 5 mm may be set for the thickness of the positive electrode terminal 28, the negative electrode terminal 30 and the current collector plates 32 and 34 (the size of the height of the welded faces 52 and 54), which meets the conditions that laser welding can be performed, the internal resistance is difficult to increase, and the size of the height of the battery 2 is reduced.

(7) The welded faces 52 and 54 are formed into flat faces by notch, for example. The welded faces 52 and 54 are not limited to flat faces however, and may be curved faces. The welded faces 52 and 54 just need to be the same plane regardless of whether to be flat or curved faces. These welded faces 52 and 54 are preferably installed in the vicinity of the outer circumferential face of the battery element 4 in order for excessive stress not to apply to other members (positive electrode part 12 and negative electrode part 14) when the laser irradiation 66 is performed. Specifically, the welded faces 52 and 54 may be installed within 10 mm of the outer circumferential face of the battery element 4, for example.

(8) As is in the above embodiment, the terminal connection part 48 (FIG. 7) horizontally differs from the element connection parts 50 on each current collector plate 32 and 34 in position. Thus, portions welded by laser are horizontally varied. Therefore, the stability of the connection by laser welding can be improved.

(9) The battery element 4 and each positive electrode terminal 28 and negative electrode terminal 30 are connected using the current collector plates 32 and 34. Thus, the simplification of the terminal connection is achieved, and the connection can be facilitated.

(10) The volume of the structure of the terminal connection in the space of the outer packaging case 8 can be reduced, and the volume of the battery element in the whole volume can be increased.

(11) The battery element 4 is firmly supported by the sealing plate 18, which is an outer packaging member. That is, the battery element 4 is firmly fixed to the positive electrode terminal 28 and the negative electrode terminal 30 by laser welding or electronic beam welding using the current collector plates 32 and 34. Thus, the strength of supporting the battery element 4 is improved (robustness is achieved). As a result, the mechanically robust supporting structure is made, and the shockproof of the product can be improved.

(12) The current collector 120 for the positive electrode side and the current collector 140 for the negative electrode side are parallelized by the current collector plate 32 and the current collector plate 34, respectively via laser welding. Thus, reduction of the resistance of the battery element 4 and the battery 2 can be achieved, and the product of low internal resistance can be offered.

(13) It is not necessary to connect tubs to the battery element 4 because the current collector plates 32 and 34 are used.

(14) According to the above described manufacturing steps, an electricity storage device such as the battery 2 can be easily manufactured, and the simplification of the terminal connecting steps can be achieved.

Second Embodiment

The second embodiment includes the structure of providing a connecting plate between an external terminal and a current collector plate as a terminal member.

Figure 10:
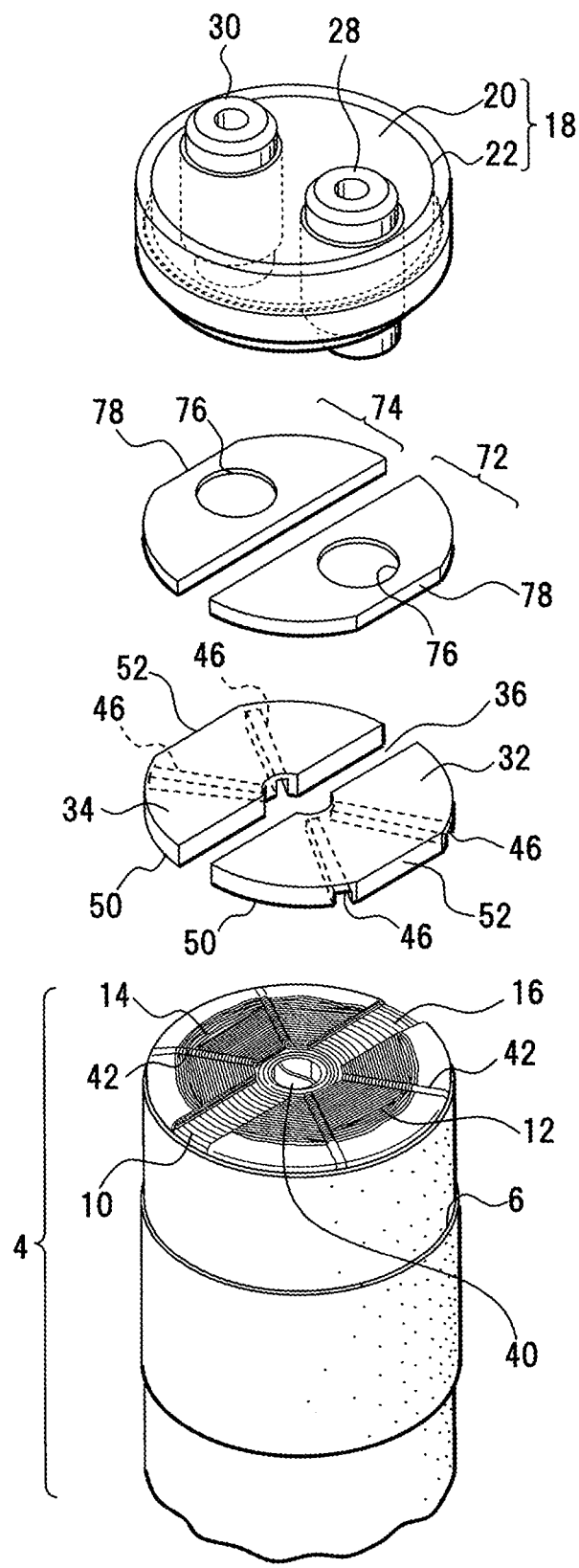
FIG. 10 is an exploded perspective view depicting a battery according to a second embodiment.
Figure 11:
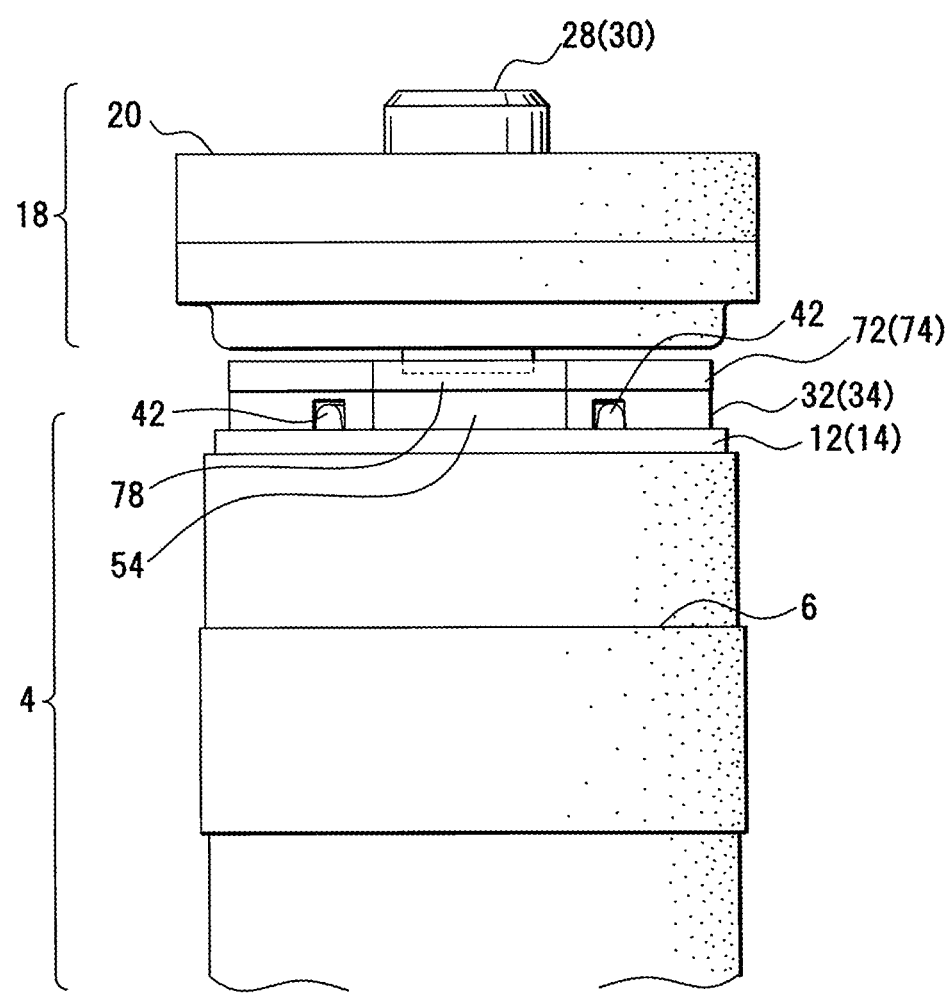
FIG. 11 depicts a connection structure of providing connecting plates.

FIGS. 10 and 11 will be referred to concerning the second embodiment. FIG. 10 depicts an exploded battery including connecting plates, and FIG. 11 depicts an example of a connection structure providing connecting plates. In FIGS. 10 and 11, the same portions as FIG. 2 are denoted by the same reference numerals.

In this second embodiment, as depicted in FIG. 10, a connecting plate 72 for the positive electrode side and a connecting plate 74 for the negative electrode side are provided as terminal members. A connection depression 76 that each of the positive electrode terminal 28 and negative electrode terminal 30 is connected to is formed on each of the connecting plates 72 and 74. The lateral surfaces of the connecting plates 72 and 74 are formed into third welded faces 78. In this embodiment, the positive electrode terminal 28 and the negative electrode terminal 30, which protrude from the bottom surface of the sealing plate 18, are circular cylindrical shapes, and the connection depressions 76 are formed so as to fit the end-faces of the positive electrode terminal 28 and the negative electrode terminal 30. However, the shape of each end-face is not limited to a circle. For example, the welded faces 78 are flat surfaces. Each welded face 52 of the current collector plates 32 and 34 is formed so as to be the same plane as each welded face 78 unlike the first embodiment. The rest of the structure is the same as the first embodiment.

As depicted in FIG. 11, the connecting plate 72, which is connected to the positive electrode terminal 28 by laser welding, and similarly, the connecting plate 74, which is connected to the negative electrode terminal 30 by laser welding, may be respectively superposed on the current collector plates 32 and 34, which are connected with the battery element 4, and the welded faces 52 and 78, which constitute the same planes in both sides, may be connected by laser welding.

In the structure using such connecting plates 72 and 74, the areas for the connection between the positive terminal 28 and the negative terminal 30, which are external terminals, and the current collector plates 32 and 34, which are connected to the battery element 4, respectively, are enlarged. Thus, the connection resistance can be reduced and even the connection strength can be improved.

Third Embodiment

The third embodiment includes the structure of differentiating an area of an electrode part that is connected to a current collector plate from that in the first embodiment.

Figure 12A:
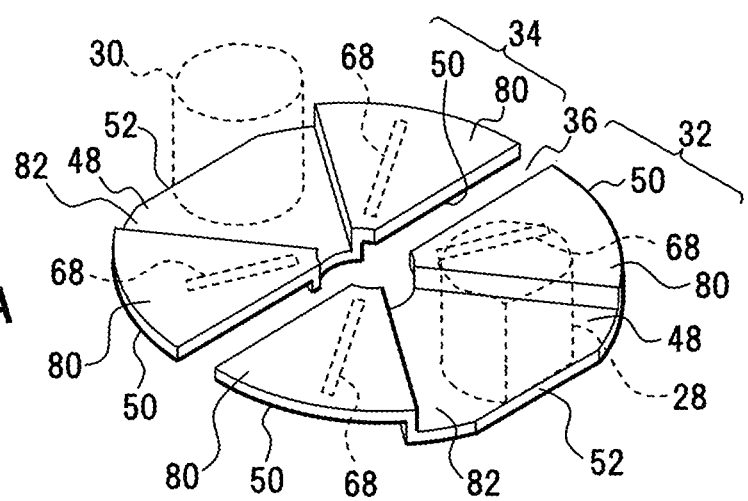
FIGS. 12A to 12C are perspective views depicting current collector plates, and electrode parts before and after molding according to a third embodiment.
Figure 12B:
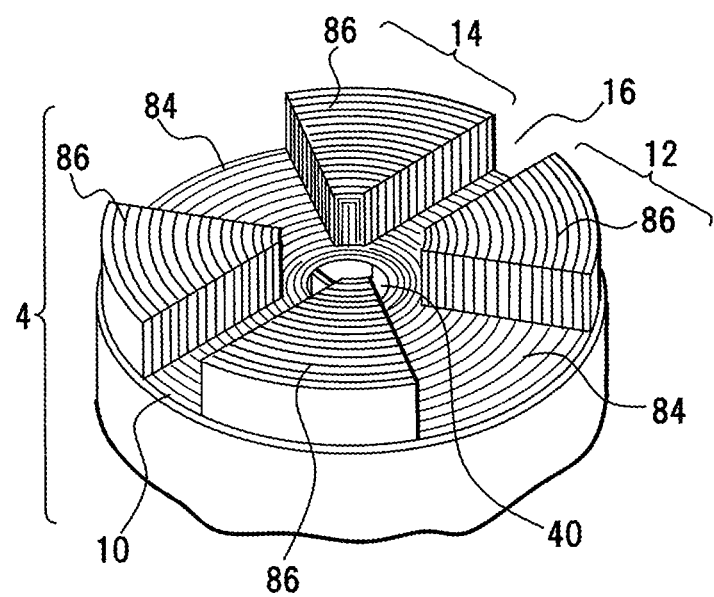
Figure 12C:
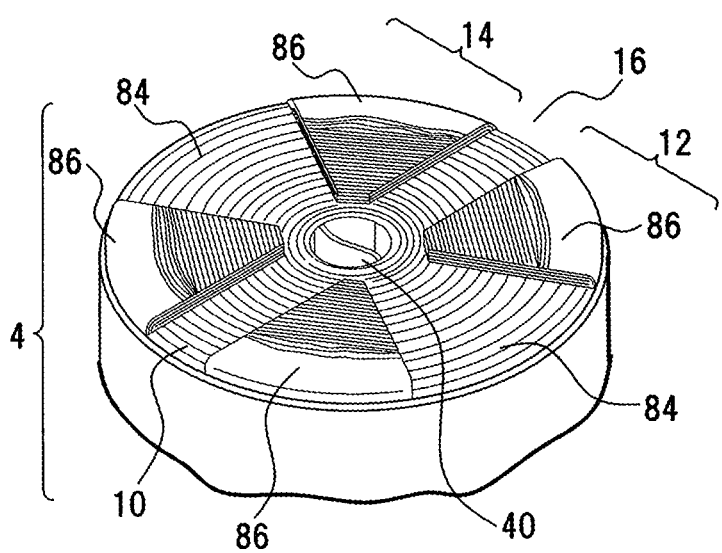

FIGS. 12A to 12C will be referred to concerning the third embodiment. FIGS. 12 A to 12C depict an example of current collector plates, and a positive electrode part and a negative electrode part of a battery element. In FIGS. 12A to 12C, the same portions as FIG. 2 are denoted by the same reference numerals.

In the first embodiment (FIG. 2), flattened rear faces of the current collector plates 32 and 34 are formed into the element connection parts 50. For example, as depicted in FIG. 12A, protruding faces 80 that are flat surfaces and that are parts of the current collector plates 32 and 34 protruded by 60 degrees in area, and a depression face 82 that is backed while held by the protruding faces 80 may be provided in the side of the external terminals of the battery element 4.

For example, as depicted in FIG. 12B, a depression 84 that is a sunken part of each positive electrode part 12 and negative electrode part 14 by 60 degrees in area, and protrusions 86 that protrude while holding this depression 84 are provided on the element end-face 10 of the battery element 4. The depression 84 may be a part where no positive electrode part 12 or negative electrode part 14 is formed. The protrusions 86 may be parts that are compressed and molded toward the center of the battery element 4. The protrusions 86 are compressed and molded toward the center of the battery element 4 as depicted in FIG. 12C. Like the above embodiments, the positive electrode part 12 and the negative electrode part 14 may be connected and unified with the current collector plate 32 and the current collector plate 34, respectively, by laser welding.

Forth Embodiment

The forth embodiment includes the structure of providing current collector plates that include terminal connection parts protruding toward the external terminals, and at least one electrode protrusion that is folded along a fold at a certain distance away from an element end-face over the end-face of a battery element that is an example of an electricity storage element.

Figure 13:
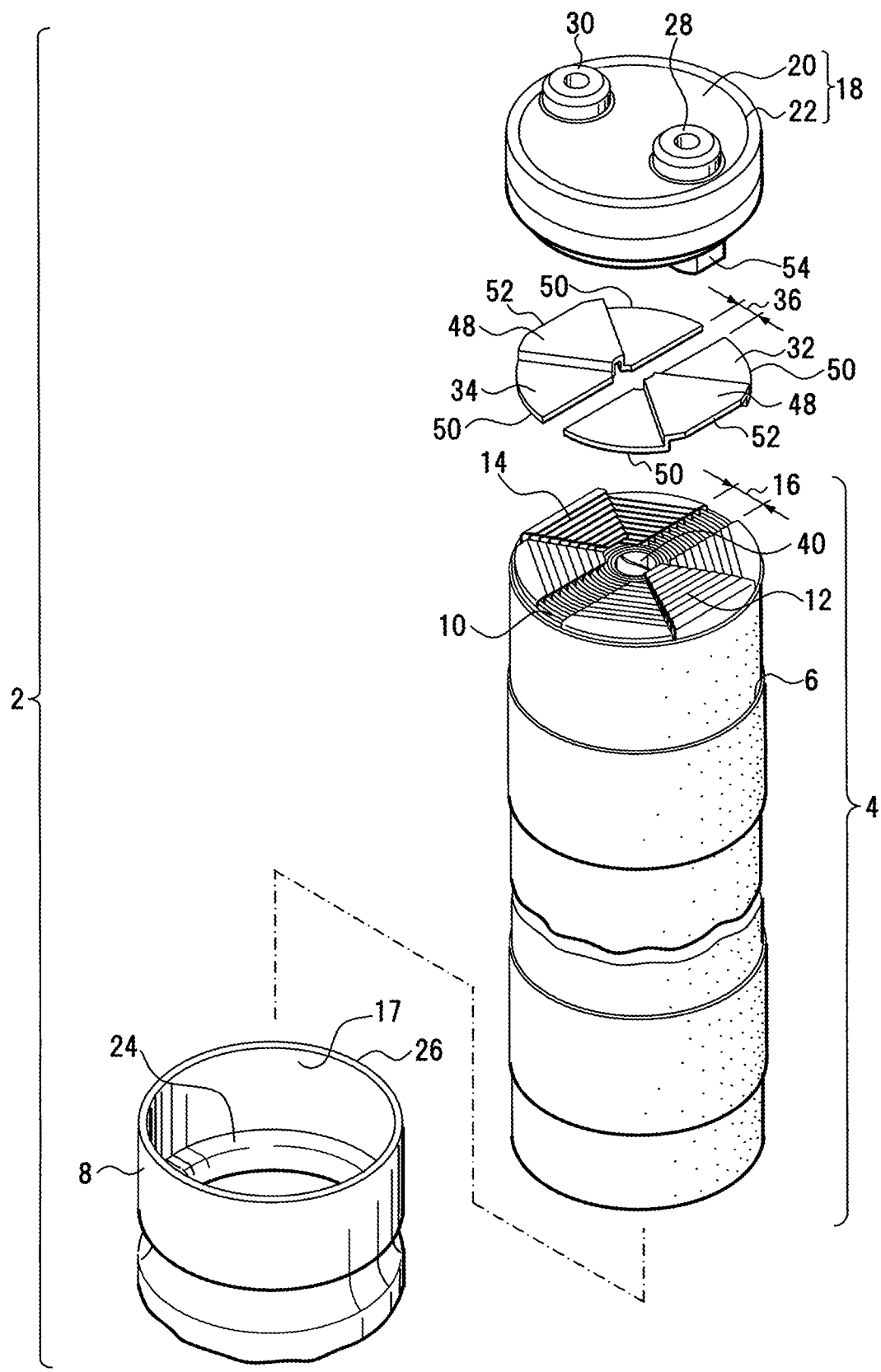
FIG. 13 is an exploded perspective view depicting a battery according to a fourth embodiment.

FIG. 13 will be referred to concerning a battery according to the fourth embodiment. FIG. 13 depicts an example of every component of the battery. In FIG. 13, the same portions as FIG. 2 are denoted by the same reference numerals.

As depicted in FIG. 13, the terminal connection parts 48, which are connected to the positive electrode terminal 28 and the negative electrode terminal 30, are sectors, and protrude from the rare faces of the current collector plates 32 and 34. The positive electrode part 12 and the negative electrode part 14 are formed on the same element end-face 10 of the battery element 4 with the isolation distance 16 provided.

Figure 15:
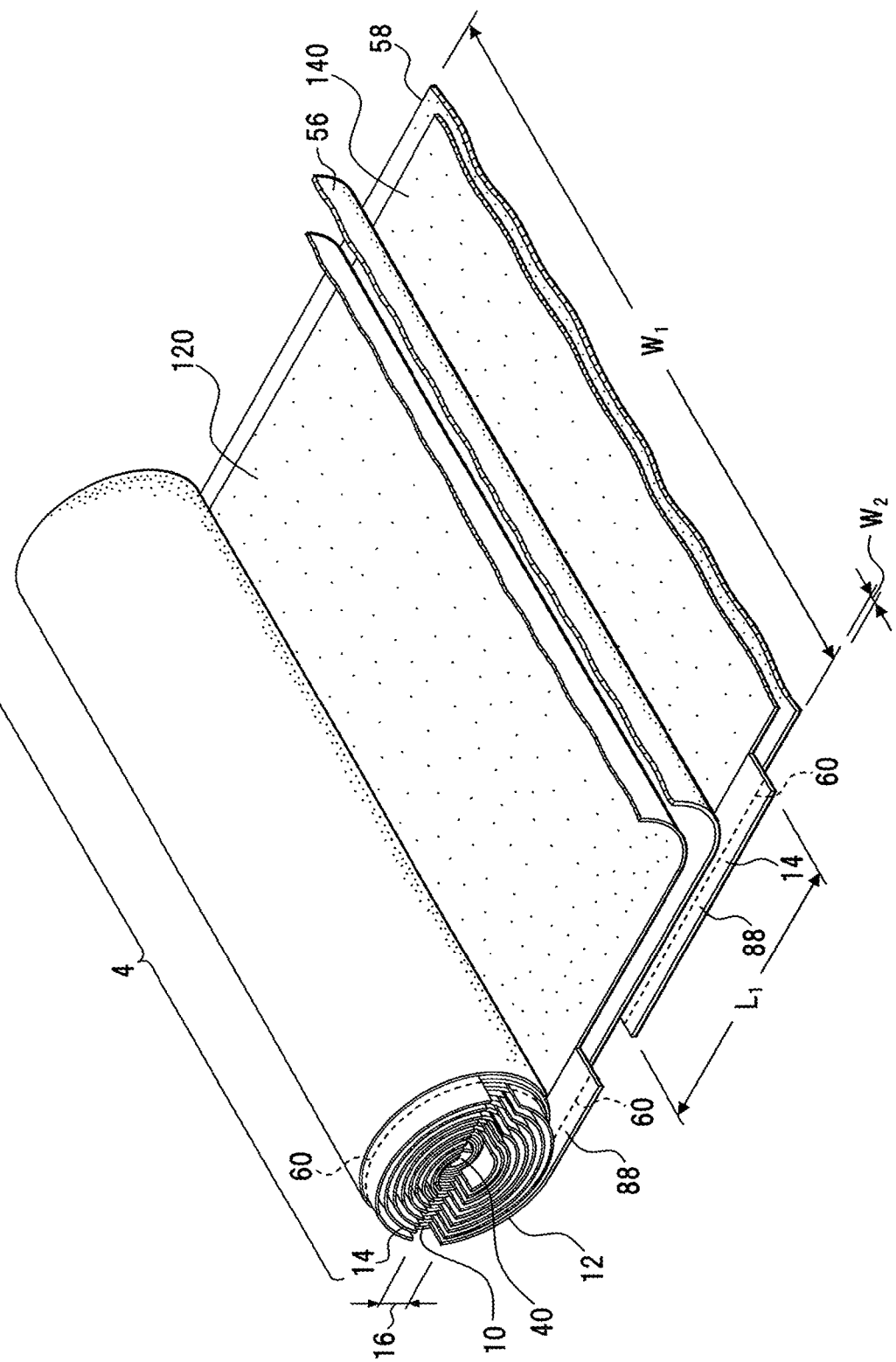
FIG. 15 is a perspective view depicting the battery element, which is exploded.

FIGS. 14A to 14D and 15 will be referred to concerning forming the battery element 4, the positive electrode part 12 and the negative electrode part 14. FIGS. 14A to 14D depict an example of either current collector plate, and FIG. 15 depicts a battery element. In FIGS. 14A to 14D and 15, the same portions as FIG. 2 are denoted by the same reference numerals.

An uncoated part 88 that is an electrode protrusion of each of the current collector 120 for the positive electrode side and the current collector 140 for the negative electrode side is formed into each positive electrode part 12 and negative electrode part 14.

For example, aluminum foil is used for a base material 90 of each positive electrode part 12 and negative electrode part 14. The base material 90 has a sash-shaped body of constant width. A polarized electrode 92 that includes an active material such as activated carbon and a binding agent is formed on both sides of the base material 90 as depicted in FIG. 14A. When the polarized electrode 92 is formed, one edge of the base material 90 is formed into the uncoated part 88 of constant width. This uncoated part 88 is a portion where the polarized electrode 92 is not formed. This uncoated part 88 is the above described electrode protrusion. This uncoated part 88 forms each positive electrode part 12 and negative electrode part 14.

As depicted in FIG. 14B, the fold 60, which has constant width and forms the edge, is formed on the uncoated part 88. This fold 60 is not a scratch but a marking-off line (fold line), and can prevent buckling when either positive electrode part 12 or negative electrode part 14 is folded. This fold 60 is a groove. The cross-sectional shape of the fold 60 may be a triangle, rectangle, or curved. For example, pressing, a laser and cutting are listed as a method for forming this fold 60. While only one fold 60 can be made as depicted in FIG. 14B, a plurality of folds 60 may be formed in view of the size of the uncoated part 88. Also, the fold 60 may be formed on either one side or both sides.

In forming of this electrode part, as depicted in FIG. 14C, a plurality of parts of the positive electrode part 12 (88), which have different width, are formed on the current collector 120, and as depicted in FIG. 14D, a plurality of parts of the negative electrode part 14 (88), which have different width, are formed on the current collector 140. The parts of the positive electrode part 12 are formed at different intervals in order to be taken out from the element end-face 10 of the battery element 4 every half a wind. The parts of the negative electrode part 14 are also taken out from the element end-face 10 of the battery element 4 every half a wind. In addition, the above described isolation distance 16 is set between each part of the positive electrode part 12 and the negative electrode part 14. The fold 60 is formed on each part of the positive electrode part 12 and the negative electrode part 14.

As depicted in FIG. 15, the battery element 4, which is a wound element, is formed by the current collectors 120 and 140 wound around a rod that is not depicted with the separators 56 and 58 interposed. The parts of the positive electrode part 12 and the negative electrode part 14 are formed on the element end-face 10, which is one end-face of the battery element 4, every half a wind.

The positive electrode part 12 and the negative electrode part 14 have forms of protruding from the separators 56 and 58 of width $W_1$, which are insulation means. Each part of the positive electrode part 12 and the negative electrode part 14 is formed so as to have length $L_1$ that is as long as the length of the arc of thereof. The fold 60 is formed on each part of the positive electrode part 12 and negative electrode part 14 along each position that is predetermined width $W_2$ away from the element end-face 10. The edges of the separators 56 and 58, which are exposed to an end-face of the battery element 4, are formed into the element end-face 10. The fold 60 is formed so that the side facing the element center 40 of the element end-face 10 is inside when folded. The size of the predetermined width $W_2$, which is distance away from the element end-face 10, is preferably equal to or over 0.5 mm. The fold 60, which is formed along such a position as the predetermined width $W_2$ away from the edge of the separators of the element end-face 10, reduces mechanical stress applied to the separators 56 and 58 when the positive electrode part 12 and the negative electrode part 14 are folded, and prevents a short circuit due to the contact with either the current collector 120 or 140. The size of the protruding length of the positive electrode part 12 and negative electrode part 14 from the element end-face 10 is preferably 3 mm to 10 mm.

Figure 16A:
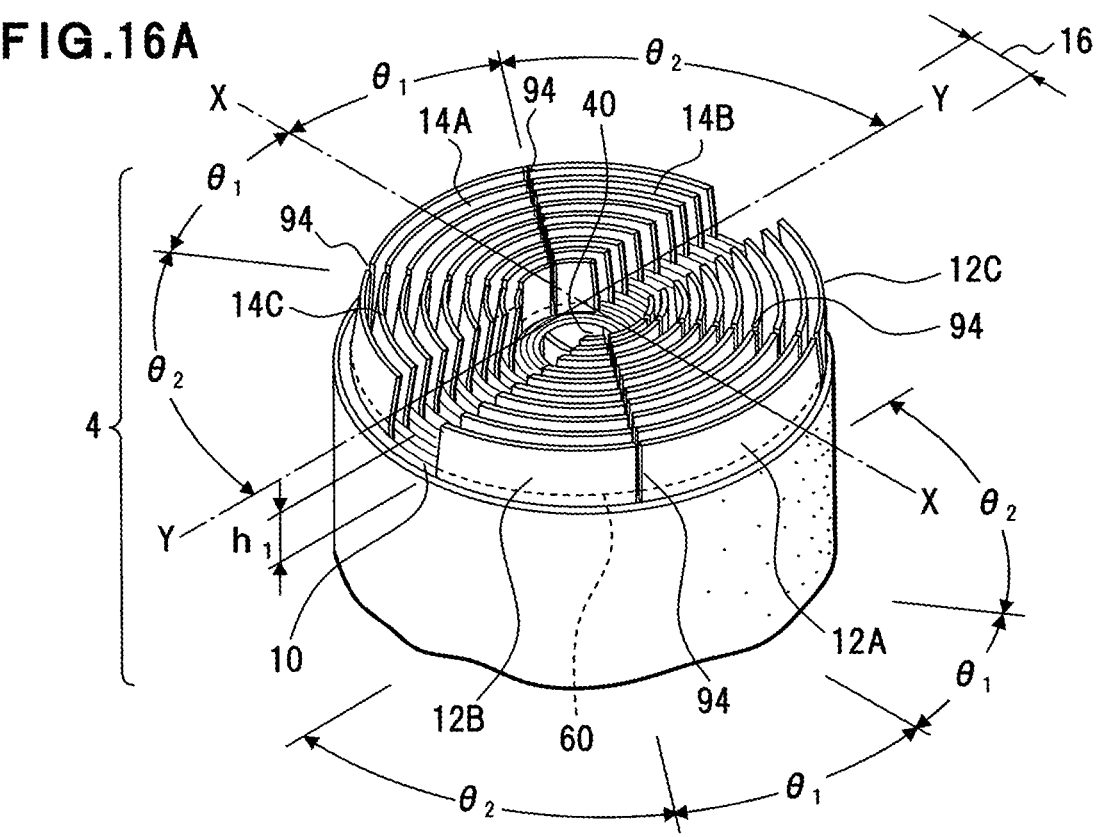
FIGS. 16A and 16B are perspective views depicting an example of electrode parts before and after molding.
Figure 16B:
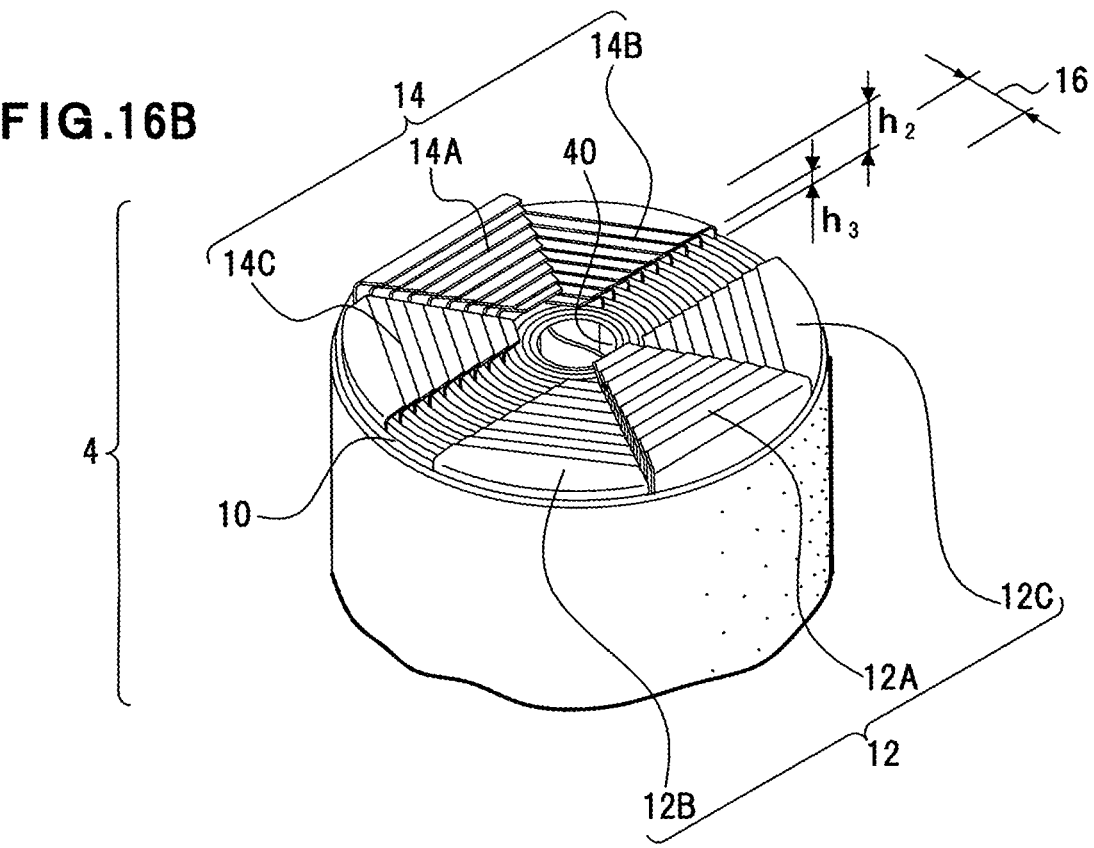
Figure 17A:
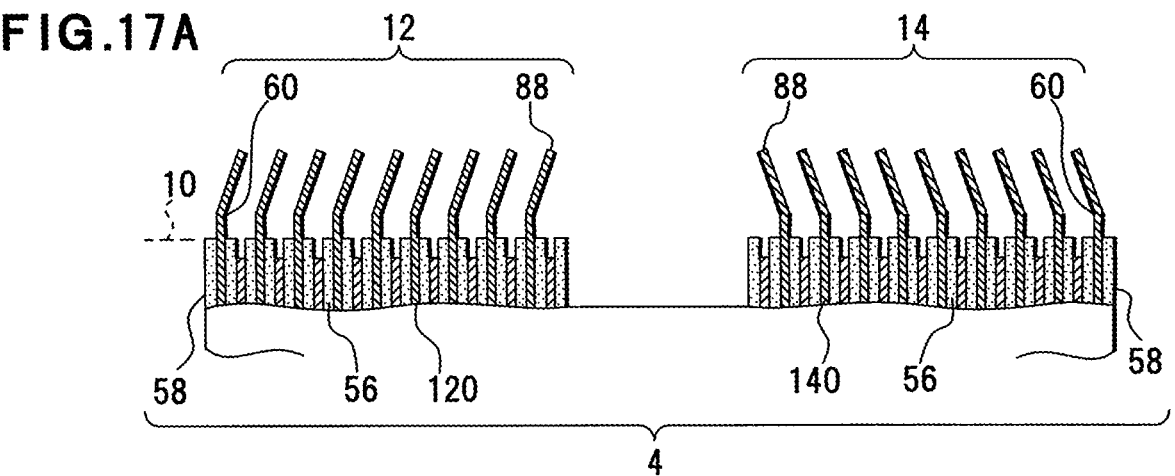
FIGS. 17A to 17C are enlarged sectional views depicting an example of the electrode parts before and after molding.
Figure 17B:
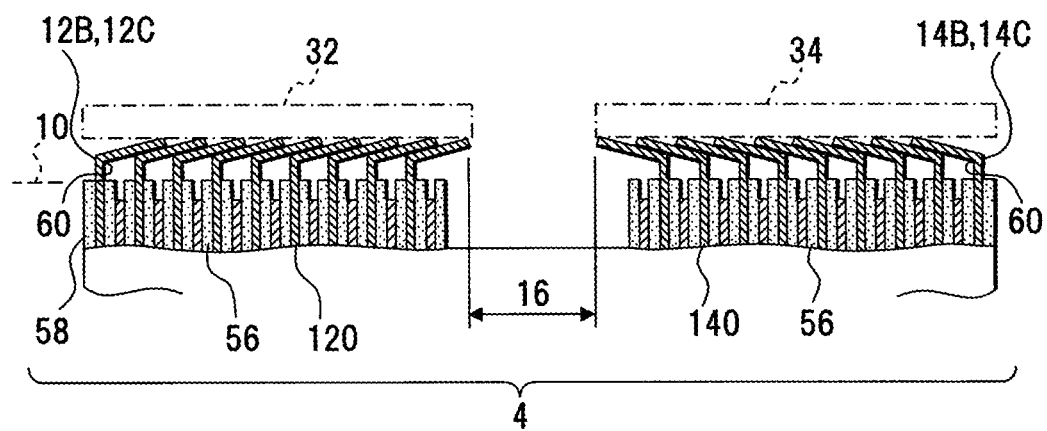
Figure 17C:
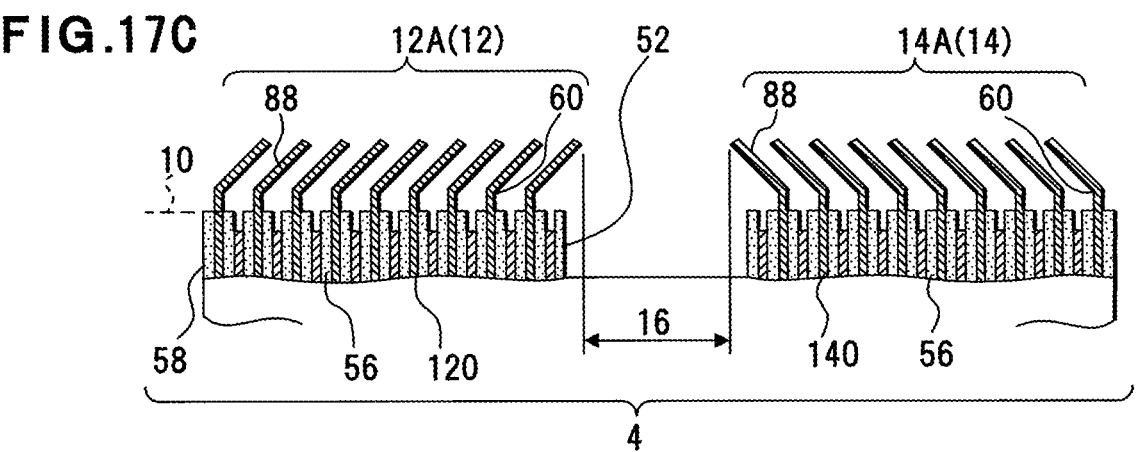

FIGS. 16A, 16B and 17A to 17C will be referred to concerning molding of electrode parts. FIGS. 16A and 16B depict electrode parts before and after molding. FIGS. 17A to 17C depicts molding states of electrode parts. In FIGS. 16A, 16B and 17A to 17C, the same portions as FIG. 6 are denoted by the same reference numerals.

The positive electrode part 12 and the negative electrode part 14 are drawn over the element end-face 10 of the battery element 4 as depicted in FIG. 16A. The positive electrode part 12 and negative electrode part 14 are processed to be molded so as to adhere to the element end-face 10 of the battery element 4 as depicted in of FIG. 16B before connected with the current collector plate 32 and the current collector plate 34.

The positive electrode part 12 and the negative electrode part 14 that constitute electrode protrusions are erected in an inclined state by the fold 60 on the element end-face 10 of the battery element 4 as depicted in FIG. 16A. The isolation distance 16 of predetermined width is set between these positive electrode part 12 and negative electrode part 14. A Y axis is taken by using the isolation distance 16 and the element center 40 as the center, and an X axis is taken at a right angle of the Y axis. Angles $\theta_1$ and $\theta_2$ ($>\theta_1$) are set for each side of the X axis, to make division. A plurality of slits 94 are made on the positive electrode part 12 at the angles $\theta_1$ radially from the element center (core) 40 of the battery element 4. A plurality of the divided parts 12A, 12B and 12C, into which the positive electrode part 12 is divided, are formed by the slits 94. As well, a plurality of the divided parts 14A, 14B and 14C are formed on the negative electrode part 14. For example, if the angle $\theta_1$ is 30 degrees, each divided part 12A and 14A is $2\theta_1=60$ degrees. Also, for example, each angle $\theta_2$ of the divided parts 12B and 12C, which are formed while holding the divided part 12A, and of the divided parts 14B and 14C, which are formed while holding the divided part 14A, is 60 degrees.

For example, height $h_1$ of the protruding length of each positive electrode part 12 and the negative electrode part 14 is set for the depth of the slit 94. The divided parts 12A, 12B and 12C of the positive electrode part 12 and the divided parts 14A, 14B and 14C of the negative electrode part 14 are molded to the divided parts 12A, 12B and 12C and the divided parts 14A, 14B and 14C of the negative electrode part 14 as depicted in FIG. 16B by being bent along the above described folds 60 in the middle thereof, and by being detruded toward the core of the battery element 4, being compressed and being molded. In this embodiment, the divided parts 12B and 12C and the divided parts 14B and 14C are set for the portions welded to the current collector plates 32 and 34. Thus, protruding height $h_2$ of each divided part 12A and 14A is set higher than height $h_3$ of each divided part 12B, 12C, 14B and 14C so as to match the height of the divided parts 12A, 12B and 12C and the divided parts 14A, 14B and 14C of the negative electrode part 14 with the bending shapes of the current collector plates 32 and 34. The size of the height of each positive electrode part 12 and negative electrode part 14 of the battery element 4 is held down by the positive electrode part 12 and the negative electrode part 14 entirely compressed and molded toward the center of the battery element 4 like the above. In this embodiment, the divided parts 12B and 12C of the positive electrode part 12 are compressed and molded to form flat stable connecting surfaces; and after that, the divided part 12A, which is not a connecting surface, is compressed and molded so that the size of the height of the boundaries that are generated by the overlaps of the divided parts 12A-12B and 12A-12C is held down. This holding down of the size of the height of the boundaries is also applied to the negative electrode part 14.

In a molding step of the positive electrode part 12 and the negative electrode part 14, the positive electrode part 12 and the negative electrode part 14, which are bare on the element end-face 10, are bent along the folds 60 while facing each other across the element center 40 as depicted in FIG. 17A after the battery element 4 is wound. Thus, as depicted in FIG. 17B, the positive electrode part 12 and the negative electrode part 14 are folded toward the element center 40 along the folds 60, and the divided parts 12B, 12C, 14B and 14C are formed in order to achieve the connection with the current collector plates 32 and 34.

As depicted in FIG. 17C, the divided parts 12A and 14A are further bent over the element end-face 10 along the folds 60.

Figure 18A:
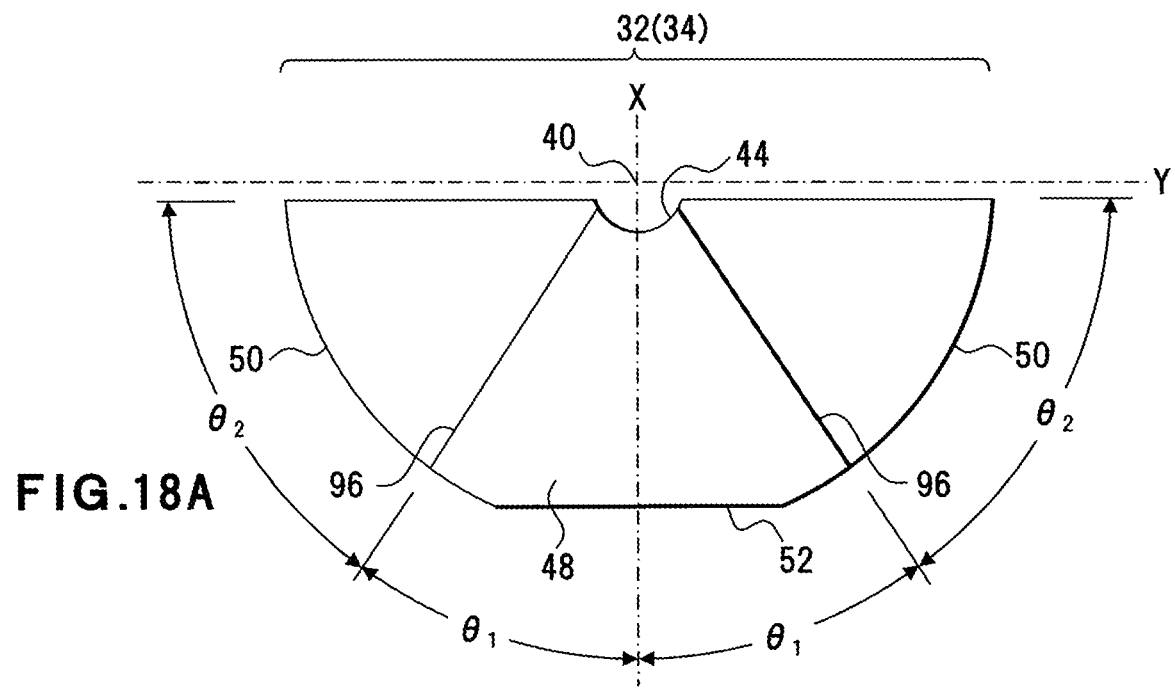
FIGS. 18A and 18B depict a plan and a side of current collector plates.
Figure 18B:
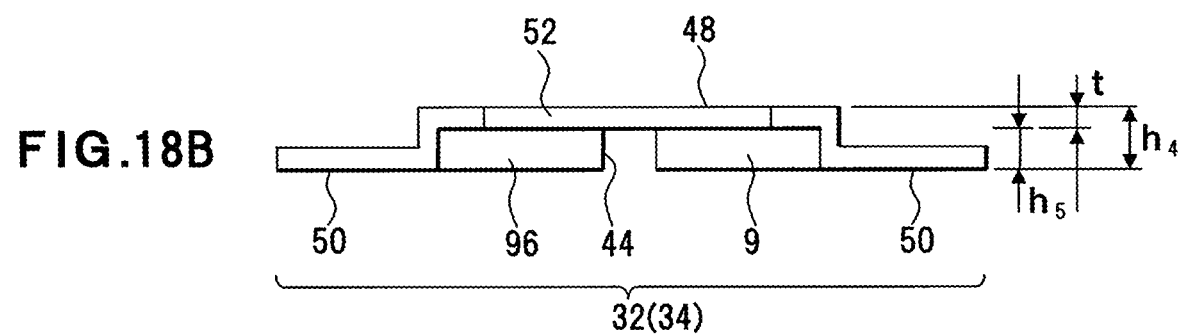

FIGS. 18A and 18B will be referred to concerning the current collector plates 32 and 34. FIGS. 18A and 18B depict an example of the current collector plates. In FIGS. 18A and 18B, the same portions as FIG. 6 are denoted by the same reference numerals.

For example, the current collector plates 32 and 34 in this embodiment are formed by plates of aluminum that are the same as a material for the electrode. The current collector plate 32 has a shape and an area enough to cover the above described divided parts 12A, 12B and 12C of the positive electrode part 12 (FIGS. 16A and 16B), enough for laser welding to the divided parts 12B and 12C, and enough for laser welding to the positive electrode terminal 28 as depicted in FIGS. 18A and 18B. The current collector plate 34 has a shape and an area enough to cover the above described divided parts 14A, 14B and 14C of the negative electrode part 14 (FIGS. 16A and 16B), enough for laser welding to the divided parts 14B and 14C, and enough for laser welding to the negative electrode terminal 30. In this embodiment, each current collector plate 32 and 34 is half the element end-face 10 of the battery element 4 in area, and is an almost semicircular plate as a shape that secures the isolation distance 36.

The center of the chord of each current collector plate 32 and 34 is formed into the notch 44, which is arcuate and which corresponds to the element center 40 of the battery element 4 as depicted in FIG. 18A. The welded face 52 is formed along the arc of each current collector plate 32 and 34 by part of the arc linearly cut off with the X axis used as the center so that the cut arc is at a right angle to the X axis. The terminal connection part 48 and the element connection parts 50, which hold the terminal connecting part 48, are formed on each current collector plate 32 and 34 as depicted in FIG. 18B. The terminal connection part 48 is arcuate, and is formed by steps 96 that are made by each current collector plate 32 and 34 bent perpendicularly at the angles $\theta_1$ while the notch 44, that is, the X axis is used as the center. The terminal connection part 48, which protrudes, and the element connection parts 50 constitute parallel planes with the steps 96 therebetween.

If the height of the terminal connection part 48 is $h_4$, the thickness of each current collector plate 32 and 34 is t, and the height of the inside of the terminal connection part 48 is $h_5$ concerning these current collector plates 32 and 34, the following is set:

$$h_5 = h_4 - t \geq h_2 - h_3 \quad (1)$$

Thus, the height $h_5$ of the inside of the terminal connection part 48 absorbs difference $\Delta h \ (=h_2-h_3)$ between the protruding height $h_2$ of each divided part 12A and 14A, and the height $h_3$ of each divided part 12B, 12C, 14B and 14C. The current collector plate 32 adheres to the divided parts 12B and 12C and is installed with the divided parts 12A housed therein.

Figure 19:
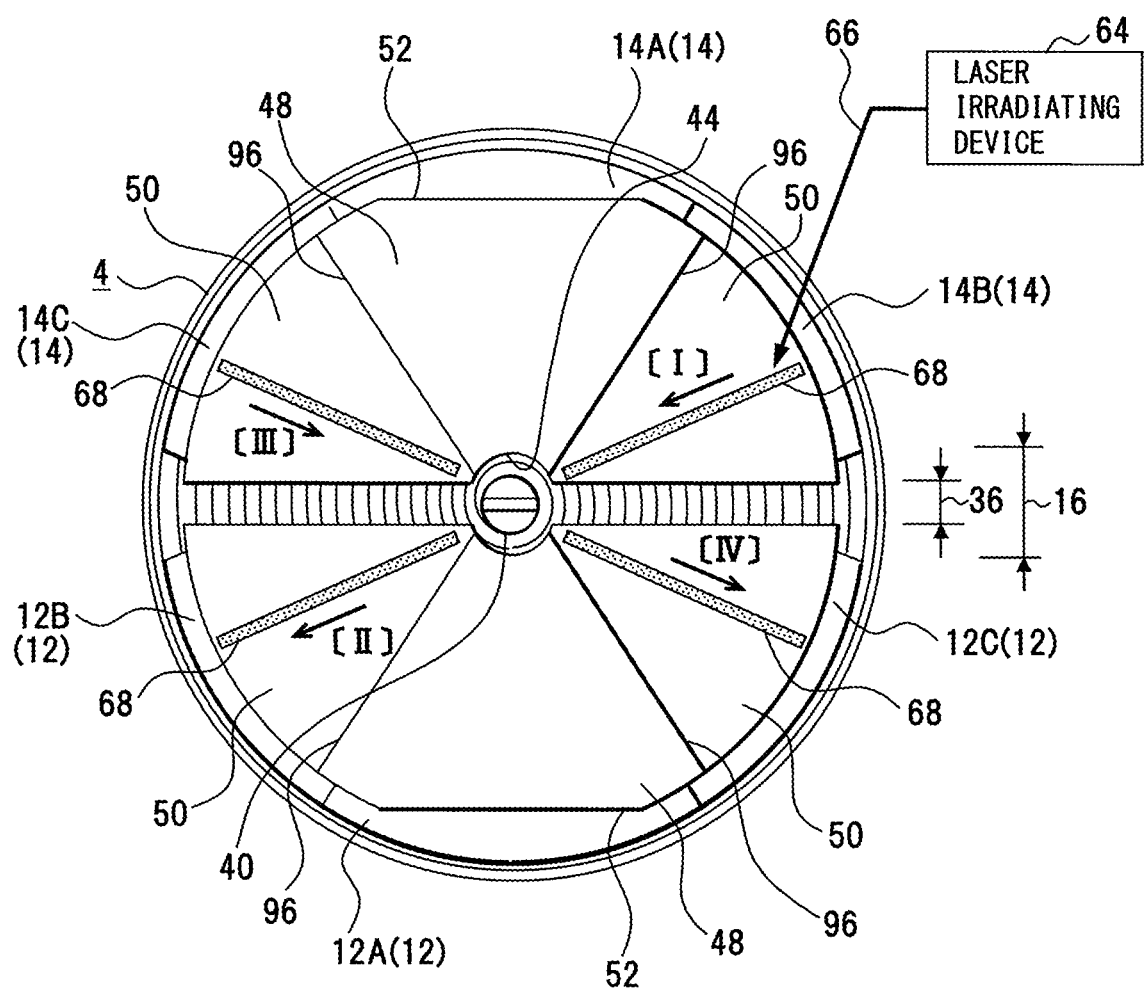
FIG. 19 depicts an example of weld lines on the current collector plates.

FIG. 19 will be referred to concerning the connection between the current collector plates 32 and 34, and the battery element 4. FIG. 19 depicts the connection between the current collector plates and the battery element.

As depicted in FIG. 19, the notches 44 are arranged so as to correspond to the element center 40 of the element end-face 10 of the battery element 4. The isolation distance 36 is set so as to correspond to the isolation distance 16 between the positive electrode part 12 and the negative electrode part 14. The divided part 12A of the positive electrode part 12 of the battery element 4 is positioned below the terminal connection part 48 on the current collector plate 32, and the divided parts 12B and 12C of the positive electrode part 12 of the battery element 4 are positioned below the element connection parts 50 on the current collector plate 32. Thus, the divided parts 12A, 12B and 12C adhere to the current collector plate 32. On the laser irradiated locations 68, the divided parts 12B and 12C, and the element connection parts 50 are partially or entirely molten and connected by laser irradiation from the rim of the capacitor 4 toward the core. Such connection is applied to the current collector plate 34 side as well. The welding process is the same as the first embodiment, and thus, the same reference numerals are attached to FIG. 19 and the description thereof is omitted.

FIGS. 20A and 20B will be referred to concerning the connection between the current collector plates 32 and 34 on the battery element 4, and external terminals. FIGS. 20A and 20B depict connection between the current collector plates on the battery element and external terminals.

As depicted in FIG. 20A, the positive electrode terminal 28 and the negative electrode terminal 30 in the sealing plate 18 are positioned on the connection locations on the current collector plates 32 and 34. The welded face 54 is formed on each positive electrode terminal 28 and negative electrode terminal 30. This welded face 54 is a lateral wall that constitutes the same plane as the welded face 52 in each current collector plate 32 and 34. Then, if the welded faces 52 and 54 meet as depicted in FIG. 20B and the laser irradiation 66 is performed using the above described laser irradiating device 64 (FIG. 8), the welded faces 52 and 54 are welded by laser, and the positive electrode terminal 28 and the negative electrode terminal 30, which correspond to the current collector plates 32 and 34, can be connected. For example, electronic beam welding may be used for this welding process.

Therefore, the current collector plates 32 and 34 are connected to the positive electrode part 12 and the negative electrode part 14 of the battery element 4 by the laser irradiated locations 68. The positive electrode terminal 28 is connected to the positive electrode part 12 of the battery element 4 via the current collector plate 32 by the welded connection part 38 (FIG. 9), and the negative electrode terminal 30 is connected to the negative electrode part 14 of the battery element 4 via the current collector plate 34 by the welded connection part 38 (FIG. 9). Thus, external terminals are formed on the battery element 4.

The space (distance) between the battery element 4 and the sealing plate 18 is as small as possible because the larger the space (distance) between the battery element 4 and the sealing plate 18 is, the more the resistance is and the larger the size of the height of the battery 2 is. In order to connect the positive electrode terminal 28 and the negative electrode terminal 30 with the current collector plates 32 and 34 respectively in such a small space, the laser irradiation 66 may be performed on the welded faces 52 and 54, which are on the same planes and which local welding can be performed on. This process simplifies and strengthens the welding. The range of 0.5 mm to 5 mm is set for the current collector plates 32 and 34, positive electrode terminal 28 and negative electrode terminal 30 in thickness. This is the size that permits laser welding, that makes it difficult to increase the internal resistance, and that can make the size of the height of the battery 2 small.

The welded faces 52 and 54 are preferably installed in the vicinity of the outer circumferential face of the battery element 4 in order to prevent excessive stress on other members (the positive electrode part 12 and the negative electrode part 14) in the laser irradiation 66 also in this embodiment. Specifically, the welded faces 52 and 54 are preferably installed within 10 mm from the outer circumferential face of the battery element 4, for example.

Connecting areas for the positive electrode part 12 and the negative electrode part 14 of the battery element 4 are set at different positions from those for the positive electrode terminal 28 and the negative electrode terminal 30 on the current collector plates 32 and 34. Thus, the electric characteristics can be improved through possible stabilization of the connection between the electrode parts 12 and 14, and the current collector plates 32 and 34, and the connection between the external terminals 28 and 30, and the current collector plates 32 and 34, reduction of the resistance of the battery element 4, strengthening of the connection, and so on.

In this embodiment, the connecting plates 72 and 74 may also be provided between the current collector plates 32 and 34, and the positive electrode terminal 28 and negative electrode terminal 30 as depicted in the second embodiment (FIG. 10).

Fifth Embodiment

The fifth embodiment includes control of laser power for laser irradiated locations (weld lines).

Figure 21A:
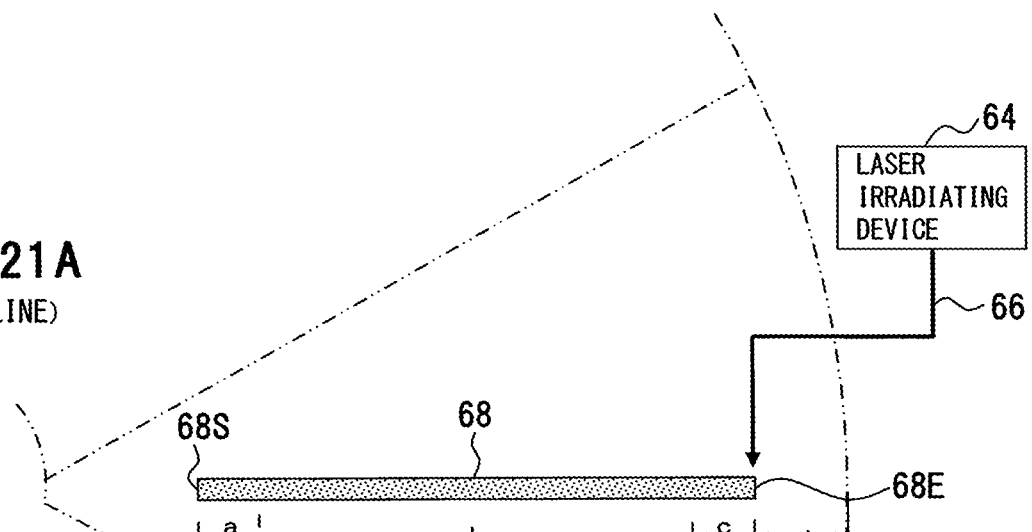
FIGS. 21A and 21B depict an example of laser power control according to a fifth embodiment.
Figure 21B:
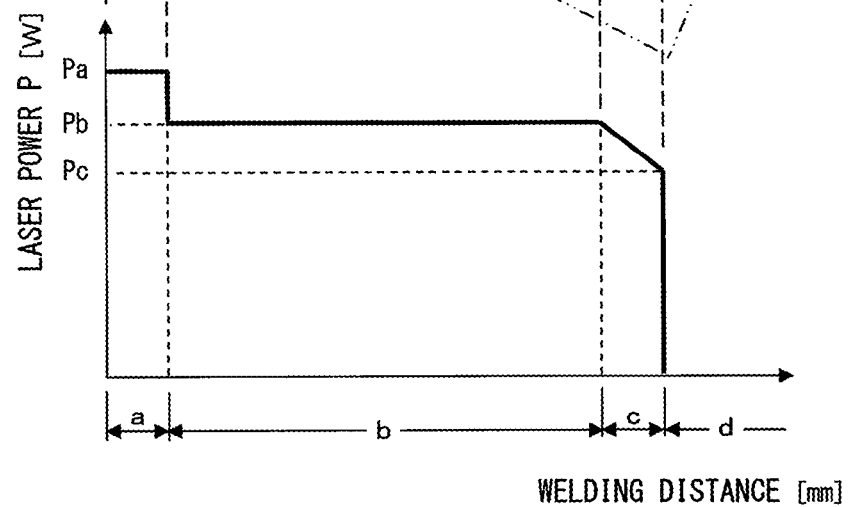

FIGS. 21A and 21B will be referred to concerning the fifth embodiment. FIGS. 21A and 21B depict a manner of controlling laser power.

Concerning this welding by the laser irradiation 66, FIG. 21A depicts the laser irradiated location 68, which is an example of the above described weld lines on the current collector plates 32 and 34 as depicted in FIGS. 21A and 21B. Segments a, b and c are set between a welding start point 68S and a welding end point 68E at this laser irradiated location 68. A segment d is set beyond the welding end point 68E.

The laser irradiating device 64 is used for this laser welding as an example of beam irradiating means. The laser irradiated location 68 is a portion for welding by the laser irradiation 66. In this case, a welding process is performed using a shielding gas such as argon gas and helium gas.

This laser irradiation 66 by the laser irradiating device 64 is at the constant irradiating speed, and beam power for the laser irradiated location 68 is sequentially varied step by step. In this embodiment, as depicted in FIG. 21B, a constant value of laser power Pa is set for laser power P in the segment a, and a constant value of laser power Pb (<Pa) is set for laser power P in the segment b. In the segment c, the laser power Pb is attenuated to laser power Pc (<Pb). The largest value Pa is set for the laser power P in the segment a, which is, as an example, in the range of 50 W to 3,000 W. The laser power Pb in the segment b is weaker than the laser power Pa, and is not more than 90% of the laser power Pa. The laser power Pc in the segment c is a smaller value than the laser power Pb, and is not more than 80% of the laser power Pa. In this case, a horizontal axis represents distance (mm) in FIG. 21B.

The largest value Pa is set for the power P of a laser with which the welding start point 68S is irradiated. Shorter irradiating time than the segment b is set for the segment a, which is irradiated with a laser of the power Pa. Following the segment a, the segment b, which is irradiated with a laser of the power Pb, is set longest. The segment c is set for a shorter segment than the segment b. In this segment c, the laser power Pb is linearly attenuated to the laser power Pc. Like the above, it is preferable to attenuate laser power near the welding start point 68S and the welding end point 68E. That is, it is preferable that there is more than one segment where laser power is attenuated.

A laser scan of the laser irradiated location 68 is the constant speed, and for example, may be a constant speed that is selected from the range of 300 mm/s to 3,000 mm/s. The speed of the scan may be changed according to a segment.

The following effects can be obtained by controlling laser power for the laser irradiated location 68 like the above.

(1) Laser power for the weld line, which extends from the welding start point 68S to the welding end point 68E for laser welding of the current collector plates 32 and 34 to the positive electrode part 12 and the negative electrode part 14 of the battery element 4, is sequentially controlled step by step. For example, laser power is attenuated. Thereby, welding energy applied to the current collector plates 32 and 34, and the positive electrode part 12 and negative electrode part 14, which are electrode protrusions, can be equalized, and the connectivity can be improved.

(2) At the welding start point 68S for laser irradiation, laser power is set high and the laser irradiation is performed with this high laser power energy. The weld line of each of the current collector plates 32 and 34, the positive electrode part 12, and the negative electrode part 14 and their vicinity, on which the laser irradiation 66 is performed, are heated. That is, if the laser irradiation 66 is performed along the weld line, the heated portion move successively as the laser irradiation 66 scans the portion, and is in a melting state successively without equalized laser power set. Therefore, thermal energy that is brought by the laser irradiation 66 and is applied to the welded part is equalized although laser power is attenuated sequentially step by step (the above embodiment), or either step by step or sequentially. Thus, the connectivity between the current collector plates 32 and 34, and the positive electrode part 12 and the negative electrode part 14 can be improved.

(3) If laser power is kept at a certain level, there appears a portion where thermal energy is excessive. Because the electrodes that form the electrode protrusions are thin, uneven melting due to excessive concentration of thermal energy occurs, and the connectivity between the current collector plates and the electrode protrusions becomes unstable. Such inconvenience can be avoided by control (for example, attenuation) of laser power.

(4) The same control can be performed even if plural lines are set for the laser irradiated location 68. Concerning the above described sequential operations of the laser irradiation [I] to [IV], the same portion is not sequentially irradiated with a laser, but laser welding of [I] to [IV] is performed, and then, a different portion is irradiated with a laser. Thereby, a time interval can be provided for laser irradiation on the same portion. As a result, cooling of a laser irradiated portion is achieved, and the stability of the connection by laser welding is achieved.

(5) Laser irradiated locations 681 and 682 may be set as two parallel weld lines of the laser irradiated location 68. In this case, as depicted in FIG. 22A, the laser irradiation 66 is performed with an interval for cooling provided for laser welding for the laser irradiated locations 681 and 682. In this time, assuming that distance between lines of the laser irradiated locations 681 and 682 is $W_9$, 3 mm or less may be set for the distance between lines $W_9$, for example. The laser irradiated locations 681 and 682 may overlap. It is as described above that the laser irradiated locations 681 and 682 are individually welded by the laser irradiating device 64. The start points 681S and 682S, and the end points 681E and 682E are set for the laser irradiated locations 681 and 682 respectively. The above described segments a, b, c and d are set for each laser irradiated location 681 and 682 according to a direction of a welding scan. The direction of a welding scan is different between the laser irradiated locations 681 and 682. Concerning such laser irradiation 66, laser power for each segment a, b and c may be also set as depicted in FIG. 22B. The above described effects can be obtained from such a structure as well.

Sixth Embodiment

The sixth embodiment includes the structure of performing laser welding on fixed current collector plates and a battery element in a pressed state.

Figure 23A:
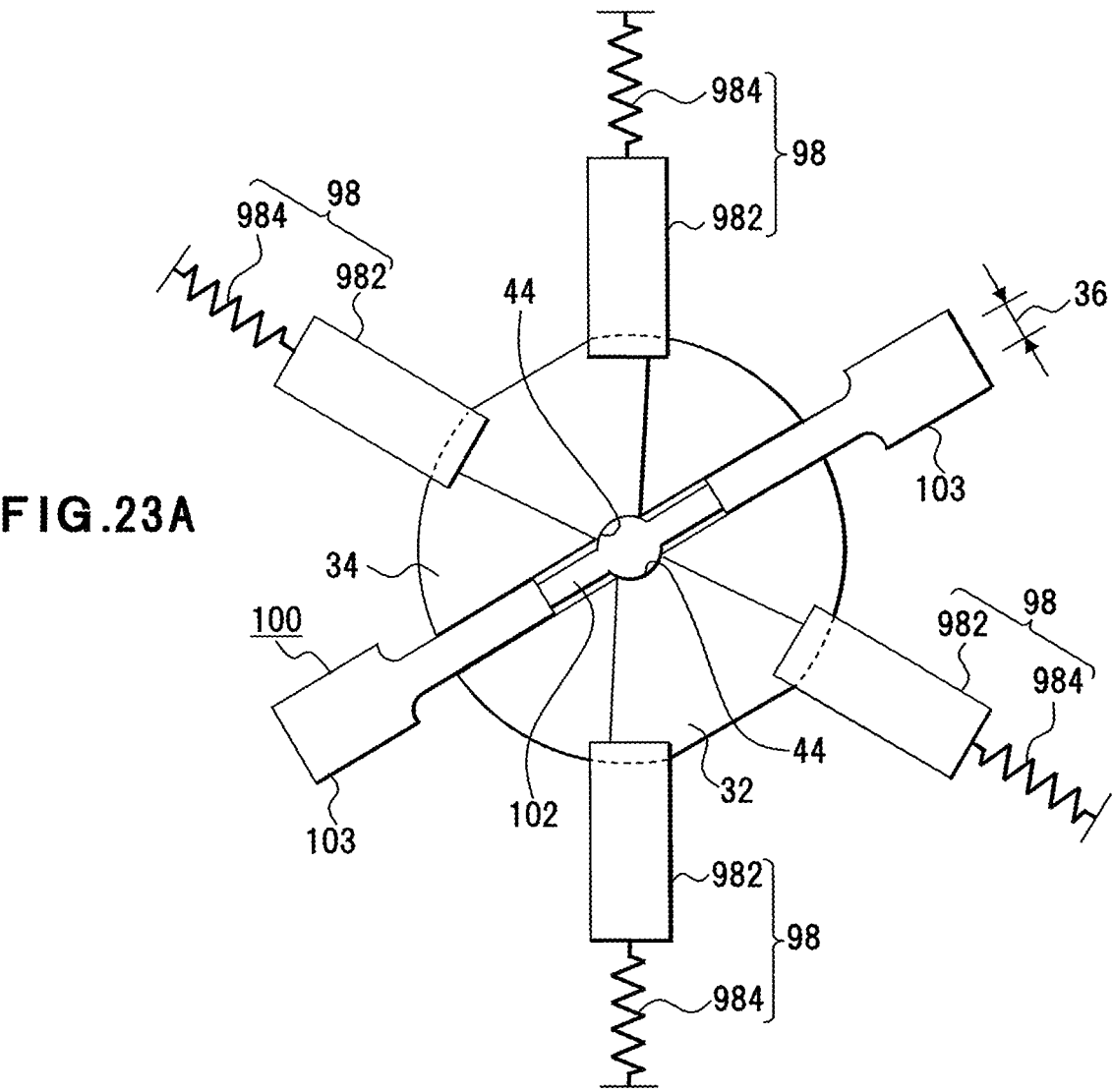
FIGS. 23A and 23B depict an example of a structure of fixing current collector plates and a battery element according to a sixth embodiment.
Figure 23B:
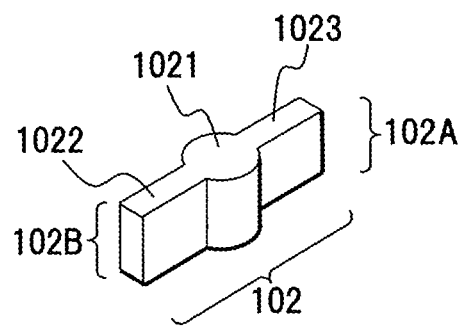

FIGS. 23A and 23B will be referred to concerning the sixth embodiment. FIGS. 23A and 23B depict a fixed state of current collector plates, and positioning jigs. In FIGS. 23A and 23B, the same portions as FIG. 2 are denoted by the same reference numerals.

As depicted in FIG. 23A, the current collector plates 32 and 34 are horizontally positioned on the element end-face 10 of the battery element 4. A plurality of chuck mechanisms 98, a pair of space keeping mechanisms 100 and a positioning jig 102 are used for this positioning. A plurality of chucks 982 are provided for a plurality of the chuck mechanisms 98 for each of the current collector plates 32 and 34, which are objects to be held. That is, the chucks 982 are radially arranged. Restoring forces of springs 984 that are in compressed states are acted on the chucks 982. In this case, tension may be acted.

A pair of spacers 103 that is installed in the isolation distance 36 between the current collector plates 32 and 34 is provided for the space keeping mechanisms 100 while holding the positioning jig 102. The spacers 103 are arranged between the sides of the current collector plates 32 and 34, which face each other. Certain width of each spacer 103 keeps the spacers 103 in parallel, and sets the isolation distance 36 between the current collector plates 32 and 34.

The above described positioning jig 102 is installed in the space between the spacers 103. The notches 44 of the current collector plates 32 and 34 are fitted to this positioning jig 102, and the center positions for the current collector plates 32 and 34 are determined.

As depicted in FIG. 23B, the positioning jig 102 includes a column 1021 for engaging the notches 44 of the current collector plates 32 and 34, which are arcuate, at the center. A pair of arms 1022 and 1023 that are flat plates is provided for side walls of this column 1021. The arms 1022 and 1023 are formed in the direction of the axis and diameter of the column 1021. As depicted in FIG. 23A, the arms 1022 and 1023 are installed between the sides of the current collector plates 32 and 34, which face each other, and are gripped by the spacers 103. Then, the column 1021 is fit to the notches 44 of the current collector plates 32 and 34. Therefore, the diameter and the arcuate face of the column 1021 correspond to the inside diameter of the notches 44.

Figure 24A:
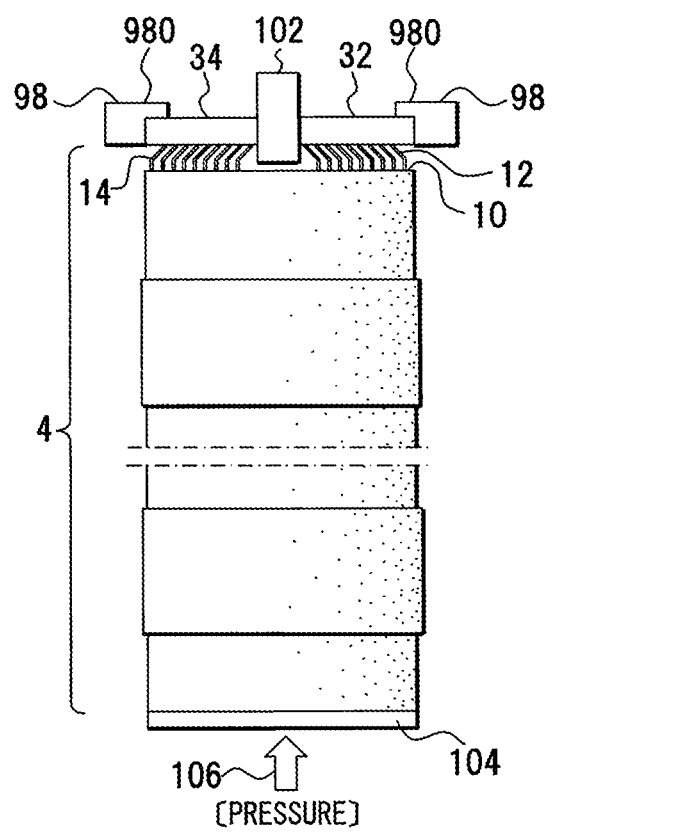
FIGS. 24A and 24B depict retention of the current collector plates and the battery element, and a process of connecting them.

As depicted in FIG. 24A, the battery element 4 is arranged along with the current collector plates 32 and 34. In this arranged state, the positive electrode part 12 and negative electrode part 14 on the element end-face 10 of the battery element 4 touch the undersides of the current collector plates 32 and 34 while bent along the above described folds 60, and are horizontally positioned. Under this state, a pressure 106 is applied to the battery element 4 and the current collector plates 32 and 34 from the bottom of a supporting member 104 as depicted by an arrow. That is, the battery element 4 is raised to, and the positive electrode part 12 and the negative electrode part 14 are pushed onto the undersides of the current collector plates 32 and 34, which are positioned and fixed.

Supporting protrusions 980 that cover and support the top surfaces of the current collector plates 32 and 34 are provided for the chucks 982 of the chuck mechanisms 98, which support the top of the battery element 4 against the pressure 106 from the bottom of the battery element 4. The edges of the top surfaces of the current collector plates 32 and 34 in the battery element 4 side are abutted on the supporting protrusions 980. Thus, the current collector plates 32 and 34 on the battery element 4 are kept horizontal, and their parallelism with the element end-face 10 of the battery element 4 is kept.

Figure 24B:
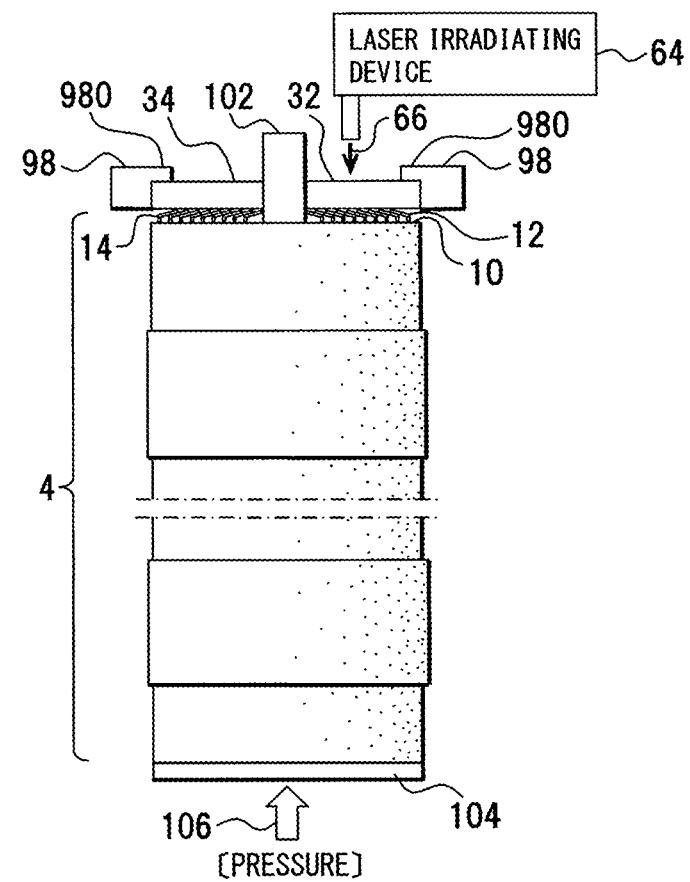

Like the above, the battery element 4 is pushed up to, and kept at the highest position depicted in FIG. 24B, and laser welding is performed. In his case, the following fixed state is kept:

a) The parallelism between the supporting member 104 and the current collector plates 32 and 34 is kept with high precision. Thus, the parallelism between the current collector plates 32 and 34, which are fixed on the same plane, and the element end-face 10 is kept.

The current collector of each positive electrode part 12 and negative electrode part 14 is pushed onto the underside of each current collector plate 32 and 34 under the condition where the current collectors are bent by an angle of less than 90 degrees into an obtuse angle. The positive electrode part 12 and the negative electrode part 14 are controlled so as to be in a folding state between the current collector plates 32 and 34, and the element end-face 10, the parallelism between which is kept.

c) The notches 44 at the centers of the current collector plates 32 and 34 are brought to correspond to the column 1021 of the positioning jig 102, and the centers of the notches 44 of the current collector plates 32 and 34 are fit to the column 1021. The column 1021 surrounded by the notches 44 of the current collector plates 32 and 34 is arranged on the element center (winding center in a case of a wound element) 40 of the battery element 4 upon the push. Thereby, the centers of the notches 44 of the current collector plates 32 and 34 are positioned at the element center 40 of the battery element 4. The laser irradiating device 64 is arranged over the current collector plates 32 and 34, which are positioned as described above.

Figure 25A:
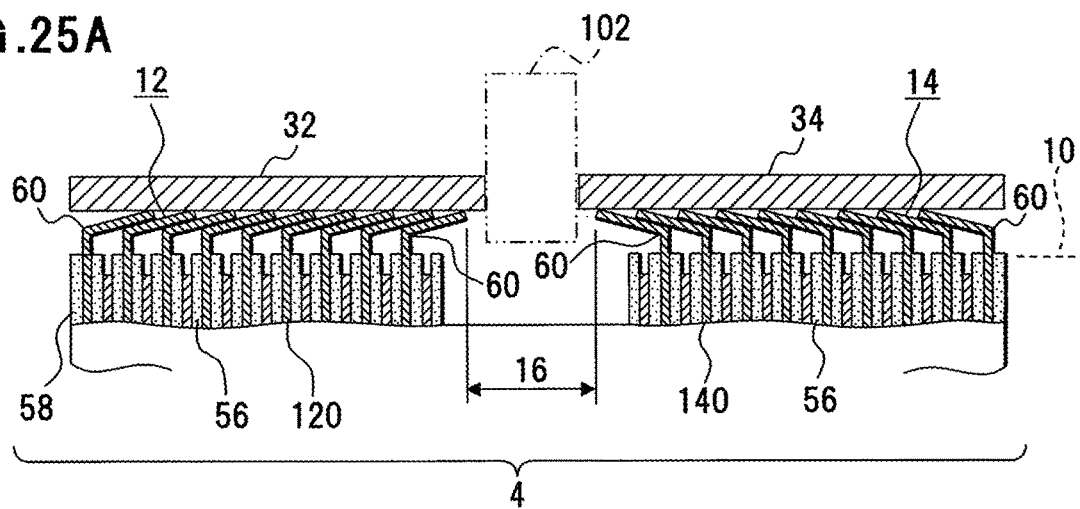
FIGS. 25A and 25B are enlarged sectional views depicting an example of the current collector plates and electrode parts of the battery element.
Figure 25B:
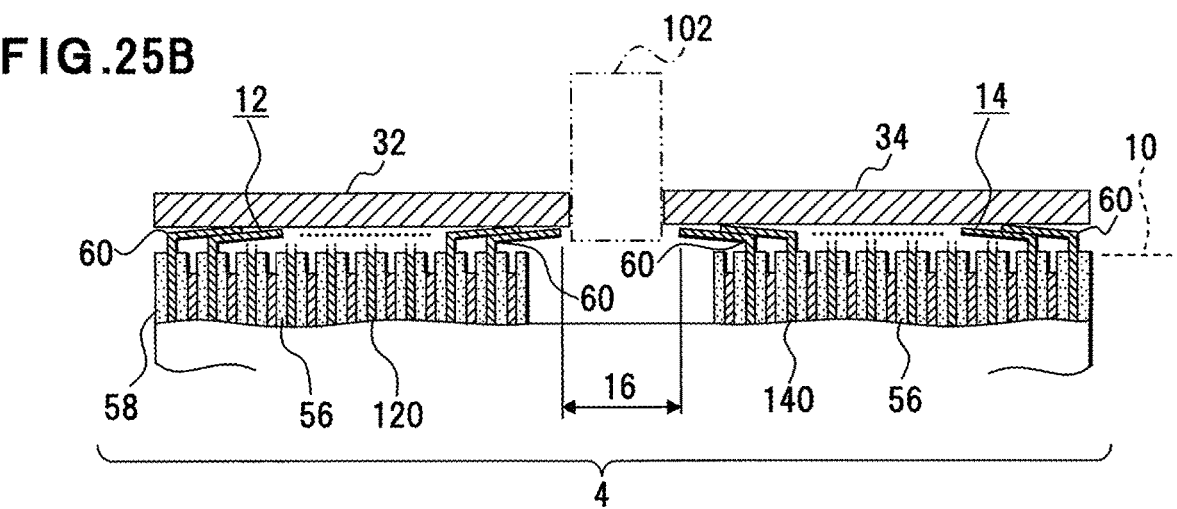

FIGS. 25A and 25B (in FIG. 25B, the middle of each positive electrode part 12 and negative electrode part 14 is omitted on the drawing) will be referred to concerning the positioning described above and a pressed state of the positive electrode part 12 and the negative electrode part 14.

FIG. 25A depicts a state where the positive electrode part 12 on the element end-face 10 of the battery element 4 is touched to the current collector plate 32, and the negative electrode part 14 is touched to the current collector plate 34. This state is a stage prior to or an early stage of pressing against the battery element 4. FIG. 25A depicts the divided parts 12B and 12C of the positive electrode part 12, and the divided parts 14B and 14C of the negative electrode part 14.

In the state of FIG. 25B, the battery element 4 in a pressurized state (FIGS. 24A and 24B) is further pressurized, and the positive electrode part 12 in the pressurized state touches the current collector plate 32 and forms the above described obtuse angle. Similarly, the negative electrode part 14 in the pressurized state touches the current collector plate 34, and forms the above described obtuse angle. That is, the current collector of the positive electrode part 12 adheres to and touches the current collector plate 32 without any gap, and similarly, the current collector of the negative electrode part 14 can adhere to and touch the current collector plate 34 without any gap. Thus, thermal energy of the laser welding is efficiently acted on the welded portions.

Seventh Embodiment

The seventh embodiment includes the structure of using current collector plates each of which an arcuate welded surface is formed on with reference to the element center of a battery element.

FIG. 26 will be referred to concerning the seventh embodiment. FIG. 26 depicts current collector plates and electrode parts of a battery element. In FIG. 26, the same portions as FIG. 6 are denoted by the same reference numerals.

As depicted in FIG. 26, for example, the terminal connection part 48, which is a sector of 90 degrees, is formed between the element connection parts 50 on each current collector plate 32 and 34 of this embodiment. A terminal installation face 110, a first welded face 112 and an element cover 114 are formed on this terminal connection part 48.

The terminal installation face 110 is a face on which an external terminal is installed. The shape of the terminal installation face 110 is a flat face, for example. The positive electrode terminal 28 and the negative electrode terminal 30 are disposed on the terminal installation faces 110. A face of each positive electrode terminal 28 and negative electrode terminal 30 is formed into a flat surface, and each positive electrode terminal 28 and negative electrode terminal 30 is adhered to the terminal installation face 110. Each depression 116 for inserting the divided part 12A of the positive electrode part 12 and divided part 14A of the negative electrode part 14 in the battery element 4 side is formed on the rear of the terminal installation face 110.

The welded face 112 is an arcuate face that faces the lateral face side of the battery element 4. The element cover 114 is a flat face that falls while holding the welded face 112 with the terminal installation face 110 as a step, and covers the element end-face 10 of the battery element 4. That is, each current collector plate 32 and 34 is arcuately cut or molded to form the element cover 114 with the terminal installation face 110, which is flat, left. Thereby, the welded face 112 results in an arcuate face formed by the step between the terminal installation face 110 and the element cover 114. The arcuate face of the welded face 112 is a face of the concentric circle that is the same as or approximate to the battery element 4, and the center of which is the element center 40 of the battery element 4. The same reference numerals as the above embodiments are attached to the components of the battery element 4 and the description thereof is omitted.

Figure 27:
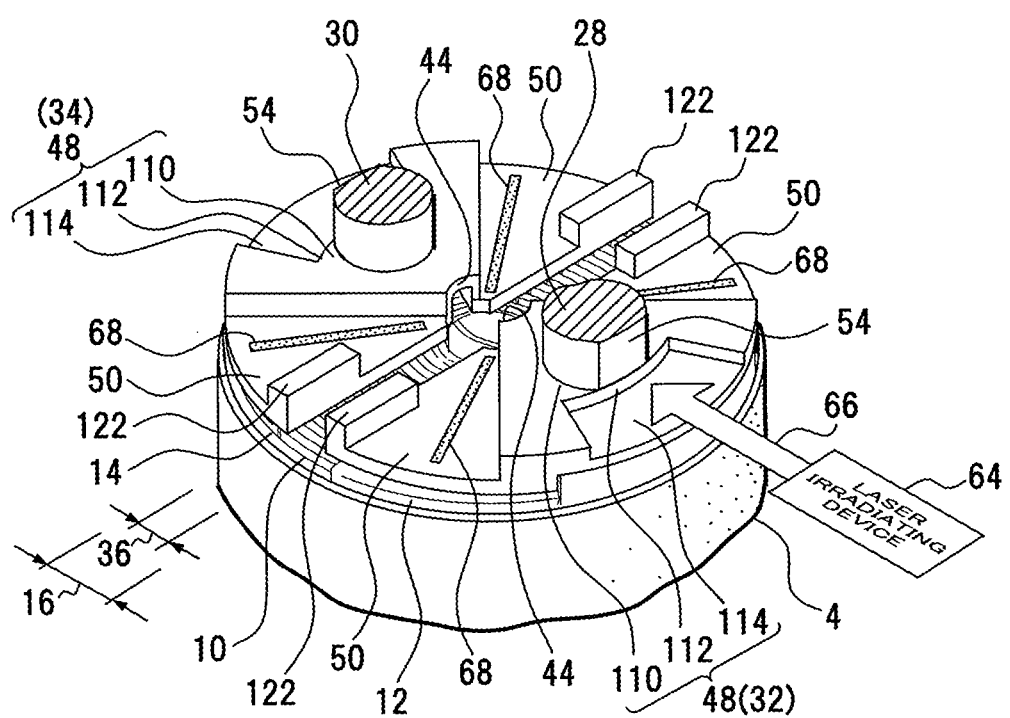
FIG. 27 is a perspective view depicting an example of laser welding for welding external terminals and the current collector plates.

FIG. 27 will be referred to concerning welding of the current collector plates 32 and 34, to external terminals. FIG. 27 depicts an example of welding of the current collector plates 32 and 34, to external terminals.

As depicted in FIG. 27, the current collector plate 32 in the positive electrode side is installed on and welded to the positive electrode part 12 on the element end-face 10 of the battery element 4, and the current collector plate 34 in the negative electrode side is installed on and welded to the negative electrode part 14. In this case, the positive electrode terminal 28 is installed on the terminal installation face 110 of the current collector plate 32, and the negative electrode terminal 30 is installed on the terminal installation face 110 of the current collector plate 34. The welded face 54 of the positive electrode terminal 28 is positioned along the welded face 112 of the current collector plate 32, to constitute a uniform face. Similarly, the welded face 54 of the negative electrode terminal 30 is positioned along the welded face 112 of the current collector plate 34, to constitute a uniform face.

As described above, two faces are fit to constitute a uniform face, and the laser irradiation 66 is performed to weld the welded faces 54 and 112. The positive electrode terminal 28 is connected to the terminal installation face 110 of the current collector plate 32, and the negative electrode terminal 30 is connected to the terminal installation face 110 of the current collector plate 34. That is, the positive electrode part 12 of the battery element 4 is connected to the positive electrode terminal 28, and the negative electrode part 14 is connected to the negative electrode terminal 30.

Since the welded faces 54 and 112 are the arcuate surfaces of the same curvature radius like the above, the portions welded by the laser irradiation 66 can be widened. However, this embodiment is not limited to this, and the welded faces 54 and 112 can be the same linear surface.

Figure 28:
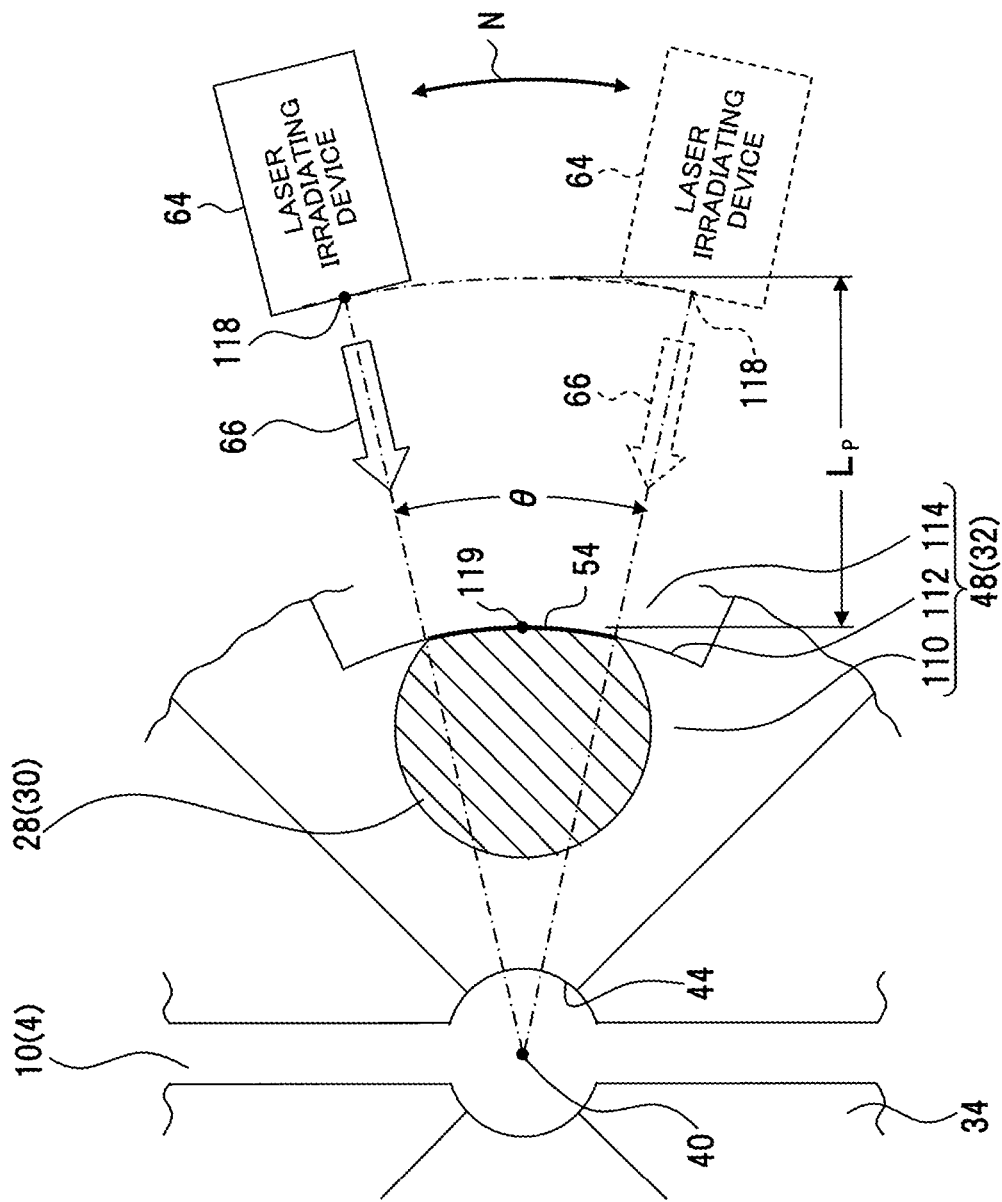
FIG. 28 depicts an example of laser irradiation.

FIG. 28 will be referred to concerning laser welding. FIG. 28 depicts an example of a laser irradiating angle and welded faces.

The current collector plates 32 and 34 are installed with reference to the element center 40 of the element end-face 10 of the battery element 4, and are connected to the positive electrode part 12 and the negative electrode part 14 of the battery element 4. As depicted in FIG. 28, the welded face 54 of either the positive electrode terminal 28 or the negative electrode terminal 30, which is installed on the terminal installation face 110, is fit to the welded face 112. A laser emission part 118 of the laser irradiating device 64 is directed toward the welded faces 54 and 112, and installed.

If distance between the laser emission part 118 and a laser irradiated point 119 of the welded faces 54 and 112 is Lp, the distance Lp can be kept even if the laser irradiating device 64 is rotated around the element center 40 as the rotation center in the direction of an arrow N. If a rotation angle θ for the battery element 4 around the laser irradiated point 119 as the center is assumed and this rotation angle θ is set for a welded range, the laser irradiation 66 can be uniformly performed on the welded faces 54 and 112 from the constant distance Lp, and the welded faces 54 and 112 can be welded. The distance Lp for the laser irradiation 66 is constant, the laser irradiation 66 can be stably and sequentially performed, and a uniformly welding process can be performed. The reliability of the connection can be improved.

In this embodiment, the laser irradiating device 64 is rotated. This laser irradiating device 64 may be fixed, the battery element 4 may be rotated by predetermined angle θ and the scan of the laser irradiation 66 may be performed.

Eighth Embodiment

The eighth embodiment includes to increase the thermal capacity of current collector plates and to perform laser welding.

As described above, the battery 2, which is an example of an electricity storage device, includes the current collector plates 32 and 34 on the element end-face 10 of the battery element 4, which constitutes an electricity storage element. The battery element 4, which is an example, is a winding-type element. However, the battery element 4 may be an element other than a winding-type element, that is, for example, a multilayer element. When the battery 2 is manufactured, the positioning jig 102 for the current collector plates 32 and 34, which is depicted in FIGS. 23A, 23B, 24A and 24B, is used as a heat radiating jig and a spacer between the current collector plates 32 and 34, which are arranged to be connected to the element end-face 10.

The structure of the battery element 4 is the same as the above embodiments. Thus, the same reference numerals are attached and the description thereof is omitted.

The current collector plates 32 and 34 are terminal members that are interposed between the battery element 4 and external terminals not depicted. As depicted in FIG. 27, the current collector plate 32 is connected to the divided parts 12B and 12C in the positive electrode side (FIG. 26) by welding, and the current collector plate 34 is connected to the divided parts 14B and 14C in the negative electrode sides as well. On each current collector plate 32 and 34, the terminal connection part 48 and the element connection parts 50, which hold this terminal connection part 48, are formed around the notch 44 as the center. The terminal connection part 48 is a portion that is connected to an external terminal (each positive electrode terminal 28 and negative electrode terminal 30 in FIG. 1). The terminal connection part 48 is set higher between the element connection parts 50 by provided steps.

A protrusion 122 that is a rectangular parallelepiped is formed on each element connection part 50 of each current collector plate 32 and 34 as depicted in FIG. 26. The protrusion 122 forms a thick wall part at the edge end of each opposed edge face 124 of each current collector plate 32 and 34. The thick wall parts formed by the protrusions 122 increase the thermal capacity of the current collector plates 32 and 34, and constitute gripped parts for the current collector plates 32 and 34 that are gripped by gripping means (for example, chucks). The gripped parts may be formed separately from the protrusions 122.

The current collector plates 32 and 34 are positioned on the element end-face 10 of the battery element 4 based on the element center 40 of the battery element 4. The isolation distance 36 is set as well as the above described isolation distance 16. The above described positioning jig 102 (FIGS. 23A and 23B) is used for manufacturing the battery 2. This positioning jig 102 is an example of heat radiating means. A metallic material that has good heat-absorbability and heat-radiating property, for example, a steel product is formed into this positioning jig 102. The positioning jig 102 includes the column 1021 as a central keeping part, and the above described arms 1022 and 1023, which have the center that is the column 1021 and which are space keeping parts in the direction of the diameter.

The column 1021 is a columnar part that positions the notches 44 of the current collector plates 32 and 34, which are objects to be positioned, at the element center 40. This columnar part is formed just as, equal as or higher than the notches 44 in height. The outer radius of the column 1021 may be formed equally as the inner radius of the notches 44.

The arms 1022 and 1023 are a parallel portion that is abutted on the opposed edge faces 124 of the current collector plates 32 and 34, which are oppositely arranged, that uses the notches 44 as the center at the column 1021, and that keeps the current collector plates 32 and 34 parallel and the isolation distance 36 away. The shape of each arm 1022 and 1023 is a board of a flat rectangular parallelepiped. Both sides of the arms 1022 and 1023 are formed into a parallel reference plane 102A and 102B.

According to this positioning jig 102, the current collector plates 32 and 34 are positioned at proper locations on the element end-face 10 of the battery element 4 with the isolation distance 36 provided therebetween by the notches 44 abutted against the circumferential faces of the column 1021, which is arranged at the center of the battery element 4, and by the opposed edge faces 124 stuck to the reference planes 102A and 102B of the arms 1022 and 1023. Moreover, the positioning jig 102 can be touched to the current collector plates 32 and 34 as a heat radiating member.

The laser irradiation 66 is performed on the laser irradiated locations 68 on the current collector plates 32 and 34, which are mounted on the battery element 4, from the laser irradiating device 64, and the welding is performed as described above. This laser irradiation 66 may be performed on either four locations at the same time, or on each location selectively in order.

The protrusions 122 are formed. Thus, thermal capacity of the current collector plates 32 and 34 is increased as much as the volume of the protrusions 122. When the laser irradiation 66 is performed on any laser irradiated location 68, heat generated on the welded portion is radiated through the protrusion 122, for example. The heat of the laser irradiated location 68 is also conducted through the positioning jig 102, and is radiated through the spacers 103 (FIG. 23A). According to such a radiating manner, heat generated on other laser irradiated locations 68 is radiated as well.

Due to the increase of the thermal capacity of the current collector plates 32 and 34 by the formation of the protrusions 122, which are an example of thickness parts, as described above, the above described heat radiation function is improved. As a result, welding energy which is applied to the laser irradiated locations 68 from the laser irradiating device 64 in laser welding can be improved. As a consequence, any missing part and unevenness can be prevented from being generated that are generated due to thin electrode foil constituting the current collector plates 32 and 34, and the positive electrode part 12 and the negative electrode part 14, which are electrode protrusions, when laser power is increased in the conventional laser welding. Moreover, the inconvenience of the occurrence of unconnected portions when laser power is weak can be mitigated by increasing the laser power. Thus, the improvement of the efficiency of heat radiation along with the improvement of the thermal capacity of the current collector plates 32 and 34 enables welding energy applied to the current collector plates 32 and 34, the positive electrode part 12 and the negative electrode part 14 to be absorbed, the welding accuracy to be improved, and the reliability of the connection to be improved.

The increase of the thermal capacity due to the protrusions 122 of the current collector plates 32 and 34 can suppress the change in heat capacity in melting during welding because of secured various radiation routes for the current collector plates 32 and 34, can stabilize the welding state, and can improve the welding accuracy.

Ninth Embodiment

The ninth embodiment discloses welding of current collector plates to terminals.

Figure 29:
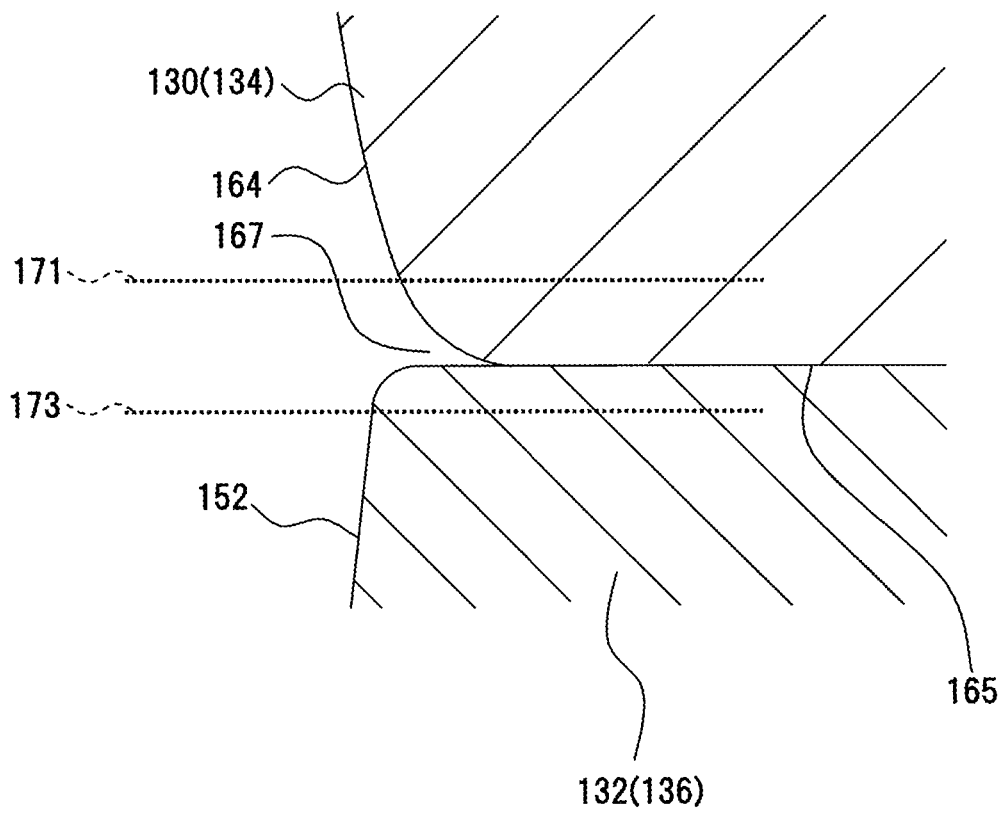
FIG. 29 depicts an enlarged welded portion of a positive current collector plate and a positive terminal according to a ninth embodiment.

FIG. 29 will be referred to concerning welding of a positive current collector plate 132 to a positive electrode terminal 130 (or a negative current collector plate 136 to a negative electrode terminal 134) according to the ninth embodiment. FIG. 29 depicts an enlarged welded portion of the positive current collector plate 132 and the positive electrode terminal 130.

For example, the positive current collector plate 132 is a plate of aluminum on which heading processing is performed. A connecting face 152 of the positive current collector plate 132 constitutes a surface inclined to either the top or the bottom face of the positive current collector plate 132. As an example, the connecting face 152 is an inclined surface that inclines clockwise towards the vertical plane. The edge of the connecting face 152 in the side of a contact surface 165 is a curved surface. The positive electrode terminal 130 is also a plate of aluminum on which heading processing is performed, for example. A terminal side connecting face 164 of the positive electrode terminal 130 constitutes a surface inclined toward the positive current collector plate 132. The terminal side connecting face 164 as an example is an inclined surface that inclines counterclockwise toward the vertical plane. The edge of the terminal side connecting face 164 in the side of the contact surface 165 is a curved surface as well as the positive current collector plate 132 side. Therefore, the positive electrode terminal 130 and the positive current collector plate 132 have portions adhering to each other in the side of the contact surface 165, and non-contact portions 167 that curve upward and downward respectively and are spread. Such a manner of the positive current collector plate 132 and the positive electrode terminal 130 applies to the negative current collector plate 136 and the negative electrode terminal 134 as well.

Center positions for irradiation with a laser beam 169 (FIGS. 30A and 30B) (irradiated positions 171 and 173) are set at different locations from the above described lateral contacting location of the positive current collector plate 132 and the positive electrode terminal 130 (contact surface 165). The irradiated position 171 is a position shifting upward from the contact surface 165 in the drawing. The irradiated position 173 is a position shifting downward from the contact surface 165 in the drawing. Each of these irradiated positions 171 and 173 may be any position different from the contact surface 165, and may be such a position that the contact surface 165 can be encompassed within the area of a nugget 138 (FIGS. 31A and 31B) that is formed by the laser beam 169 (welded part).

Figure 30A:
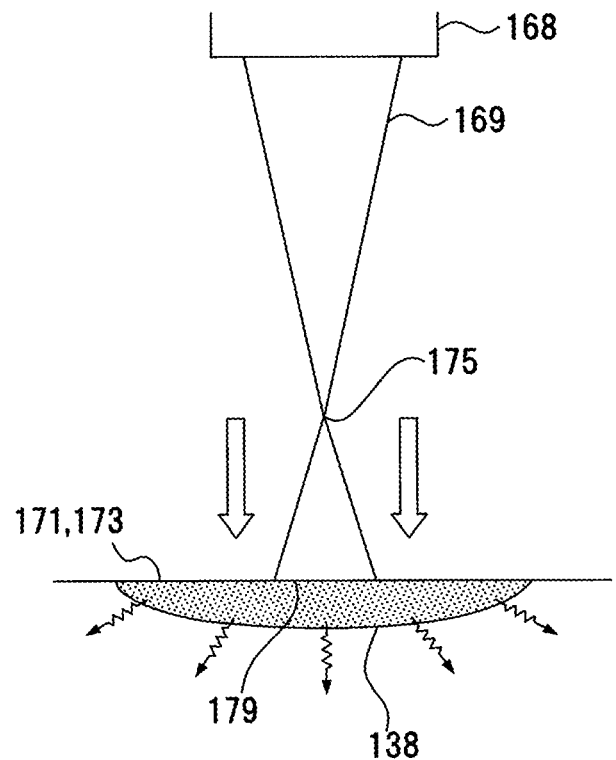
FIGS. 30A and 30B depict manners of welding by laser beam.
Figure 30B:
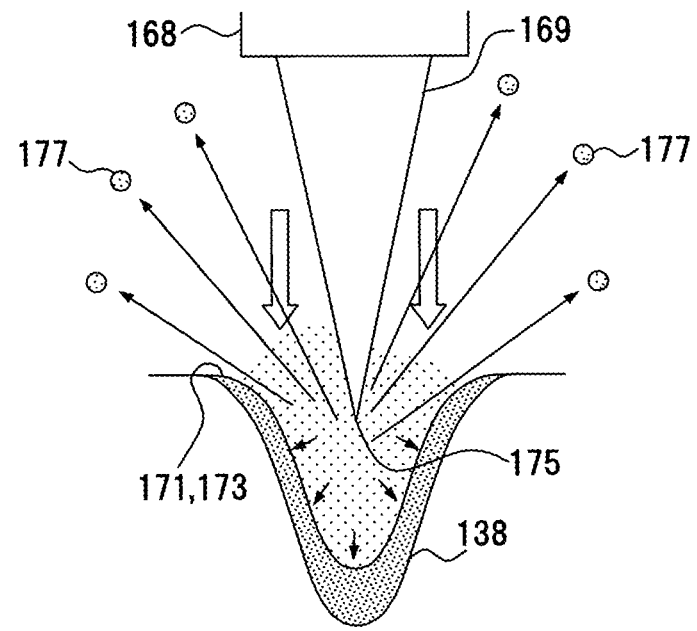

FIGS. 30A and 30B will be referred to concerning manners of welding by this laser beam 169. Manners of welding by the laser beam 169 include thermal conduction welding as depicted in FIG. 30A and key hole welding as depicted in FIG. 30B. While any manner of welding forms may be used for metal welding, key hole welding produces the nugget 138, which is sharp, long and large, because a focus 175 of the laser beam 169 that is sharp is applied to a weld face as depicted in FIG. 30B. There may be a case where spatters 177 are numerously formed according to the growth of the nugget 138.

On the contrary, in the thermal conduction welding, the focus 175 is defocused so as to be in front of either irradiated position 171 or 173 for the laser beam 169 as depicted in FIG. 30A. An irradiated portion 179 which is long in diameter is formed on either irradiated position 171 or 173. Thermal conduction occurs to this irradiated portion 179 more gradually than through the focus 175, which is sharp, and the nugget 138, which is gentle, is formed. That is, the thermal conduction welding generates the nugget 138, which spreads in the radial direction of the irradiated portion 179. In this welding process, defocusing the laser beam 169 lengthens a nugget diameter, and shifts the key hole welding to the thermal conduction welding.

Figure 31A:
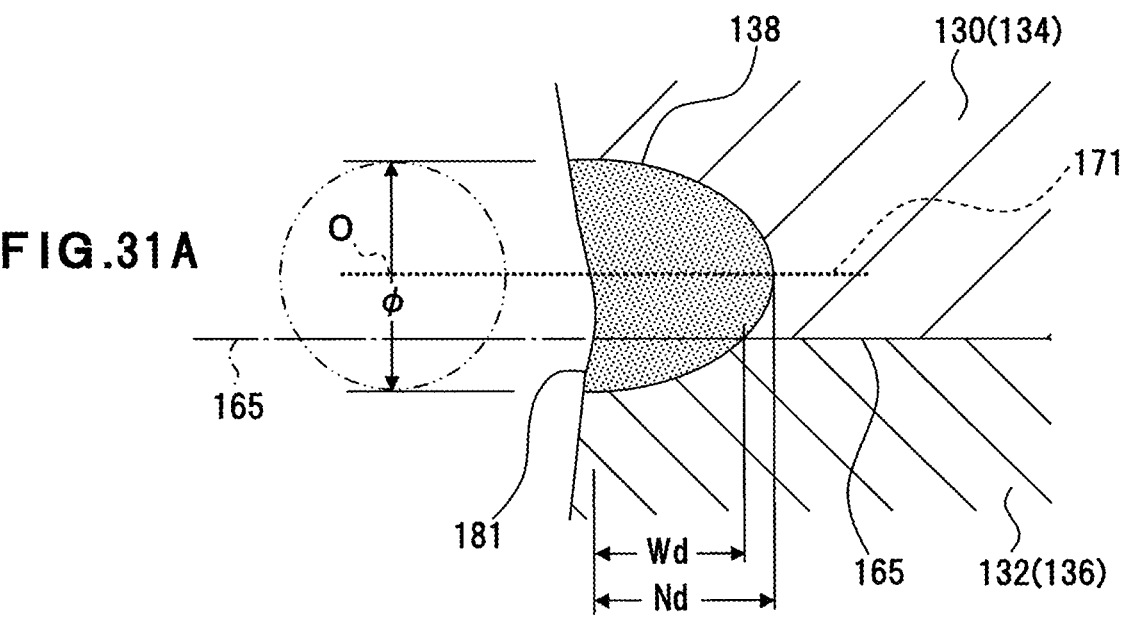
FIGS. 31A and 31B depict a nugget that is formed by thermal conduction welding.
Figure 31B:
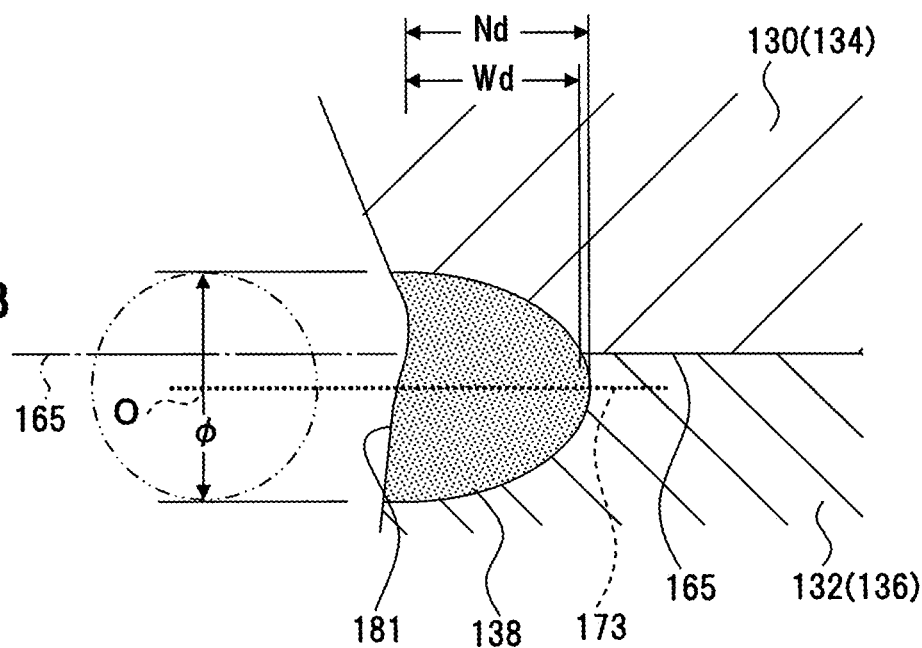

Concerning the above described irradiated positions 171 and 173 and welding energy, each irradiated position 171 and 173 indicates a position of the center of the laser beam 169. The range that can be irradiated with the laser beam 169 is the same as the diameter of the nugget 138 (FIGS. 31A and 31B). Thus, if the position of the center is differentiated (that is, the irradiated position is made on a flat plane but not on a non-contact portion 167), welding energy from the position of the center, where the maximum energy of the laser beam 169 is applied, can be efficiently given to the welded portion without reduction. Therefore, a desired nugget depth (welded range) can be obtained.

FIGS. 31A and 31B will be referred to concerning the nugget 138, which is formed by such thermal conduction welding. In FIG. 31A, the center position for the irradiation with the laser beam 169 is set at the irradiated position 171 and the irradiation is performed. The manner of this irradiation lengthens the nugget diameter through the defocus. In FIG. 31B, the center position for the irradiation with the laser beam 169 is set at the irradiated position 173 and the irradiation is performed. The manner of this irradiation lengthens the nugget diameter through the defocus. That is, in FIG. 31A, a nugget center O is set upper than the contact surface 165 in the drawing, and in FIG. 31B, the nugget center O is set lower than the contact surface 165 in the drawing.

In such thermal conduction welding, even if either the irradiated position 171 is shifted upward or the irradiated position 173 is shifted downward the contact surface 165, the contact surface 165 is included in the nugget 138, whose diameter is lengthened, and the positive current collector plate 132 and the positive electrode terminal 130 are welded. In FIGS. 31A and 31B, φ is a nugget diameter, Nd is a nugget depth and Wd is a welding depth. The welding depth Wd (≈Nd), which is equal to the nugget depth Nd, can be obtained because the nugget diameter φ is long and the nugget 138 is flatter than the case of the keyhole welding. Thereby, the accuracy and strength of the welding can be improved. It is noted that desired strength of the welding can be obtained by setting of 0.5 mm or less for difference between the nugget depth Nd and the welding depth Wd in size.

On the outer surface of the nugget 138, a face part 181 that is gradual is generated by unification before welding due to melting of the portions adhering to each other on the contact surface 165, and the non-contact portion 167, where the faces individually curve and spread upward and downward.

The nugget 138 is either consecutively or nonconsecutively formed parallel to the contact surface 165 either for the positive current collector plate 132 and the positive electrode terminal 130, or for the negative current collector plate 136 and the negative electrode terminal 134 (in the parallel direction along the connecting face 152 and the terminal side connecting face 164).

In this embodiment, the irradiated positions 171 and 173, which are arranged to be irradiated with the laser beam 169 or an electron beam, are differentiated orthogonally to the contact surface 165. The irradiated positions 171 and 173 may be differentiated in the direction crossing the contact surface 165.

The following effects can be obtained according to this ninth embodiment.

(1) In the embodiment as described above, the laser beam 169 is used. An electron beam may be used instead of the laser beam 169. In this embodiment, a position that is different from the contact surface 165 either for the positive current collector plate 132 and the positive electrode terminal 130, or for the negative current collector plate 136 and the negative electrode terminal 134 is irradiated with the laser beam 169 or an electron beam. Thus, the current collector plates and external terminal members can be welded regardless of a state of the contact surface therefor.

(2) Either the irradiated position 171 in the positive electrode terminal 130 (or the negative electrode terminal 134) or the irradiated position 173 in the positive current collector plate 132 (or the negative current collector plate 136) may be chosen for the irradiation with the laser beam 169. A flat face of either irradiated position 171 or 173 can be chosen and irradiated with the laser beam 169 or an electron beam. By such an irradiation manner with the laser beam 169 or an electron beam, the optimal welded range can be obtained even if the accuracy of processing of the contact surface 165 for the positive current collector plate 132 (or the negative current collector plate 136) and the positive electrode terminal 130 (or the negative electrode terminal 134) is bad: for example, there is a gap, and the accuracy and strength of the welding of the current collector plates and external terminal members can be improved.

(3) A comparatively soft metal material such as aluminum is used for the positive current collector plate 132 (or the negative current collector plate 136) and the positive electrode terminal 130 (or the negative electrode terminal 134). Thus, the accuracy of the processing has its limit when heading processing or the like is performed on such a material. Any gaps cannot be avoided from being generated on the contact surface for the positive current collector plate 132 (or the negative current collector plate 136) and the positive electrode terminal 130 (or the negative electrode terminal 134). In such a case, the accuracy of the welding can be improved by the above described irradiated positions 171 and 173, which are arranged to be irradiated with the laser beam 169 or an electron beam, differentiated from the contact surface 165.

(4) The irradiated positions 171 and 173, which are arranged to be irradiated with the laser beam 169 or an electron beam, may be different from the contact surface 165 in a direction crossing the contact surface 165. It is preferable that the amount and range of this difference is within the range of ±0.1 to ±0.5 mm, for example. If this range is set, the welded range by the laser beam 169 or an electron beam can include the contact surface 165.

The nugget 138 generated by laser welding or electron beam welding may have a depth so that the welding can be performed. For example, 1.2 mm or less is preferable. If this range is set, the irradiated range with the laser beam 169 or an electron beam can be made to be proper, the measures of the current collector plates and external terminal members in thickness are not increased, and an electricity storage device can be avoided from being large.

Tenth Embodiment

The tenth embodiment discloses the welding of current collector plates and terminals.

Figure 32:
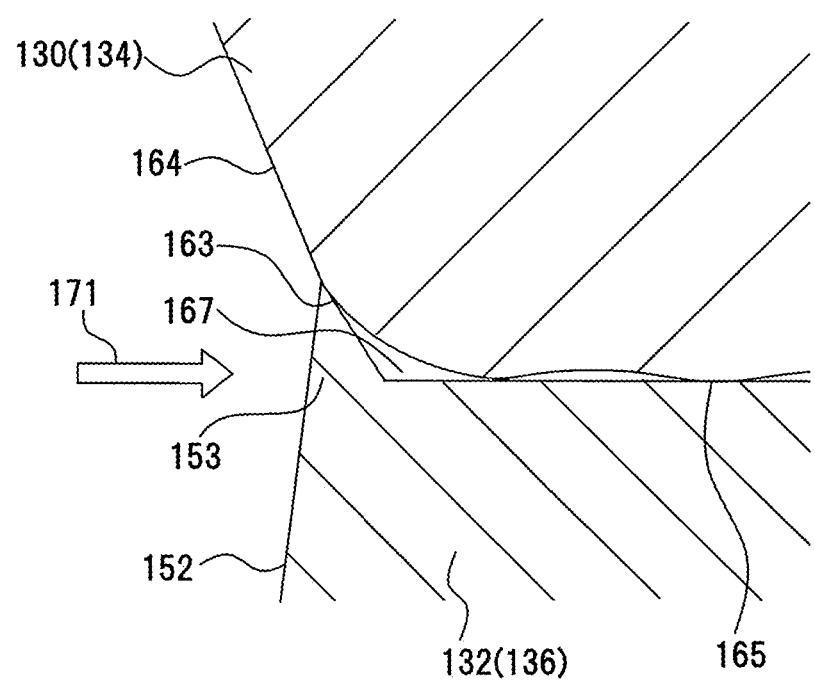
FIG. 32 depicts an enlarged welded portion of a positive current collector plate and a positive terminal according to a tenth embodiment.

FIG. 32 will be referred to concerning welding of the positive current collector plate 132 and the positive electrode terminal 130 (or the negative current collector plate 136 and the negative electrode terminal 134) according to the tenth embodiment. FIG. 32 depicts an enlarged welded portion of the positive current collector plate 132 and the positive electrode terminal 130.

For example, the positive current collector plate 132 is a plate of aluminum, on which head processing is performed. As an example, a cover 153 that has a triangular cross-section is formed on the connecting face 152 as a covering part. The positive electrode terminal 130 is also a plate of aluminum, on which heading processing is performed, and a taper face 163 is formed thereon, for example. If the angle of this taper face 163 is equalized with an angle of inclination of the inside wall face of the cover 153, the taper face 163 and the cover 153 can be matched with each other. In this case, gaps or the like appear on the contact surface 165 according to the accuracy of processing. In short, the contact surface 165 includes the portion where the faces adhere to each other, and the non-contact portion 167 where the face curves upward and downward to spread. Such a manner of the positive current collector plate 132 and the positive electrode terminal 130 applies to that of the negative current collector plate 136 and the negative electrode terminal 134 as well.

A center position (irradiated position 171) for the irradiation with the laser beam 169 is set at a location corresponding to the contact surface 165 for the positive current collector plate 132 and the positive electrode terminal 130 as described above. The irradiated position 171 may correspond to the contact surface 165 as is in the drawing, or may be a location other than the contact surface 165.

These welding manners by the laser beam 169 are as described in the ninth embodiment. Thus, the description is omitted.

Figure 33:
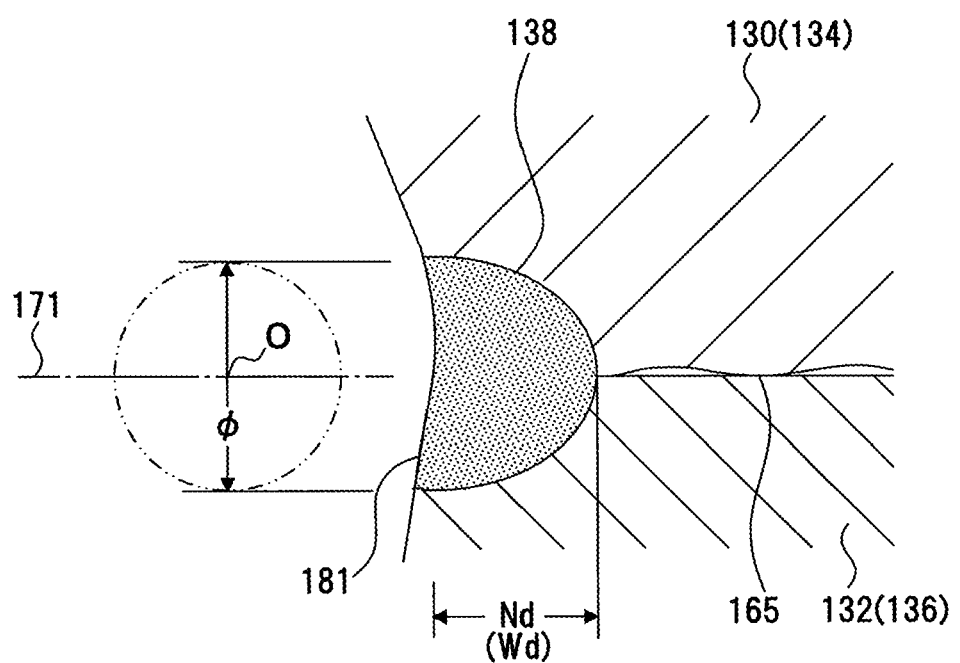
FIG. 33 depicts a nugget that is formed by thermal conduction welding.

FIG. 33 will be referred to concerning the nugget 138, which is formed by the thermal conduction welding. In FIG. 33, the irradiated position 171 is irradiated with the laser beam 169. Defocusing in this irradiation manner lengthens a nugget diameter φ. That is, in FIG. 33, the nugget center O is set so as to correspond to the contact surface 165. The nugget center O may be set either upward or downward in the drawing (the direction where the nugget center O crosses the contact surface 165 may be differentiated).

In such thermal conduction welding, the contact surface 165 is included in the nugget 138, whose diameter φ is lengthened, because the irradiated position 171 corresponds to the contact surface 165, and the positive current collector plate 132 and the positive electrode terminal 130 are welded. The welding depth Wd (≈Nd), which is equal to the nugget depth Nd, can be obtained because the nugget diameter φ is long and the nugget 138 is flatter than the case of the keyhole welding. Thereby, the accuracy and strength of welding can be improved.

On the outer surface of the nugget 138, the face part 181 that is gradual is generated by unification before the welding due to melting of the portion which adheres to the cover 153 (FIG. 32) in the contact surface 165 side, and the non-contact portion 167 where the face curves upward and downward to spread.

Figure 34A:
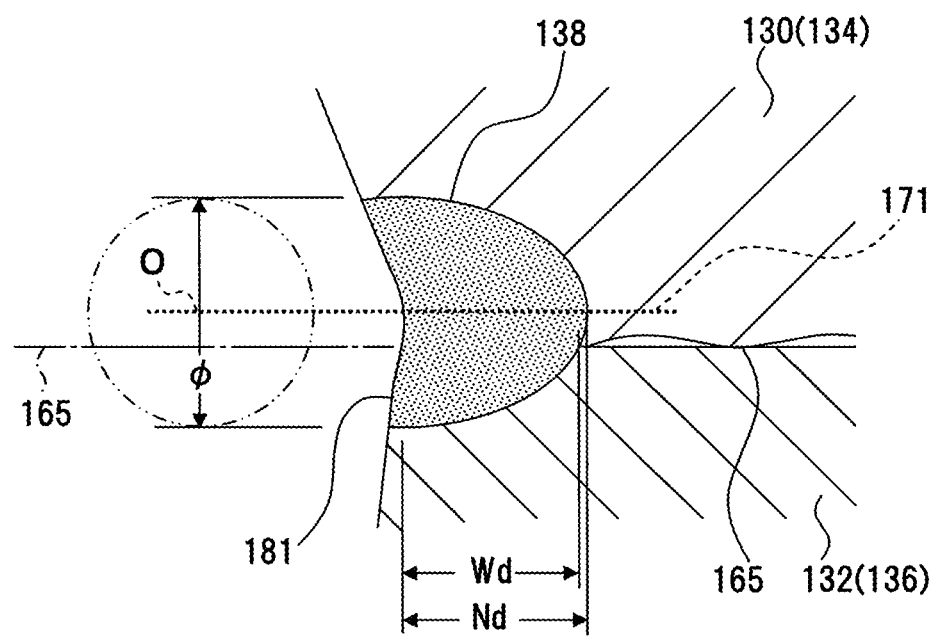
FIGS. 34A and 34B depict another type of the nugget that is formed by thermal conduction welding.
Figure 34B:
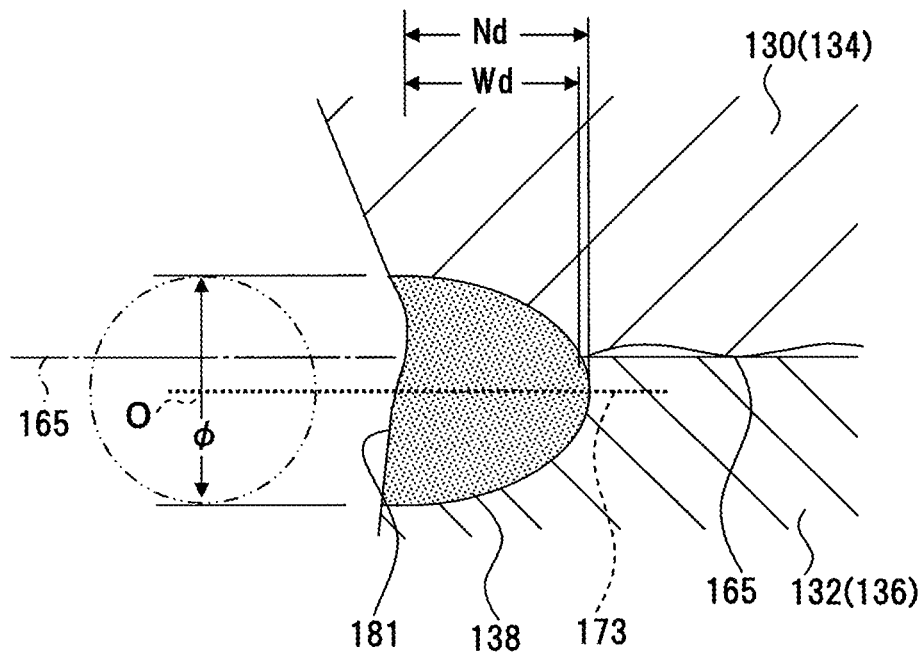

The irradiated position 171 arranged to be irradiated with the laser beam 169 may vary either above the contact surface 165 as depicted in FIG. 34A, or below the contact surface 165 as depicted in FIG. 34B within the cover 153 (FIG. 32) or the side face of each positive current collector plate 132 and negative current collector plate 136 where the cover 153 is provided. In this case, the contact surface 165 is also included in the nugget 138, whose diameter is lengthened, and the positive current collector plate 132 and the positive electrode terminal 130 are welded. In FIGS. 34A and 34B, φ is a nugget diameter, Nd is a nugget depth, and Wd is a welding depth. The welding depth Wd (≈Nd), which is equal to the nugget depth Nd, can be obtained because the nugget diameter φ is long and the nugget 138 is flatter than the case of the keyhole welding. Thereby, the accuracy and strength of welding can be improved. It is noted that desired strength of the welding can be obtained by setting of 0.5 mm or less for difference between the nugget depth Nd and the welding depth Wd in size.

The nugget 138 is either consecutively or nonconsecutively formed parallel to the contact surface 165 either for the positive current collector plate 132 and the positive electrode terminal 130, or for the negative current collector plate 136 and the negative electrode terminal 134 (in the parallel direction along the connecting face 152 and the terminal side connecting face 164).

According to this tenth embodiment, the same effects as described in the ninth embodiment can be obtained.

According to the electricity storage device or the method for manufacturing the same disclosed in "DETAILED DESCRIPTION OF THE INVENTION", the following effects can be obtained.

(1) An electrode protrusion that is protruded on an end-face of an electricity storage element including a battery device is connected with a terminal member via a current collector plate. Thus, reduced resistance of the electricity storage element can be achieved.

(2) A current collector plate(s) that is/are connected to one or a plural of electrode protrusion(s) drawn to an element end-face from either or both of electrode bodies of the positive and negative sides of an electricity storage element is/are superposed on a terminal member(s) in an outer packaging member, and their lateral faces are connected by welding. Thus, a space for the connection can be narrowed. Moreover, it can be achieved to strengthen the connection, to improve the reliability of the connection, and to reduce the resistance of the electricity storage element, and reduced ESR can be achieved.

(3) The connection structure of providing an individual current collector plate between a terminal member and an electrode protrusion that is protruded on an end-face of an electricity storage element allows the structure of connecting the terminal member and the electrode protrusion, or the electricity storage element, to be robust.

(4) According to the above structure, the connection of the terminal member and the electrode protrusion can be simplified by mean of the current collector plate, and simplified connecting steps can be achieved.

(5) A location different from a contact surface for a current collector plate and a terminal member is irradiated with a laser beam or an electron beam. Thus, the current collector plate and the terminal member can be welded regardless of the state of the contact surface.

(6) A flat face of a current collector plate or a terminal member, or a flat face in the current collector plate side that covers a contact surface for the current collector plate and the terminal member can be selected and irradiated with a laser beam or an electron beam. Thus, the optimum area for welding can be obtained even if the accuracy in processing the contact surface for the current collector plate and the terminal member is low and even if there is a gap between the current collector plate and the terminal member, and the accuracy in welding the current collector plate to the terminal member and strength of this welding can be improved.

(7) The contact surface for a current collector plate and a terminal member is covered by a cover that is from either the current collector plate or the terminal member, and the cover is irradiated with a laser beam or an electron beam. Thus, the current collector plate and the terminal member can be welded regardless of the state of the contact surface.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

The electricity storage device of the present invention and the method for manufacturing the same contribute to simplification of a terminal connection structure and connecting steps etc., and can improve the productivity and reliability. Thus, the present invention is useful.

What is claimed is:
1. An electricity storage device comprising:
an electricity storage element that is constituted by an electrode body in a positive side and an electrode body in a negative side that face each other while holding a separator;
a sealing member that seals a case member accommodating the electricity storage element;
an electrode protrusion in the positive side and an electrode protrusion in the negative side that are the electrode bodies, which are led out on an element end-face of the electricity storage element, the electrode protrusion in the positive side and the electrode protrusion in the negative side being provided for the element end-face;
a current collector plate in the positive side and a current collector plate in the negative side that are connected to the electrode protrusion in the positive side and the electrode protrusion in the negative side, respectively; and
a terminal member in the positive side that is installed in the sealing member, the terminal member in the positive side having a contact surface connected to a contact surface of the current collector plate in the positive side;
a terminal member in the negative side that is installed in the sealing member, the terminal member in the negative side having a contact surface connected to a contact surface of the current collector plate in the negative side, wherein
a lateral face of the contact surface of the current collector plate in the positive side and a lateral face of the contact surface of the terminal member in the positive side form a same plane in the positive side, and are welded with each other with a welded part formed on the same plane in the positive side by irradiation of laser beam or electron beam with which the lateral face of the current collector plate and the lateral face of the terminal member in the positive side are irradiated, wherein a center position of the irradiation of the laser beam or the electron beam is a same or different location from the contact surfaces of the current collector plate in the positive side and the terminal member in the positive side,
the welded part in the positive side is formed by irradiating the same plane in the positive side with the laser beam or the electron beam along a direction parallel or almost parallel to the contact surfaces of the current collector plate and the terminal member in the positive side,
a lateral face of the contact surface of the current collector plate in the negative side and a lateral face of the contact surface of the terminal member in the negative side form a same plane in the negative side, and are welded with each other with a welded part formed on the same plane in the negative side by irradiation of the laser beam or electron beam with which the lateral face of the current collector plate and the lateral face of the terminal member in the negative side are irradiated, wherein a center position of the irradiation of the laser beam or the electron beam is a same or different location from the contact surfaces of the current collector plate in the negative side and the terminal member in the negative side, and
the welded part in the negative side is formed by irradiating the same plane in the negative side with the laser beam or the electron beam along a direction parallel or almost parallel to the contact surfaces of the current collector plate and the terminal member in the negative side.

2. The electricity storage device of claim 1, wherein the electrode protrusion in the positive side or the electrode protrusion in the negative side is folded over the element end-face with a fold provided therefor.

3. The electricity storage device of claim 1, wherein
a first isolation distance is set between the electrode protrusion in the positive side and the electrode protrusion in the negative side, which protrude on the element end-face of the electricity storage element, and
a second isolation distance is set between the current collector plate in the positive side, which is installed on the electrode protrusion in the positive side of the electricity storage element, and the current collector plate in the negative side, which is installed on the electrode protrusion in the negative side of the electricity storage element.

4. The electricity storage device of claim 1, wherein
the current collector plate in the positive side and the current collector plate in the negative side have connecting areas that connect to the electrode protrusion in the positive side and the electrode protrusion in the negative side, respectively, the connecting areas being set at different location from the same plane in the positive side and the same plane in the negative side.

5. The electricity storage device of claim 1, wherein
the same plane in the positive side or the negative side is irradiated with the laser beam or the electron beam along a direction orthogonal to the same plane in the positive side or the negative side.

6. A method for manufacturing an electricity storage device, the method comprising:
forming an electricity storage element that includes an electrode body in a positive side and an electrode body in a negative side between which a separator is interposed;
forming an electrode protrusion in the positive side and an electrode protrusion in the negative side that are the electrode bodies in the positive side and the negative side of the electricity storage element, the electrode bodies being drawn to an element end-face;
connecting a contact surface of a current collector plate in the positive side to a contact surface of a terminal member in the positive side that is installed in a sealing member that seals a case member accommodating the electricity storage element to connect the electrode protrusion in the positive side to the terminal member in the positive side through interposal of the current collector plate in the positive side,
connecting a contact surface of a current collector plate in the negative side to a contact surface of a terminal member in the negative side that is installed in the sealing member to connect the electrode protrusion in the negative side to the terminal member in the negative side through interposal of the current collector plate in the negative side, and wherein
a lateral face of the contact surface of the current collector plate in the positive side and a lateral face of the contact surface of the terminal member in the positive side form a same plane in the positive side, and are welded with each other with a welded part formed on the same plane in the positive side by irradiation of laser beam or electron beam with which the lateral face of the current collector plate and the lateral face of the terminal member in the positive side are irradiated, wherein a center position of the irradiation of the laser beam or the electron beam is a same or different location from the contact surfaces of the current collector plate in the positive side and the terminal member in the positive side, the welded part in the positive side is formed by irradiating the same plane in the positive side with the laser beam or the electron beam along a direction parallel or almost parallel to the contact surfaces of the current collector plate and the terminal member in the positive side, a lateral face of the contact surface of the current collector plate in the negative side and a lateral face of the contact surface of the terminal member in the negative side form a same plane in the negative side, and are welded with each other with a welded part formed on the same plane in the negative side by irradiation of the laser beam or electron beam with which the lateral face of the current collector plate and the lateral face of the terminal member in the negative side are irradiated, wherein a center position of the irradiation of the laser beam or the electron beam is a same or different location from the contact surfaces of the current collector plate in the negative side and the terminal member in the negative side, and the welded part in the negative side is formed by irradiating the same plane in the negative side with the laser beam or the electron beam along a direction parallel or almost parallel to the contact surfaces of the current collector plate and the terminal member in the negative side.

7. The method of claim 6, wherein the connecting the electrode protrusion in the positive side to the terminal member in the positive side through interposal of the current collector plate in the positive side includes setting a weld line on a top surface of the current collector plate in the positive side, performing laser irradiation on the weld line, and welding the current collector plate in the positive side and the electrode protrusion in the positive side, and the connecting the electrode protrusion in the negative side to the terminal member in the negative side through interposal of the current collector plate in the negative side includes setting a weld line on a top surface of the current collector plate in the negative side, performing laser irradiation on the weld line, and welding the current collector plate in the negative side and the electrode protrusion in the negative side.

8. The method of claim 6, further comprising:

changing power of a laser with which the weld line, which is set on the current collector plate in the positive side or in the negative side, is irradiated.

9. The method of claim 6, wherein the same plane in the positive side or the negative side is irradiated with the laser beam or the electron beam along a direction orthogonal to the same plane in the positive side or the negative side.

\* \* \* \* \*